United States Patent [19]

Wu

[11] Patent Number: 4,567,104
[45] Date of Patent: Jan. 28, 1986

[54] HIGH ENERGY BEAM COLORED GLASSES EXHIBITING INSENSITIVITY TO ACTINIC RADIATION

[75] Inventor: Che-Kuang Wu, Riverside, Calif.

[73] Assignee: Canyon Materials Research & Engineering, Riverside, Calif.

[21] Appl. No.: 507,681

[22] Filed: Jun. 24, 1983

[51] Int. Cl.$^4$ ............................................. C03C 15/00
[52] U.S. Cl. .................................... 428/410; 428/426; 428/428; 428/913; 65/30.11; 501/55
[58] Field of Search ............... 428/410, 913, 426, 428, 428/212

[56] References Cited

U.S. PATENT DOCUMENTS

| | | | |
|---|---|---|---|
| 1,669,908 | 5/1928 | Long . | |
| 2,245,783 | 6/1941 | Hyde | 8/8 |
| 2,494,259 | 1/1950 | Nordberg | 106/50 |
| 2,554,952 | 5/1951 | Mockrin et al. | 106/52 |
| 2,566,134 | 8/1951 | Mockrin et al. | 106/52 |
| 2,604,410 | 7/1952 | Bryant | 106/48 |
| 2,683,666 | 7/1954 | Duncan et al. | 106/52 |
| 2,701,215 | 2/1955 | Kroeck | 117/65 |
| 2,799,590 | 7/1957 | Armistead | 106/53 |
| 2,913,345 | 11/1959 | Duncan | 106/52 |
| 2,920,971 | 1/1960 | Stockey | 106/39 |
| 2,943,059 | 6/1960 | Beck et al. | 252/179 |
| 3,001,880 | 9/1961 | Raskin | 106/50 |
| 3,007,806 | 11/1961 | Hartwig | 106/50 |
| 3,022,182 | 2/1962 | Cleek et al. | 106/52 |
| 3,077,414 | 2/1963 | Wiker | 106/52 |
| 3,397,076 | 8/1968 | Little et al. | 117/70 |
| 3,419,370 | 12/1968 | Cramer et al. | 161/1 |
| 3,504,819 | 2/1966 | Veres | 220/2.1 |
| 3,528,847 | 9/1970 | Grego et al. | 117/124 |
| 3,589,918 | 6/1971 | Jahn | 106/53 |
| 3,656,923 | 4/1972 | Garfinkel et al. | 65/30 |
| 3,677,960 | 7/1972 | Ishiyama | 252/301.4 F |
| 3,704,467 | 11/1972 | Frock | 346/1 |
| 3,713,819 | 1/1973 | Hagenbach et al. | 96/1 SD |

(List continued on next page.)

FOREIGN PATENT DOCUMENTS 0074157 4/1982 European Pat. Off. .
778355 11/1955 United Kingdom .
1290528 9/1972 United Kingdom .

OTHER PUBLICATIONS

Reprint from Journal of Non-Crystalline Solids, vol. 41, No. 3, Dec. 1980, pp. 381-398, "Stable Silicate Glasses Containing up to 10 Weight Percent of Water", Che-Kuang Wu.
Reprint from Journal of The American Ceramic Society, 63[7-8], 453-457, (1980), "Nature of Incorporated Water in Hydrated Silicate Glasses," Che-Kuang Wu.

Primary Examiner—George F. Lesmes
Assistant Examiner—P. R. Schwartz
Attorney, Agent, or Firm—Christie, Parker & Hale

[57] ABSTRACT

The invention relates to high energy beam-sensitive glass articles exhibiting insensitivity and/or inertness to actinic radiation, i.e., glass articles which are darkened and/or colored within a thin surface layer of, e.g., about 0.1-3 $\mu$m upon exposure to a high energy beam, electron beam, and ion beams in particular, without a subsequent development step, and which need no fixing to stabilize the colored image, since both the recorded image and the glass article are insensitive to radiation in the spectral range of uv and longer wavelengths. More particularly, the instant invention is concerned with $Ag^+$ ion-exchanged glass articles having base glass within alkali metal silicate composition fields containing at least one of the oxides of transition metals which have one to four d-electrons in an atomic state. Whereas the base glass composition can be varied widely, spontaneous reduction as well as photo-reduction of $Ag^+$ ions are inhibited and/or eliminated due to the presence of said transition metal oxides in the glass article. The product of the invention is suitable for use as recording and archival storage medium and as phototools. The recorded images and/or masking patterns are up-datable, can be any single color seen in the visible spectrum, and is erasable by heat at temperatures above about 200° C.

114 Claims, 10 Drawing Figures

U.S. PATENT DOCUMENTS

| | | | |
|---|---|---|---|
| 3,840,379 | 10/1974 | Wolf | 106/50 |
| 3,861,926 | 1/1975 | Iriam et al. | 106/50 |
| 3,873,328 | 3/1975 | Brueggermann et al. | 106/39.6 |
| 3,873,408 | 3/1975 | Hensler | 161/165 |
| 3,887,348 | 6/1975 | Plumat et al. | 65/30 |
| 3,888,648 | 6/1975 | West et al. | 65/30 |
| 3,904,425 | 9/1975 | Young et al. | 106/52 |
| 3,944,697 | 3/1976 | Ichimura et al. | 428/210 |
| 4,002,482 | 1/1977 | Coenen | 106/40 V |
| 4,026,715 | 5/1977 | Erickson et al. | 106/50 |
| 4,036,623 | 7/1977 | Deeg et al. | 65/30 E |
| 4,057,408 | 4/1977 | Pierson et al. | 106/52 |
| 4,086,073 | 4/1978 | Loukes | 65/30 E |
| 4,102,665 | 7/1978 | Plumat et al. | 65/30 E |
| 4,106,946 | 8/1978 | Ritze | 106/52 |
| 4,160,654 | 7/1979 | Bartholomew et al. | 65/30 E |
| 4,179,300 | 12/1979 | Sagara | 106/47 Q |
| 4,190,451 | 2/1980 | Hares et al. | 106/47 Q |
| 4,191,547 | 3/1980 | Wu | 65/30 R |
| 4,192,689 | 3/1980 | Rinehart | 106/52 |
| 4,297,417 | 10/1981 | Wu | 428/410 |
| 4,311,504 | 1/1982 | Nigrin | 65/32 |
| 4,405,672 | 9/1983 | Araujo et al. | 528/68 |

HIGH ENERGY BEAM COLORED GLASSES EXHIBITING INSENSITIVITY TO ACTINIC RADIATION

BACKGROUND OF THE INVENTION

In many applications in the field of recording and archival storage medium, e.g., direct-read-after-write archival storage medium for recording high density data and high quality images in particular, a life time for reliable data substantially longer than ten years is most desirable. It is also very desirable that phototools such as photomasks and reticles can be made substantially more durable than the chrome-phototools.

One way to achieve these objectives is to have the recorded image and/or the masking pattern and/or the information bearing layer present within (that is, not coated on) the glass substrate itself. It would improve the durability of the phototool and the recorded image, and at the same time eliminate the need of thin film coatings, such as the chromium film on a photomask and ablative thin film material, e.g. Tellurium film on optical disks.

There exist many types of glasses whereby optical images can be produced within a glass article. The merits and faults of each of the more promising families of glasses capable of storing optical image/data are discussed below.

U.S. Pat. No. 4,017,318 refers to photosensitive colored glasses which are the sodium halide-silver halide containing photosensitive glasses based on sodium silicate. The photosensitive colored glasses contain a significant amount of fluoride, 1–4% by weight of F, and a second halide usually about 1% by weight of Br. On cooling from melts, they become supersaturated with NaF. They also contain 0.0005–0.1% by weight of Ag as sensitizer and colorant, 0.01–0.2% $CeO_2$ as optical sensitizer, about 1% $Sb_2O_3$ and/or up to about 0.1% SnO as thermal sensitizer and redox agent. Through a unique sequence of ultraviolet exposures and heat treatments, a full spectrum of visible colors can be developed in a single piece of the alkali halide-silver halide containing photosensitive colored glasses of U.S. Pat. No. 4,017,318. While the intensity of colors depends on the exposure dosage of a second uv exposure, the hue is primarily a function of the first uv exposure dose. Thus, optical transmission curves for a fully developed glass show a progressive series of absorption bands moving from the infrared across the visible spectrum as a function of the increasing dosage of first ultraviolet exposures. The photosensitive colored glasses of U.S. Pat. No. 4,017,318 is often yellow colored in the regions/areas which are not exposed to ultraviolet radiation, after the sequence of heat treatments. In order to prevent the spontaneous yellow background coloration, the silver concentration in the photosensitive colored glass melts of U.S. Pat. No. 4,017,318 is kept below 0.025% by weight. As a result, the required thickness of the image bearing glass layer is at least about 100 micrometer to secure an optical density of unity. Thus the photosensitive colored glasses of U.S. Pat. No. 4,017,318 are not suitable for use as a recording medium to store data having bit sizes of less than about 10 micrometer and are not suitable for use as photomasks to print IC patterns having minimum geometries of less than about 10 micrometer.

U.S. Pat. No. 2,515,936 relates to silver-photosensitive glass, in which exposure to short wave radiation such as ultraviolet (310 nm) brings about a change. That is, irradiated areas are capable of heat developed coloration while non-irradiated areas remain substantially unchanged on heating. The heat developed image is permanent and is yellow to amber in color due to an absorption band centered at about 420 nm. The silver photosensitive glass of U.S. Pat. No. 2,515,936 refers specifically to glass batches on the weight percent basis equivalent to about 75% $SiO_2$, 15% Alkali metal oxide and 10% divalent metal oxide, 0.05 to 0.3% silver computed as AgCl, and $CeO_2$ in an amount up to 0.05% $CeO_2$ is stated to act as a photo-sensitizing agent. Although up to 0.3% of silver can be retained in the glass melt, the thickness of the silver-photosensitive glass, required to secure 1 unit of optical density at 420 nm, is not less than that of the photosensitive colored glasses of U.S. Pat. No. 4,017,318. Apparently a smaller fraction of silver ions in the silver-photosensitive glass of U.S. Pat. No. 2,515,936 is reduced and precipitated out as colloidal silver metal particles in glass as a result of a radiation step followed by a heat treatment.

U.S. Pat. No. 2,732,298 discloses the method of producing a permanent two dimensional photographic image within the surface of a silicate glass containing an alkali metal oxide. In accordance with this method, there is first formed on the surface of a silicate glass by conventional procedures a chemically fixed photographic image. The glass, together with the image is then heated either in air alone or with an additional oxidizing agent present at a temperature between about 125° C. below the strain point of the glass and just below its softening point for a time sufficient to oxidize and ionize the silver and to cause the migration of silver ions into the glass in exchange for alkali metal ions therein. A visible image which is usually of a yellowish to brownish color is produced due to the spontaneous reduction of a portion of the silver ions in the glass to metallic particles. If desired, a more complete reduction of silver ions and intensification of the color to dark amber or brown can be accomplished by subsequently heating the glass in a reducing atmosphere containing a reducing gas such as hydrogen, carbon monoxide or methane. Due to the lateral or sideway diffusion of the photographic silver image, the minimum geometry and/or line width reproducible in glass according to the method of U.S. Pat. No. 2,732,298 is in general greater than about twenty micrometers.

A modification of the method of U.S. Pat. No. 2,732,298 is found in U.S. Pat. No. 4,286,052 wherein the photographic silver image is driven into a glass article by electrical means.

Besides being not suitable for recording optical images or information with bit sizes or minimum geometries of less than a couple of micrometers, images in the three types of glasses cited above are developed through at least a heat treatment step, there is thus no direct-read-write capability.

U.S. Pat. Nos. 4,191,547 and 4,296,479, disclosed by the present author, refer to alterable photosensitive glasses, that is, photosensitive colored glasses exhibiting alterable photo-anisotropic effects. These glasses may be employed as erasable recording media having limited read applications. The alterable photosensitive glasses comprise a body portion and a photosensitive surface layer exhibiting alterable photo-anisotropic effects. The surface layer, having photosensitive and photo-anisotropic Ag—AgCl-containing crystals therein, is prepared by subjecting a glass article having base glass compositions within the $Na_2O$ and/or $K_2O$—$ZnO$—$Al_2O_3$—$SiO_2$—$Cl$ field to an ion exchange reaction in a silver containing aqueous solution, and subsequently exposing the glass article to radiation within the spectral ranges of uv and blue light. Write and erasure are done with polarized red light, and are based on the phenomena of photo-polarization and optical bleaching. The photo-anisotropic effects are inherent properties of the Ag—AgCl crystals within the surface layer of the alterable photosensitive glasses.

The alterable photosensitive glasses are not suitable for use as a permanent recording medium and/or as a phototool for the following obvious reasons. First, there exist no known method and/or mechanism of fixing the images. Thus the recorded image as well as the alterable photo-anisotropic surface layer are unstable in the presence of radiation in the wavelength range of uv, blue light and longer wavelengths, and are particularly sensitive to polarized red light. Second, the required thickness of the image/information bearing layer of the alterable photosensitive glasses is at least 30 micrometers to secure an optical density of 2.

BRIEF SUMMARY OF THE INVENTION

One of the objectives of the present invention is the production of a glass article comprising a body portion and an ion exchanged surface layer containing a high concentration of silver ions, which upon exposure to high energy beams becomes darkened and/or colored instantaneously without resorting to heat or any other development step. The net optical density of the colored image confined with a thin surface glass layer should exceed 1.2 and is preferably in excess of 1.8 and is most preferably in excess of 3. The colored image should be confined within a surface glass layer of less than about 3 micrometers. The high energy beams applicable for this inventive material shall include electron beams, various ion beams, various molecular beams, X-ray and deep ultraviolet of wavelengths less than about 200 or 300 nm. It is also the objective of the present invention that the inventive glasses which are highly sensitive to high energy beams, are colorless and totally transparent to actinic radiation before exposure to the high energy beams, and are not darkenable (i.e. not colored) by the actinic radiation whose intensities are at and/or above and/or below those commonly employed in photolithography and/or in optical retrieval (optical read) application. Actinic radiation is defined herein as radiations in the wavelength range of ultraviolet and/or longer wavelengths. It is also the objective of the present invention that the colored image produced upon exposure to the high energy beams is not bleached by the actinic radiation whose intensities are at and/or above and/or below those commonly employed in photo-fabrication and/or in optical read out. It is another objective of the present invention that the image recorded by the high energy beams as well as the unexposed colorless areas are stable indefinitely in all possible ambient thermal, lighting and humidity conditions. For example, there will be no thermal fading of the colored image, nor thermal darkening of the unexposed colorless areas, no degradation of the sensitivity toward high energy beams due to long term storage in ambient conditions. It is still another objective of the present invention that the required charge density in a direct writing mode to secure an optical density of more than 2 within the integral surface layer is less than $1 \times 10^{-3}$ coulomb/cm$^2$ and preferably less than $1 \times 10^{-4}$ coulomb/cm$^2$ and most preferably less than about $1 \times 10^{-5}$ coulomb/cm$^2$ when the high energy beam is an electron beam having an accelerating voltage ranging between about 10-100 kg.

A direct writing mode is herein defined as a mode of recording wherein an image with a high/good contrast is produced by exposure to a high energy beam without any requirement for a subsequent development and/or a contrast enhancement step. The terminology "electron-beam" is herein denoted as E-beam.

As is elaborated in the description of the invention, all the objectives mentioned above are totally and completely fulfilled by the products of the present invention.

The present invention provides a high energy beam sensitive glass article exhibiting insensitivity and/or inertness to actinic radiations, consisting of a body portion and an integral ion-exchanged surface layer. The ion-exchanged surface layer which is darkened and/or colored upon exposure to high energy beam, contains a high concentration of $Ag^+$ ions and/or a large number density of AgCl containing and/or $Ag_2O$ containing and/or $Ag^+$ ion containing microcrystals and/or microphases, also contains silanol groups and/or water in the concentration range between about 0.01-12% by weight $H_2O$. The method of making the inventive product consists of the following general procedures:

(a) melting a batch for a glass containing essentially, in mole percent on the oxide basis, of about 3-25% total of $Li_2O+Na_2O+K_2O+Cs_2O+Rb_2O$, 0-6% Cl, 0.5-35% total of at least one oxide selected from the oxides of transition metals which have one to four d-electrons in an atomic state, up to 35% total concentration of $ZnO+MgO+CaO+SrO+PbO+Al_2O_3$, up to 20% BaO, up to 25% $P_2O_5$, up to 25% $B_2O_3$, up to 4% F, up to 2% Br, up to 2% I and 20-93% $SiO_2$.

(b) forming said melt into a glass article (c) contacting the surface of the glass article with a $Ag^+$ ion-containing material and/or an aqueous solution containing $Ag^+$ ions (d) heating the glass article together with the $Ag^+$ ion-containing material and/or the aqueous solution containing $Ag^+$ ions in contact therewith to a temperature sufficient to effect ion exchange reactions, and the formation of AgCl-containing and/or $Ag_2O$-containing and/or $Ag^+$ ion-containing microcrystals and/or microphases within an ion exchanged surface layer. The ion-exchange reactions include an exchange of $Ag^+$ for the alkali metal ions in at least the surface of the glass article. Hydration and/or an exchange of $H^+$ ions for alkali metal ions in glass may also take place to various extents depending primarily on the ingredients of the aqueous ion exchange solution. The reactions are allowed to proceed at least 0.1 micrometer in thickness dimension into the surface of said glass article. The concentrations of alkali metal ions in the ion-exchanged surface layer decrease with an increase in the concentration of $Ag^+$ ions.

(e) cooling the glass article to room temperature.

As is elaborated in the description of the invention, the inventive method provides unique combinations of the anhydrous base glass compositions, the ingredients and the conditions of the ion exchange reactions. As a result, the photo-reduction of the microcrystals and/or microphases as well as the spontaneous reduction of $Ag^+$ ions upon being exchanged into glass are effectively suppressed and/or eliminated within the integral ion exchanged surface layer which is highly sensitive to high energy beams.

The E-beam darkened images within the integral ion exchanged surface layer of the present invention can be erased by heat at a temperatures substantially below the softening point of the integral ion exchanged surface layer and/or below the strain point of the anhydrous body portion. The sensitivity to electron beam is unchanged by the heat erasure treatment.

In addition, latent images and/or latent patterns delineated by electron-beams having little or no detectable optical density can be developed into surface relief images and/or relief patterns of very high quality. Through selective etching means, the minimum charge density to produce surface relief images is up to a factor of more than 100 lower than that required to produce colored images of high contrast in a direct E-beam writing mode.

The ion-exchanged products of the present invention are useful as high energy beam recording media for permanent storage of images having a full range of gray scales. Analog as well as digital recording are done in a direct writing mode. Optical images with feature sizes down to below 1 micrometer can be recorded with an electron beam within a CRT or utilizing scanning electron beam systems or using parallel exposure systems such as the 1:1 photo cathode projection system or the demagnifying electron image projection system.

Electron beam lithography machines and replication techniques were reviewed by G. Brewer, et al. in the book, "Electron-Beam Technology in Microelectronic Fabrication" 1980, Academic Press, New York. Scanning electron beam systems utilizing a shaped probe concept have recently been described by E. V. Weber in *Optical Engineering* 1983, Vol. 22, No. 2, pages 190-194.

In one aspect, optical software disks and the like as well as digital audio discs, digital video discs and ultra high density microfilm of superior durability and permanence can be mass produced in a direct E-beam writing mode with one of the various types of electron-beam systems. The permanent image, information and/or data therein are optically read in a transmission mode with either a semiconductor laser or a He-Ne laser or any light source within the spectral ranges of near-infrared, visible and near-uv. The optical software disks/plates/slides may be employed to load programs into various micro-and mini-computers as well as supply a medium to serve the market for personal computers, video games, office systems, data distribution systems and other information systems. It may also be employed to record financial transactions.

In another aspect, digital data is recorded in the product of the present invention in the form of surface relief through exposures to electron beams and a subsequent surface-relief-development in HF solution. A reflective coating deposited thereafter on the surface relief renders the recorded data retrievable optically in a reflection mode.

In still another aspect, the product of the present invention is suitable for use as a photomask blank. Utilizing the photomask blank of the present invention, phototools, including photomasks, 5×/10× step-and-repeat-photomasks, and reticles for optical instruments, are prepared by writing masking patterns with a high energy beam in a direct writing mode. Permanent masking patterns having a net optical density in excess of 2 is obtained instantaneously without resorting to any subsequent development or etching process. Immediately after the higher energy beam pattern generation, IC device patterns in a photomask, made of the present product, may be printed on any photoresist coated or photosensitive surface through any of the various photolithographic techniques, e.g. step and repeat camera, contact printing and/or projection printing. The photomask blank of the present invention will contribute to the needs of phototools and photofabrication particularly in the fields of microelectronics with the following advantages over the conventional chrome photomask blanks:

1. Reduce time and cost of mask making; all processing steps in the traditional photomask making, such as developing resist, pre-bake and post-bake resist, etching the chrome and stripping the resist are totally eliminated.
2. Undesirable features of the traditional photomask making including swelling of resist, limited process latitude, scum left from the developed resist, line distortion and rough edges due to development and etching no longer exist.
3. Long mask life and high wafer yield; the photomask blank of the present invention is monolithic, namely, the information bearing surface is in, not coated on the surface of a glass substrate. The photomask of the present invention is highly durable and wear-resistant. For example, there will be no problem of pattern missing due to repeated cleaning and/or washing.
4. The numerous mechanisms of pin-hole formation in the traditional photomasks no longer exist. Moreover, other defects such as unetched chrome and under cuts which are inherently associated with the coated masking layer and photoresist no longer exist.
5. The photomask of the present invention is easily cleaned, can be washed repeatedly, e.g. in regular intervals of use without generating defects. Consequently, the need and the cost for reinspections are minimized.
6. White light is the safe light; allowing inspection of the mask and the mask-blank with intense white light before, during and after IC pattern is generated.
7. Allows add-on and correction of device patterns.
8. Zero reflectivity from the masking layer itself on the front as well as on the back side.
9. See-through, e.g. red images for ease of alignment.

Preferably the base glass consists essentially of, in mole percent on the oxide basis, of about 3-25% total of $Li_2O + Na_2O + K_2O + Cs_2O + Rb_2O$, up to 6% Cl, 0.5-35% total concentration of photosensitivity inhibitors (PI agents) and RS-suppressant agents (RSS agents), up to 35% total concentration of acid durability-and-glass-network-strengtheners, up to 20% BaO, up to 25% $P_2O_5$, up to 25% $B_2O_3$, up to 4% F, up to 2% Br, up to 2% I and 20-93% $SiO_2$; whereas the photosensitivity inhibitors are necessary constituents of chloride-containing glasses, the RS-suppressant agents are necessary constituents of chloride-free glasses, the photosensitivity inhibitors are well as the RS-suppressant agents are usually included in halide-containing glasses. The integral ion-exchanged surface layer having $Ag^+$ ions therein and/or a large number of AgCl-containing and/or $Ag_2O$-containing and/or $Ag^+$ ion-containing microcrystals and/or microphases, containing silanol groups and/or water in the concentration range of between about 0.01-12% by weight $H_2O$, the concentrations of alkali metal ions in said integral ion-exchanged surface layer being less with an increase in the concentration of Ag+ ions, said integral ion-exchanged surface layer containing total or at least part of the contents of each of the photosensitivity-inhibitors, the RS-suppressant agents, the glass network formers and chloride of said body portion. Said microcrystals and/or microphases may also contain at least trace amounts of alkali metal ions, and/or photosensitivity inhibitors, and/or RS-suppressant agents, and/or other ingredients contained in said integral surface layer.

In a more preferred embodiment of the present invention, the base glass consists essentially, in mole percent on the oxide basis, of about 5-25% total of $Li_2O+Na_2O+K_2O+Cs_2O+Rb_2O$, up to 6% Cl, 0.5-35% total concentration of photosensitivity-inhibitors and RS-suppressant agents, up to 20% MgO, up to 20% CaO, up to 20% ZnO, up to 15% $Al_2O_3$, up to 20% PbO, 2-35% total of $ZnO+CaO+MgO+PbO+Al_2O_3$, up to 4% F, up to 2% Br, up to 2% I, and 50-89% $SiO_2$. The preferred alkali metal oxides are $Li_2O$, $Na_2O$ and $K_2O$. Preferably, the base glass will contain at least 1.2% $TiO_2$. The preferred halide is Cl and preferably the composition will contain only the halide Cl.

A more preferred base glass consists generally in mole percent on the oxide basis, of about 5-25% total of $Li_2O+Na_2O+K_2O$, up to 6% Cl, 1.2-25% $TiO_2$, 1.2-35% total of $TiO_2+Ta_2O_5+ZrO_2+Nb_2O_5+La_2O_3+Y_2O_3+WO_3$, 2-20% ZnO, up to 10% $Al_2O_3$, up to 3% total of F+Br+I and 50-89% $SiO_2$. Preferably, said base glass contains at least two of the alkali metal oxides selected from $Li_2O$, $Na_2O$ and $K_2O$, preferably the base glass will contain more than 1% $Li_2O$. In a preferred embodiment of the composition, said base glass has a molar concentration ratio of $(Li_2O+Na_2O)$ to $K_2O$ of more than 0.6. In another preferred embodiment, said base glass will have a total content of $Li_2O+Na_2O+K_2O$ of between 10 and 20%, and a Cl content of between about 0.8 and 6%. In another preferred embodiment, said base glass will contain between about 60 and 82% $SiO_2$ and between about 3 and 10% $TiO_2$.

In most preferred embodiments of the present invention, the base glass consists essentially of, in mole percent on the oxide basis, of about 12-16% total of $Li_2O+Na_2O+K_2O$, 0.8-6% Cl, 3-10% $TiO_2$, 4-10% ZnO, 0.5-5% $Al_2O_3$, and 68-75% $SiO_2$ where the $TiO_2$ functions as a photosensitivity-inhibitor and as a RS-suppressant agent.

The base glass is prepared from glass melts. Preferably, the glass melts are prepared in an atmosphere containing at least a partial pressure of chlorine and/or chlorides.

Silver is incorporated in the integral ion-exchange surface layer by ion-exchange. Preferably the portion of Ag+ ions are present as glass-network-modifiers in the integral ion-exchange layer in amounts up to 25% $Ag_2O$ on the mole percent oxide basis, and the portion of Ag+ ions directly associated with halides in said integral ion-exchange surface layer ranges up to 6% $Ag_2O$ on the mole percent oxide basis.

In one embodiment of the present invention, the ion-exchange integral surface layer contains at least a trace amount of ion-exchange cuprous ions, and/or cupric ions and/or cuprous oxide and/or cupric oxide.

The glass article prepared from the base glass by ion exchange as described herein is insensitive to at least a spectral portion of actinic radiation. Preferably, the glass article is insensitive to actinic radiation of about 400 nm and/or longer wavelengths. More preferably, the glass article will be insensitive to actinic radiation of about 300 nm and/or longer wavelengths.

The glass articles are sensitive to high energy beams. The depth of the colored images delineated and/or replicated by the high energy beam is limited by the thickness of said ion exchange integral surface layer and/or by the penetration depth of the high energy beam. Preferably, the integral ion exchange surface layer (IIES layer) is more than about 0.1 micrometers. More preferably, the IIES layer is less than about 10 micrometers in thickness. Most preferably, the IIES layer is less than about 3 micrometers. The preferred content of the silanol groups and/or water in the integral surface layer ranges between about 0.1-6% by weight $H_2O$.

The ion exchange is carried out in aqueous solution containing Ag+ ions having a concentration ranging from $10^{-4}$ mole per liter up to the concentration of a saturated $AgNO_3$ solution and H+ ions ranging from about $10^{-6}$ to 5 moles/per liter. A preferred ion exchange solution contains about 200 g $AgNO_3$/per liter of the aqueous solution and is acidified with about 10-200 cc of 16N $HNO_3$/per liter of the aqueous solution.

Another preferred aqueous ion exchange solution contains about 20 gms $AgNO_3$/per liter of the aqeuous solution and is acidified to a pH between about 1 to 6. Preferably, the aqueous ion-exchange solution is a buffered solution having more or less a constant pH throughout the ion exchange reaction. When the pH of the ion-exchange aqueous solution is kept at a value of more than about 2, preferably, the aqueous solution has a [Ag+]:[H+] mole ratio of more than 5, and most preferably, the mole ratio of [Ag+]:[H+] in the aqueous ion-exchange solution is more than 50. In one preferred embodiment of the present invention, the pH of the aqueous ion-exchange solution is buffered at a constant value ranging between about 2 and 3, and the Ag+ ion concentration of the solution ranges between about 0.01 and 2 moles/per liter of solution. The aqueous ion exchange solution can be buffered due to the presence of $Cu_2O$ and/or $Cu^{++}$ ions in a strong acid-containing solution. Preferably, the aqueous ion-exchange solution also contains Li+ ions up to the concentration of a saturated $LiNO_3$ aqueous solution. Said aqueous ion-exchange solution preferably contains up to saturation of dissolved $SiO_2$ and/or silica gel and/or water soluble silicates and/or other constituent cations of the base glass.

One of the products of the present invention is a high energy beam recording medium exhibiting insensitivity and/or inertness to actinic radiation, colored images delineated and/or replicated therein by said high energy beam are also insensitive and/or inert to the actinic radiation, said recording medium comprises a supported thin film of glass matrix having Ag+ ions therein and/or a large number of AgCl-containing and/or $Ag_2O$-containing and/or Ag+ ion-cntaining microcrystals and/or microphases therein, containing at least one of photosensitivity-inhibitors and/or RS-suppression agents, at least one glass network former, and up to saturation of chloride in the glass matrix, total concentration of glass network modifiers including Ag+, H+ and alkali metal ions ranges between about 3-25% on the mole percent oxide basis, a portion of Ag+ ions being directly associated with halides in said glass matrix, said portion ranges up to 6% $Ag_2O$ on the mole percent oxide basis; whereas the photosensitivity-inhibitors are necessary constituents of chloride-containing glass matrix, and the RS-suppression agents are necessary constituents of chloride-free glass matrix, the photosensitivity-inhibitors as well as the RS-suppression agents are usually included in halide-containing glass matrix.

DESCRIPTION OF THE INVENTION

Specific Embodiments

Figure 1:
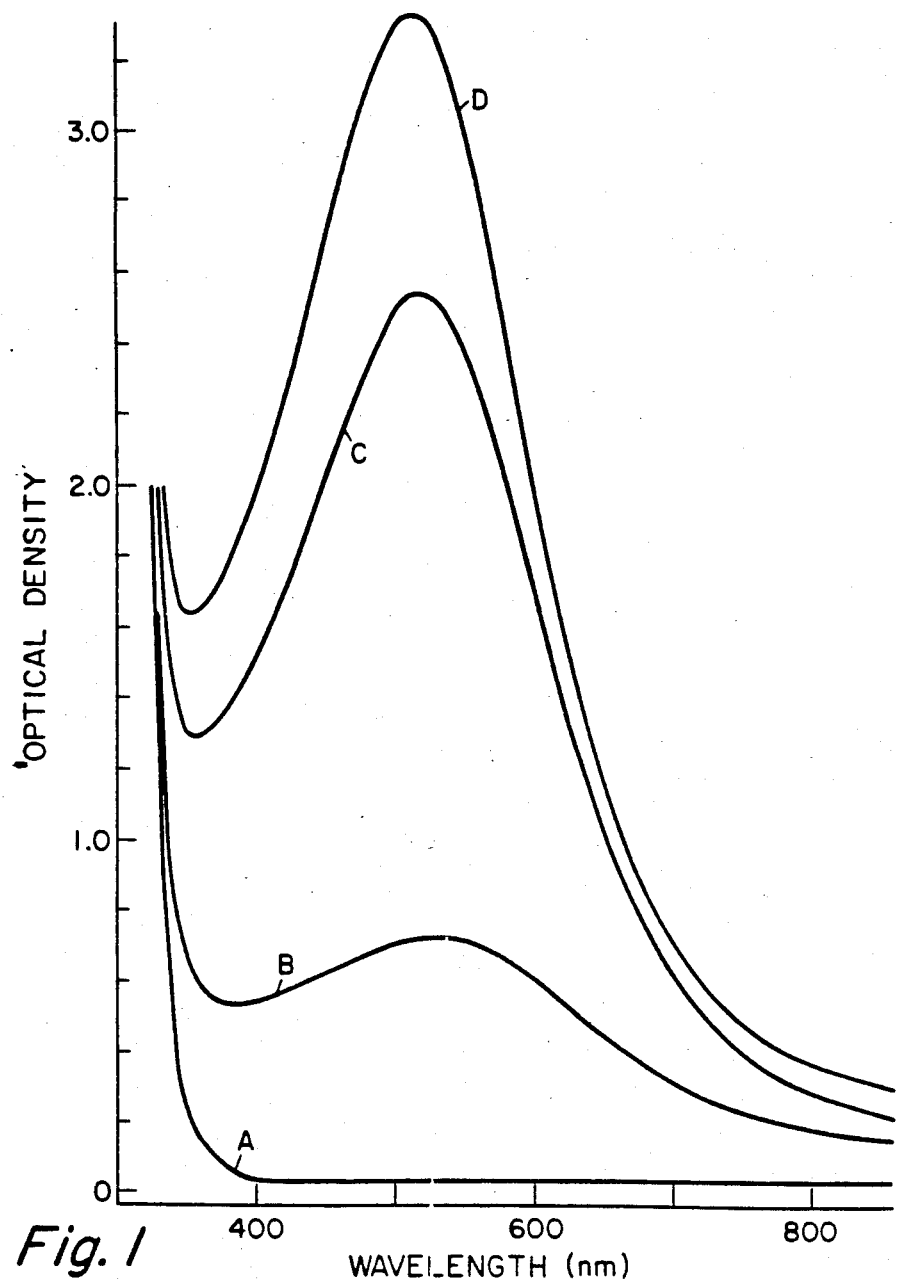
FIG. 1 graphically records the spectral absorption curves of a glass plate sample after being exposed to E-beam charge densities of 0, $3.2 \times 10^{-5}$, $1.6 \times 10^{-4}$ and $3.2 \times 10^{-4}$ coulomb/cm$^2$ at 35 kv.

Table I sets forth a group of batch compositions which help to illustrate the parameters of the present invention. The components of the base glass are expressed in approximate mole percent on the oxide basis. The compositions are stated to be in approximate mole percent since the proportions cited reflect direct calculations from weight percent of the batch ingredients, e.g. Na$_2$O from Na$_2$CO$_3$ and/or NaNO$_3$, and the valves have not been normalized to a basis of 100%. Nevertheless, the sum of the individual ingredients so closely approaches 100 that, for practical purposes, the amounts listed can be deemed to represent a mole percent. The actual batch ingredients (other than halides) can comprise any materials, either the oxides or other compounds, which, when melted together, will be converted into the desired oxide composition in the proper proportions. The halides in the batch were commonly included in alkali metal containing compounds.

TABLE I

| Glass No. | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| SiO$_2$ | 72.5 | 71.4 | 70.0 | 72.9 | 71.8 | 70.7 | 69.1 | 67.5 | 72.3 | 72.1 | 71.9 | 72.7 | 72.5 | 72.3 | 70.9 | 73.2 | 68.9 | 69.3 | 71.0 | 70.3 |
| Li$_2$O |  |  |  | 4.1 | 4.0 | 3.9 | 4.0 | 4.0 |  |  |  | 4.0 | 4.0 | 4.0 | 4.2 | 4.1 | 9.2 | 4.0 | 4.1 | 4.0 |
| Na$_2$O | 10.9 | 10.7 | 10.5 | 6.4 | 6.3 | 6.2 | 6.3 | 6.3 | 10.8 | 10.8 | 10.8 | 6.4 | 6.4 | 6.4 | 6.6 | 6.0 | 6.1 | 6.3 | 6.4 | 6.7 |
| K$_2$O | 3.4 | 3.4 | 3.3 | 3.4 | 3.4 | 3.3 | 3.4 | 3.4 | 3.4 | 3.4 | 3.4 | 3.4 | 3.4 | 3.4 | 3.6 | 3.4 |  | 3.4 | 3.5 | 3.4 |
| TiO$_2$ | 1.5 | 3.0 | 4.4 | 1.50 | 3.0 | 4.4 | 5.9 | 7.4 | 1.5 | 1.5 | 1.5 | 1.5 | 1.5 | 1.5 | 1.6 | 1.51 | 3.8 | 4.5 | 1.5 | 1.5 |
| Ta$_2$O$_5$ |  |  |  |  |  |  |  |  | 0.27 | 0.5 | 0.8 | 0.27 | 0.54 | 0.8 | 1.1 |  |  |  | 0.57 | 0.56 |
| Al$_2$O$_3$ | 1.2 | 1.2 | 1.2 | 1.2 | 1.2 | 1.2 | 1.2 | 1.2 | 1.2 | 1.2 | 1.2 | 1.2 | 1.2 | 1.2 | 1.3 | 1.2 | 1.2 | 2.3 | 2.4 | 2.4 |
| ZnO$_2$ | 7.3 | 7.2 | 7.1 | 7.4 | 7.2 | 7.1 | 7.2 | 7.2 | 7.3 | 7.3 |  |  |  |  |  |  |  |  |  |  |
| Cl | 3.1 | 3.1 | 3.0 | 3.1 | 3.1 | 3.0 | 3.0 | 3.1 | 3.1 | 3.1 | 3.1 | 3.1 | 3.1 | 3.1 | 3.2 | 3.1 | 3.8 | 3.0 | 3.1 | 3.7 |
| ZnO |  |  |  |  |  |  |  |  |  |  | 7.3 | 7.3 | 7.3 | 7.3 | 7.6 | 7.4 | 6.9 | 7.2 | 7.4 | 7.3 |

| Glass No. | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|
| SiO$_2$ | 72.2 | 72.6 | 69.9 | 70.9 | 74.0 | 73.8 | 68.3 | 61.8 | 59.8 | 58.8 | 70.7 | 69.8 | 69.8 | 69.8 | 66.2 | 62.4 | 69.5 | 69.5 | 69.5 | 69.9 |
| Li$_2$O |  | 4.0 | 4.0 | 4.0 | 4.1 |  |  |  |  |  | 3.9 | 3.9 | 3.9 | 3.9 | 3.9 | 6.3 | 6.2 | 6.2 | 6.2 | 6.2 |
| Na$_2$O | 10.8 | 6.4 | 6.3 | 6.7 | 6.5 | 10.9 | 10.3 | 10.3 | 10.3 | 10.3 | 6.2 | 6.2 | 6.2 | 6.2 | 6.2 | 6.2 | 6.2 | 6.2 | 6.2 | 6.1 |
| K$_2$O | 3.4 | 3.4 | 3.4 | 3.4 | 3.5 | 3.4 | 3.2 | 3.2 | 3.2 | 3.2 | 3.3 | 3.3 | 3.3 | 3.3 | 3.3 | 2.3 | 2.3 | 2.3 | 2.3 | 2.3 |
| TiO$_2$ | 1.5 | 1.5 | 4.5 | 1.5 |  |  |  | 1.5 | 4.5 | 1.5 | 1.5 | 1.5 | 4.0 | 1.5 | 1.5 | 0.5 | 4.4 | 4.4 | 4.4 | 4.2 |
| La$_2$O$_3$ |  |  |  |  |  |  |  |  | 4.0 |  | 4.0 | 2.5 |  |  |  | 1.5 |  |  |  |  |
| Ta$_2$O$_5$ |  |  |  | 0.56 |  |  |  |  |  |  | 0.5 | 1.5 |  | 1.0 | 1.0 |  |  |  |  |  |
| WO$_3$ |  |  |  |  |  |  |  |  |  | 0.5 |  |  | 0.5 |  |  |  |  |  |  |  |
| ZrO$_2$ | 1.0 | 1.0 | 0.6 | 0.64 |  |  |  | 1.0 | 3.5 | 4.0 |  |  |  |  |  |  |  |  |  |  |
| Al$_2$O$_3$ | 0.6 | 0.6 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| ZnO | 7.3 | 7.3 | 7.2 | 7.3 | 7.5 | 7.4 | 6.9 | 6.9 | 6.9 | 6.9 | 3.6 | 4.0 | 4.0 | 4.0 | 7.1 | 7.2 | 7.1 | 7.1 | 7.1 | 7.0 |
| Cl | 3.1 | 3.1 | 3.0 | 3.7 | 3.1 | 3.1 | 3.1 | 3.1 | 3.1 | 3.1 | 3.0 | 3.0 | 3.0 | 3.0 | 3.0 | 3.0 | 3.0 | 3.0 | 3.0 | 1.5 |
| B$_2$O$_3$ |  |  |  |  |  |  | 7.2 | 7.2 | 7.2 |  |  |  |  |  |  |  |  |  |  |  |
| P$_2$O$_5$ |  |  |  |  |  |  |  |  |  | 7.2 |  |  |  |  |  |  |  |  |  |  |
| Nb$_2$O$_5$ |  |  |  |  |  |  |  |  |  |  |  |  |  |  | 2.0 |  |  |  |  |  |
| PbO |  |  |  |  |  |  |  |  |  |  | 3.5 |  |  |  |  |  |  |  |  |  |
| Y$_2$O$_3$ |  |  |  |  |  |  |  |  |  |  |  | 1.5 |  |  |  |  |  |  |  |  |
| CaO |  |  |  |  |  |  |  |  |  |  |  | 4.0 |  |  |  |  |  |  |  |  |
| MgO |  |  |  |  |  |  |  |  |  |  |  |  |  | 4.0 |  | 10.8 |  |  |  |  |
| SrO |  |  |  |  |  |  |  |  |  |  |  |  | 4.0 |  |  |  |  |  |  |  |
| ZrO$_2$ |  |  |  |  |  |  |  |  |  |  |  |  |  |  | 1.0 |  |  |  |  |  |
| BaO |  |  |  |  |  |  |  |  |  |  |  |  |  |  | 4.0 |  |  |  |  |  |
| Br |  |  |  |  |  |  |  |  |  |  |  |  |  |  |  |  |  | 0.2 |  | 1.5 |
| I |  |  |  |  |  |  |  |  |  |  |  |  |  |  |  |  |  |  | 0.15 |  |

| Glass No. | 41 | 42 | 43 | 44 | 45 | 46 | 47 | 48 | 49 | 50 |
|---|---|---|---|---|---|---|---|---|---|---|
| SiO$_2$ | 70.4 | 70.3 | 70.4 | 70.4 | 70.4 | 69.3 | 72.5 | 72.7 | 70.8 | 59.3 |
| Li$_2$O | 4.3 | 7.1 | 4.3 | 4.3 | 4.3 | 7.3 |  |  | 4.9 | 9.4 |

TABLE I-continued

| | | | | | | | | | | |
|---|---|---|---|---|---|---|---|---|---|---|
| Na₂O | 6.2 | 3.4 | 4.8 | 4.8 | 4.8 | 6.3 | 10.9 | 6.4 | 5.1 | 8.2 |
| K₂O | 3.3 | 3.5 | 4.8 | 3.4 | 3.3 | 1.3 | 3.4 | 7.9 | 3.4 | 3.3 |
| TiO₂ | 4.4 | 4.4 | 4.4 | 4.4 | 4.4 | 4.4 | | | 4.5 | 4.4 |
| Ta₂O₅ | | | | | | | | | 1.5 | 1.5 |
| Y₂O₃ | | | | | | | 1.5 | | | |
| Nb₂O₅ | | | | | | | | 1.3 | | |
| ZrO₂ | | | | | | | | | 1.5 | 2.5 |
| Al₂O₃ | 1.2 | 1.2 | 1.2 | 1.2 | 1.2 | 1.2 | 1.2 | 1.2 | 1.2 | 1.2 |
| ZnO | 7.1 | 7.1 | 7.1 | 7.1 | 7.1 | 7.1 | 7.3 | 7.3 | 7.1 | 7.1 |
| Cl | 3.0 | 3.0 | 3.0 | 3.0 | 3.0 | 3.0 | 3.1 | 3.1 | | 3.1 |
| Rb₂O | | | | 1.4 | | | | | | |
| Cs₂O | | | | | 1.4 | | | | | |

Inasmuch as it is not known with which cation(s) the halides are combined in the glass melt, they are simply reported as F, Cl, Br, and I in accordance with conventional practice in the glass art.

The glasses recited in Table I can be prepared in the following manner. The batch ingredients were thoroughly blended together, in a ball mill to assist in securing a homogeneous melt, and the mixture deposited in platinum crucibles. The crucibles were then placed in a laboratory furnace operating at about 1300°–1550° C. The batches were melted for 2–24 hours, and the melts were then poured into patties and annealed.

Volatilization of halides can be quite high during melting, particularly where temperatures in the upper extreme of the melting range are employed. Thus, losses of about 20 to 60% are common. Besides being the essential ingredients, halides also perform the function as a fining agent for the glass melts.

It will be appreciated, of course, that large melts of glass can be made in pots or continuous melting units in accordance with known commercial glass making practice. Where glass of optical quality is to be produced from commercial continuous melting tanks, stirring of the melt will be conventionally employed. Volatilization of halides in such commercial melting practices can be held below 20% and with care, below 10%. Retention of halides can be further increased via melting in halogen-containing atmosphere.

Glass articles of various compositions including those listed in Table I in the form of plates, were cut from the patties and then ground and polished to thicknesses of 1–2 mm. These plates were then subjected to ion exchange reactions for the purpose of replacing at least a portion of the alkali metal ions within a surface layer of the glass plates by silver ions.

Hydration and/or an exchange of H+ and/or H₃O+ ions for alkali metal ions in at least the surface of the glass plates is expected to take place when the ion exchange reactions are carried out in an aqueous solution containing Ag+ ions.

In cases where other ingredients such as cupric and/or cuprous oxide and/or lithium ion are included in the aqueous ion exchange solution, additional reactions to exchange the alkali metal ions in the surface layer of the parent silicate glass by the other cations in the aqueous solution are also expected to take place, but to a lesser extent.

The ion-exchange reactions were usually accomplished as follows. The glass plates were immersed into an aqueous ion-exchange solution containing Ag+ ions and other ingredients, the glass samples together with the aqueous solution were sealed in an autoclave, and heated to a desired temperature usually above 200° C. and held at the reaction temperatures for a duration of more than about 1 min. Thereafter, the samples were removed from the autoclave and washed with distilled water. Various properties of the ion-exchanged products are then evaluated.

It has been found that the base glass composition has a profound effect on the properties of the ion-exchanged products regarding particularly to the E-beam sensitivity and the insensitivity and/or inertness to actinic radiations, and that addition or subtraction of certain constituents even in small concentrations often alter many or all of the properties of the ion-exchanged products.

It has been determined that the production of E-beam sensitive glass articles exhibiting insensitivity and/or inertness to uv radiation and longer wavelengths, involves a complex combination of relationships among various components of the base glass composition, the ingredients of the ion exchange solution and the conditions, e.g. temperature and duration, of the ion exchange reactions. Nevertheless there exists a very wide range of glass compositions in the general composition fields of alkali metal silicate glasses that are operable for the products of the present invention.

It has also been found that the sensitivity to electron beams as well as the insensitivity and/or inertness to actinic radiation of the ion-exchanged products are strongly dependent upon the ingredients of the aqueous ion-exchange solution, in particular, the concentrations of silver ion, hydrogen ion and cuprous oxide.

The concentration of silver ions in the aqueous ion-exchange-solution operable in the present invention is found to range from less than $10^{-3}$ mole/liter up to the concentration of a saturated AgNO₃ aqueous solution, and the concentration of hydrogen ion/hydronium ion is operable from $10^{-6}$ to more than 3 moles per liter of the aqueous ion-exchange solution. It is determined that the optimum concentration of silver ions in the aqueous ion-exchange solution in general increase with the concentration of hydrogen ion for obtaining the desired products of the present invention. The hydrogen ions are added to the aqueous ion-exchange-solution in the form of one or a combination of acids such as HNO₃, H₂SO₄, HCl, HClO₃, HClO₄ and acetic acid.

It has also been found that the concentration of Ag+ ions in the ion-exchanged surface layer can be varied from practically zero up to more than 50% by weight of Ag₂O through various combinations of the concentrations of Ag+ ions and H+ ions in the aqueous ion exchange solution. One way to ensure a large concentration of Ag+ ions within an ion-exchanged surface layer is to utilize an aqueous ion-exchange solution having a large concentration of Ag+ ions therein, e.g. greater than about 100 g AgNO₃/liter of the aqueous solution. Another way to ensure a large concentration of Ag+ ions within an ion exchanged surface layer is to employ an aqueous ion exchange solution having a large value of the mole ratio $[Ag^+]:[H^+]$, e.g. in excess of 10 which is readily obtainable by buffering the aqueous solution at a PH value in excess of about 2.

It has been determined that cuprous oxide can be advantageously added to the aqueous ion-exchange-solution to cause the solution to buffer at a desirable PH, particularly in the PH range of 1 to 3, and most effectively in the range of 2 to 3. It has been further determined that the inclusion of cuprous and/or cupric ions in the aqueous ion-exchanged-solution has significant effects on the E-beam exposure-induced coloration and the E-beam sensitivity of the ion exchanged products of the present invention.

It has also been determined that the sensitivities of the ion-exchanged glasses to electron beams and their inertness to radiations including uv radiation and longer wavelengths, are strongly dependent on the temperature of the ion exchange reaction. Temperatures in excess of 150° C. up to the softening point of the ion exchanged surface glass layer and/or up to the strain point of the anhydrous base glass are particularly useful for obtaining the products of the instant invention. The duration of the ion-exchange-reactions to obtain a thin ion-exchanged surface layer of e.g. less than about 3 micrometers, decreases with an increasing temperature, and at times, places a practical upper limit on the temperature of the ion exchange reactions.

As a matter of convenience, the ion exchange reactions of the present invention will preferably be carried out in an autoclave, because such an apparatus permits relatively easy control of the ion-exchange temperature, pressure, and atmosphere. Gases including $Cl_2$, $N_2$, air and Ar can be advantageously added, usually at room temperature, to the vapor phase above the aqueous ion-exchange solution in the autoclave.

The filling factor which is herein defined as the fractional volume of the autoclave occupied by the aqueous ion-exchange-solution at room temperature, is another parameter to be observed. The maximum allowable filling factor being herein defined as the filling factor at which the volume of the vapor phase in the autoclave diminishes at the ion-exchange-temperature, should never be approached for safety reasons. However, when the filling factor is kept excessively below the maximum allowable filling factor, the concentration of the ingredients of the aqueous ion-exchange-solution at elevated temperatures can be significantly different from those at room temperature.

Ion exchanged products of the present invention are high energy-beam sensitive glass articles, exhibiting insensitivity and/or inertness to actinic radiation, consisting of a body portion and an integral ion-exchanged surface layer exhibiting coloring and/or darkening effects upon exposure to said high energy beam. The body portion retains the base glass composition, examples of which have been listed in Table I. As will be apparent from the specification in the later paragraphs, the high energy-beam is deemed to include electron-beams, ion beams, molecular beams, X-ray and far-uv, and the actinic radiation is deemed to include uv radiation and/or longer wavelengths. The terminology "electron beam" is herein denoted as E-beam.

Exemplary composition 46 of Table I above in the form of glass plates 2 mm in thickness, was ion exchanged at 320° C. for 30 minutes in an aqueous solution containing 200 g $AgNO_3$+55.6 g $Cu(NO_3)_2$+200 g $LiNO_3$+36.7 cc of 16N $HNO_3$+2.2 g silica gel/liter of the aqueous solution. The ion exchanged glass plates produced accordingly are colorless and have a transmittance of 90.6% throughout the visible and near infrared spectral range. Said ion exchanged glass plates were inspected for surface quality and surface figure.

Examination under a microscope showed that the surface quality of said ion exchanged glass plates remain substantially the same as the ground and polished surface before the ion exchange reactions. The fringe patterns observed through a contacting test flat remain substantially the same before and after the ion exchange reactions. In other words, no distortions of the surface figure of said ion exchanged glass plates are detected as a result of the ion exchange treatment.

Portions of said ion exchanged glass plates of the examplary glass composition 46 of Table I above were exposed to radiation of mercury g-line at 436 nm for a duration of 25 hours at an intensity level of 105 mw/cm$^2$. The transmittance of visible light through the blue light exposed area remained substantially constant at a value of 90.6% before and after the blue light exposure. Through exposures to white light having an intensity of 1.2 watt/cm$^2$, it was further determined that said ion-exchanged product of the examplary glass composition 46 of Table I above is insensitive and/or inert to radiation in the entire spectral ranges of visible light and longer wavelengths.

Said solution ion exchanged glass plates were exposed to focused electron beams of JEOL JSM 35C Scanning Electron Microscope (SEM). A focused electron beam having a current of $10^{-7}$ amperes was employed at four levels of accelerating voltages 15, 20, 25, and 35 kv, to raster scan square areas of 1.2 mm×1.2 mm. A series of E-beam exposures corresponding to charge densities ranging from $10^{-6}$ to $10^{-3}$ coulomb/cm$^2$ at each accelerating potential was done through the variation of exposure-durations. Uniformly darkened squares, 1.44 mm$^2$ in area, of magenta color varying in hue and intensity ranging in the order of increasing E-beam dosages from light reddish magenta to dark reddish magenta to reddish black were observed as soon as the sample was taken out of the vacuum chamber of SEM. Apparently, the sample was darkened instantaneously upon exposure to the high voltage electron-beam, and optical densities in excess of 3 are obtained without resorting to any subsequent chemical or physical development steps.

To prevent static charge build up on the glass surface during E-beam exposures, a conductive coating, e.g. of about 100 Å layer of Au or about 1000 Å layer of carbon is in general vacuum deposited on the ion exchanged glass surface prior to E-beam exposure. The conductive layer is removed mechanically and/or chemically after the E-beam exposure.

After the removal of the conductive coating, optical densities of the E-beam darkened areas were measured as a function of wavelength from 300 nm to 900 nm using a Carrier 219 uv-visible spectrophotometer which is marketed by Varian Associates, Inc. FIG. 1 represents the spectral absorption curves displayed by said ion-exchanged glass sample of the exemplary glass composition 46 of Table I above, before and after being darkened by the focused electron beam having a 35 kv accelerating voltage. The charge density impinging on the sample areas whose spectral absorption represented by curves A, B, C and D are 0, $3.2 \times 10^{-5}$, $1.6 \times 10^{-4}$ and $3.2 \times 10^{-4}$ coulomb/cm$^2$ respectively.

An E-beam darkened area having an optical density of 2.04 at 436 nm was exposed to mercury line at 436 nm for a duration of 83 hours at an intensity level of 14.7 mw/cm$^2$, the optical density at the probing wavelength 436 nm was not changed by the blue light exposure. It was further determined that the spectral absorption curve and the color of the E-beam darkened area in said ion-exchanged product of the exemplary glass composition 46 of Table I are also unchanged by the exposure to the actinic radiation at 436 nm. Through exposures to white lights from a mercury arc as well as from tungsten halogen lamps it was determined that the E-beam darkened areas in said ion exchanged glass plates of the exemplary glass composition 46 of Table I above are inert to radiation in the entire spectral ranges from near ultraviolet throughout visible and longer wavelengths.

Characteristic curves of E-beam darkening are herein defined as the plots of the information bearing optical densities at a given wavelength, as a function of charge densities in log scale. The information bearing optical density is defined herein as the E-beam exposure-induced optical density, i.e. the net optical density which is obtainable from spectral absorption curves such as those of FIG. 1 by subtracting the optical density, due mainly to reflection, of the unexposed area from the optical density of the E-beam exposed area. Thus the information bearing optical density is zero at nil dosage of E-beam exposures. The characteristic curves of E-beam darkening of said ion exchanged glasses of the examplary glass composition 46 of Table I above at the wavelength of the absorption peak, at 436 nm and at 546 nm are illustrated by curve D of FIG. 4, curve C of FIG. 5 and curve B of FIG. 6 respectively.

Figure 2:
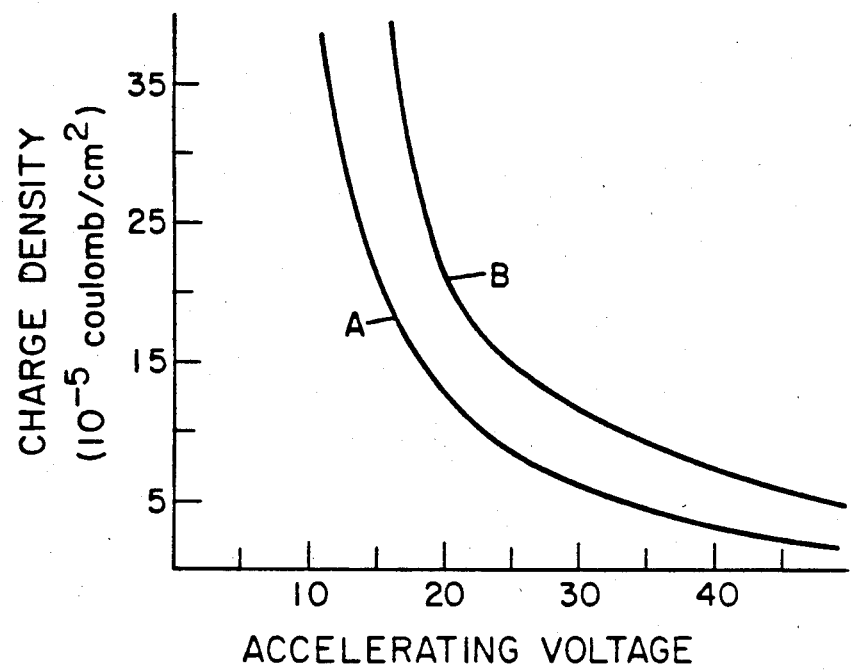
FIG. 2 graphically illustrates the required E-beam charge density to secure information-bearing optical density of 1.2 and 2.0 as a function of the accelerating voltage.

FIG. 2 illustrates the effect of the E-beam accelerating potential on the charge density that is required to secure a given optical density in said ion exchanged glass sample of the examplary composition 46 of Table I above. The E-beam exposure-induced optical density at the wavelength of the absorption peak is shown in this figure as the variable parameter in going from curve A to curve B. Curves A and B of FIG. 2 represent the required charge densities to secure information-bearing optical densities of 1.2 and 2 respectively at various accelerating voltages.

The functional form of the voltage dependence, i.e. the shape of the curves such as those shown in FIG. 2, are functions of glass compositions, ingredients of ion exchange solutions and the conditions of ion exchange reaction. Nevertheless, it is generally true that the E-beam sensitivity increases with the accelerating voltage up to at least about 35 kv.

The width of E-beam darkened lines was estimated from photomicrographs of isolated lines in the glass plates of the exemplary glass composition 46. The line width was about 1 micrometer. The dependence of line width on the accelerating voltages is expected, but the precision of the photomicroscopic measurements did not result in an unambiguous determination of submicrometer line widths.

The spectral absorption curves C and D of FIG. 1 have one absorption band in the visible spectral range, it is centered around 510 nm and has a band width of about 250 nanometers. Consequently, the E-beam exposed areas within said ion-exchanged glass plate of the examplary glass composition 46 absorb strongly the green portion of the visible light and transmit more in the red than in the blue portion of the visible light, and manifest themselves as reddish magenta to reddish black in color.

It has been determined that the band width and the center wavelength of the absorption band, as well as the E-beam exposure-induced coloration can be altered, e.g. according to the requirements of desirable applications, through variations in the parent anhydrous glass compositions and/or the ingredients of aqueous ion exchange solution and/or the conditions, e.g. temperature and duration of the ion exchange reactions. This is based on the finding that the ion exchanged glass articles provided in accordance with the present invention can exhibit strong E-beam exposure-induced absorption band centering at any wavelength ranging from 390 nm to 700 nm, and the absorption band width may be varied from less than 200 nanometers to more than 400 nanometers. Consequently, the ion exchanged products of the present invention can display various E-beam exposure-induced colorations including yellow, orange, beige, brown, red, reddish magenta, reddish black, magenta, bluish magenta, purple blue, violet gray, violet black, bluish gray, bluish black, gray and black.

Figure 3:
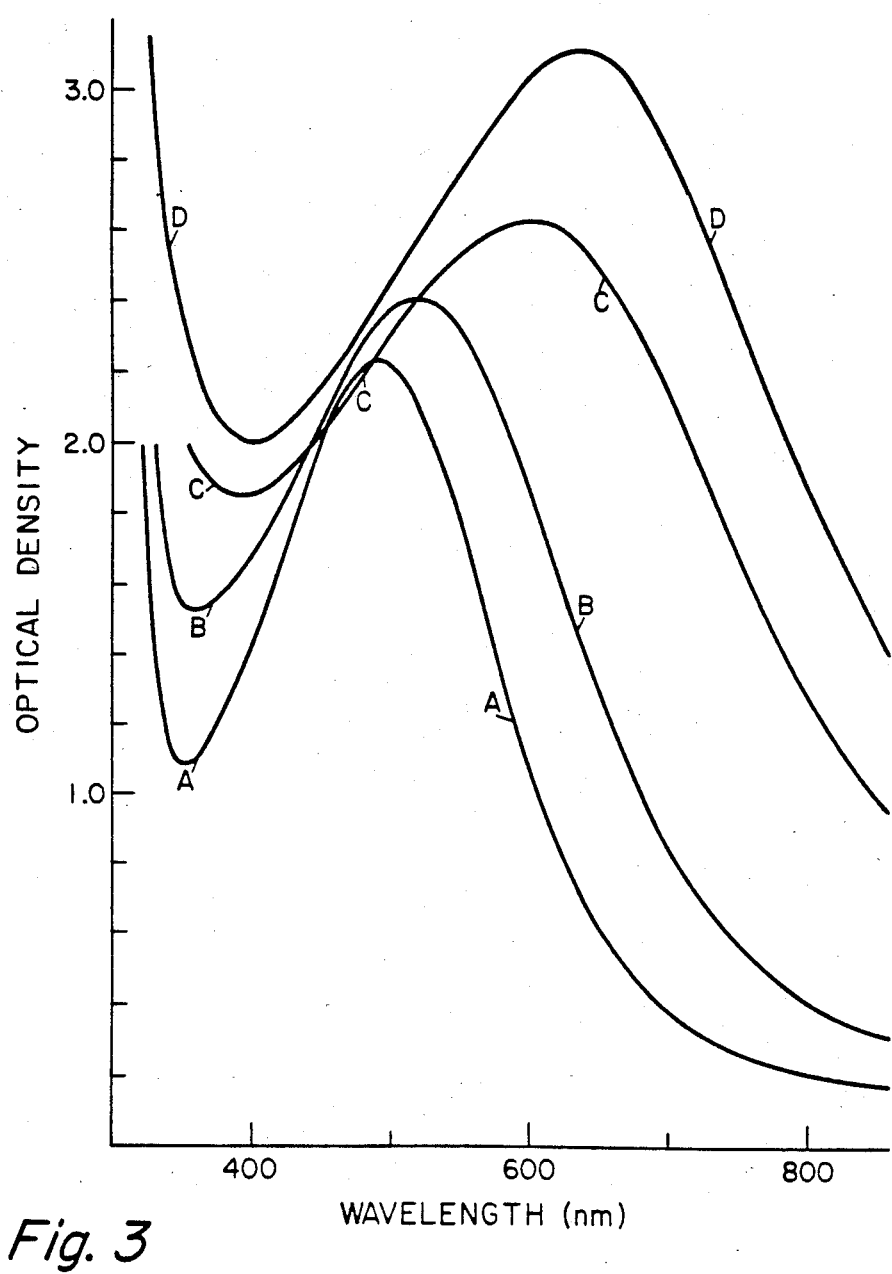
FIG. 3 graphically portrays the E-beam exposure-induced absorption curves representing some of the various ion-exchanged products of the present invention and illustrates the variety of the E-beam exposure-induced colorations exhibited thereby.

FIG. 3 of the drawing contains the E-beam exposure-induced absorption curves representing some of the various ion-exchanged products of the present invention and illustrates the variety of the E-beam exposure-induced colorations exhibited thereby.

Curve A of FIG. 3 represents the absorption spectrum of a 25 kv E-beam induced coloration exhibited by the exemplary glass composition 37 of Table I above which has been ion-exchanged at 320° C. for 30 minutes in an aqueous solution containing 200 g AgNO$_3$+70 cc of 16N HNO$_3$+55.6 g Cu(NO$_3$)$_2$+200 g Li NO$_3$+1.67 g silica gel/liter of the aqueous solution. Curve B of FIG. 3 illustrates the absorption spectrum of the 35 kv E-beam induced coloration displayed by the exemplary composition 41 of Table I above, which has been immersed into an aqueous solution consisting of 20 g AgNO$_3$+10.8 cc of 16N HNO$_3$+40.9 g Cu(NO$_3$)$_2$+5.7 g Cu$_2$O+200 g LiNO$_3$+1.1 g silica gel/liter of the aqueous solution, for 30 minutes at 320° C. Curves C and D of FIG. 3 depict the absorption spectra of the 35 kv E-beam exposure-induced colorations exhibited by the exemplary glass compositions 6 and 5 respectively of Table I above, which have been ion exchanged at 310° C. for 40 minutes in an aqueous solution composed of 40 g AgNO$_3$+8.9 cc of 16N HNO$_3$+200 g LiNO$_3$+4.4 g Cu$_2$O+40.9 g Cu(NO$_3$)$_2$+1.1 g silica gel/liter of the aqueous solution. The E-beam induced colorations corresponding to curves A, B, C and D are red, magenta, violet gray and bluish black respectively.

It has been found that a variety of E-beam exposure-induced colorations can be obtained with a given glass composition within the scope of this invention through variations in the concentrations and/or ingredients of the ion exchange solution and/or the temperature and duration of the ion exchange reactions. It has also been found that a variety of E-beam exposure induced colorations can be obtained using the same aqueous ion-exchange solution and reaction temperature and duration through the variation of the glass compositions. Consequently any given E-beam exposure-induced coloration cited above is attainable in a number of ways from various combinations of the glass composition, concentrations and ingredients of the ion exchange solution and the reaction temperature and duration.

Figure 4:
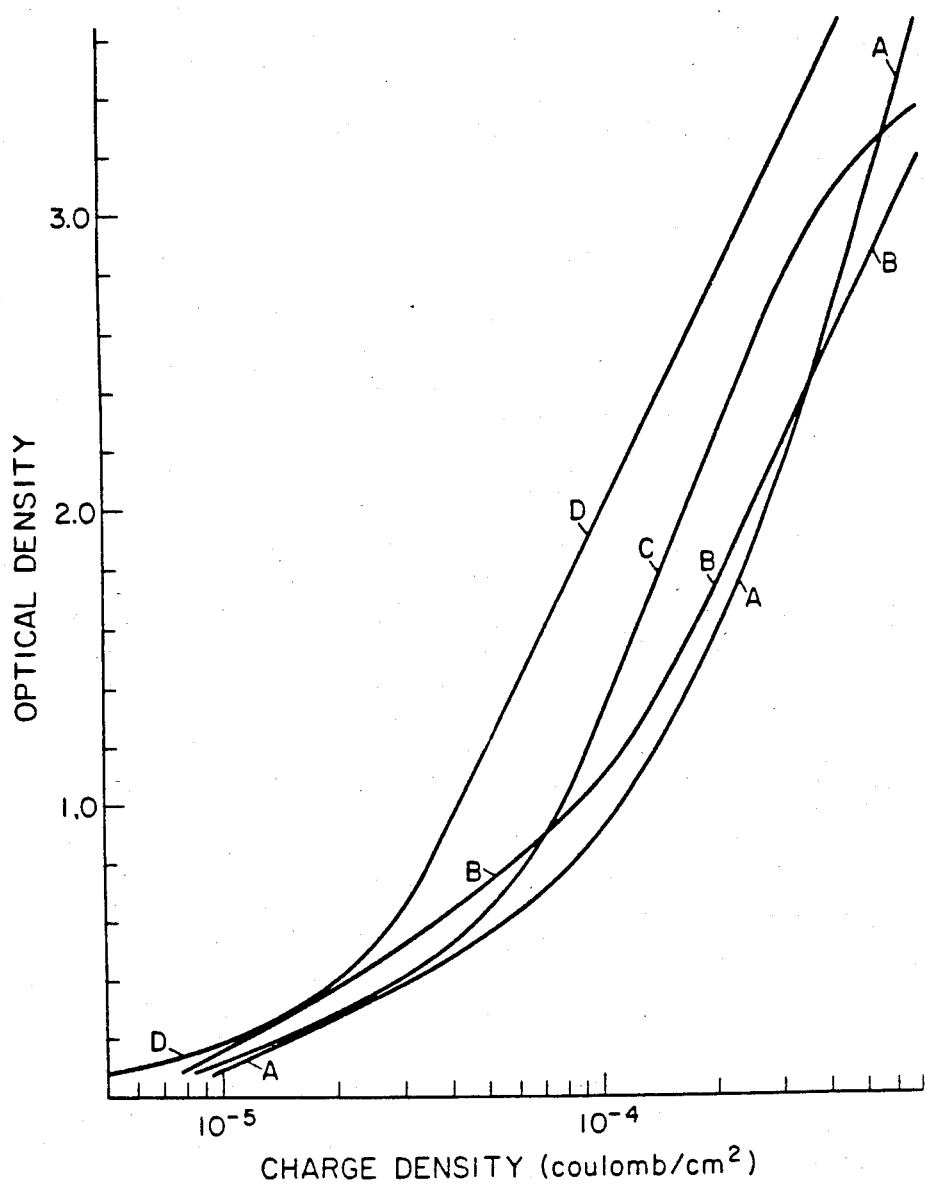
FIG. 4 graphically sets forth some of the general characteristic curves of E-beam darkening at the peak absorption wavelengths.

FIG. 4 depicts the general characteristic curves, of the E-beam exposure-induced absorption at peak wavelengths, displayed by some of the ion exchanged products of the present invention after being darkened by electron beams with 35 kv accelerating potential.

Curve A of FIG. 4 represents the characteristic curve of the examplary glass composition 1 of Table I above, which has been ion exchanged at 310° C. for 40 minutes in an aqueous solution consisting of 40 g $AgNO_3$+200 g $LiNO_3$+4.4 g $Cu_2O$+40.9 g $Cu(NO_3)_2$+8.9 cc of 16N $HNO_3$+1.1 g silica gel/liter of the aqueous solution. The peak wavelength of the E-beam exposure-induced absorption within said ion exchanged surface layer of the exemplary glass composition 1 was red shifted from 560 nm to 590 nm, as the E-beam exposure-dosage was increased from $8\times10^{-5}$ to $6.4\times10^{-4}$ coulomb/$cm^2$.

Curve B of FIG. 4 represents the characteristic curve of exemplary glass composition 2 of Table I above, which has been immersed for 60 minutes at 310° C. in an aqueous solution composed of 20 g $AgNO_3$+200 g $LiNO_3$+4.4 g $Cu_2O$+40.9 g $Cu(NO_3)_2$+7.55 cc of 16N $HNO_3$+1.1 g silica gel/liter of the aqueous solution. The peak wavelength of the E-beam exposure-induced absorption was red shifted from 570 nm to 612 nm, as the E-beam exposure dosage was increased from $8\times10^{-5}$ to $6.4\times10^{-4}$ coulomb/$cm^2$.

Curve C and D of FIG. 4 represents the characteristic curves of exemplary compositions 37 and 46 respectively of Table I above, which have been immersed into an aqueous solution consisting of 200 g $AgNO_3$+36.7 cc of 16N $HNO_3$+55.6 g $Cu(NO_3)_3$+200 g $LiNO_3$+2.2 g silica gel/liter of the aqueous solution for 30 minutes at 320° C. The peak wavelength of the E-beam exposure induced absorption within said ion exchanged surface layer is blue shifted from 528 nm to 510 nm for the exemplary composition 37 as the E-beam dosage increases from $8\times10^{-5}$ to $6.4\times10^{-4}$ coulomb/$cm^2$, and is blue shifted from 524 nm to 510 nm for the exemplary composition 46 as the E-beam dosage increases from $3.2\times10^{-5}$ to $3.2\times10^{-4}$ coulomb/$cm^2$.

In one aspect, the product of the present invention is an electron beam recording medium comprising a glass article consisting of a body portion and an integral ion exchanged surface layer wherein a high contrast and permanently colored/darkened image is obtained instantaneously upon exposure to electron beams without resorting to any subsequent development or image enhancement process. The recorded image and/or information is retrievable with optical means. Thus, the product of the present invention is an E-beam recording material for use as ultra high density microfilms of superior durability and permanance, digital audio disc, digital video disc, optical software disks/plates and the like. Read-back is done with either a semiconductor laser operting at a wavelength of less than about 950 nm or with a He-Ne laser operating at about 633 nm or with any other light source operating within the spectral ranges of near infrared and visible light.

In another aspect, the ion exchanged glass plates of the present invention is suitable for use as phototools including, e.g. photomasks and reticles. High contrast, permanent and durable masking images are generated within the integral ion-exchanged surface layer using electron beams. The masking patterns, e.g. IC device patterns within the ion exchanged glass plates may be transferred to photosensitive materials through any of the various photolithographic techniques operating at any wavelength in the near uv and visible spectral range. For example, the wavelengths of mercury lines at 405 nm and/or at 436 nm are traditionally employed for exposing photoresist coated silicon wafer, and green light has been employed to expose Kodak High Resolution Plate, type 1A.

Since the characteristic curves of E-beam exposure-induced absorption at the wavelength of He-Ne lasers, at those of semiconductor lasers, at 405 nm and at 436 nm are important parameters of the product of the present invention in the above mentioned applications, FIGS. 5, 6, 7, and 8 set forth some of the characteristic curves at these wavelengths.

Figure 5:
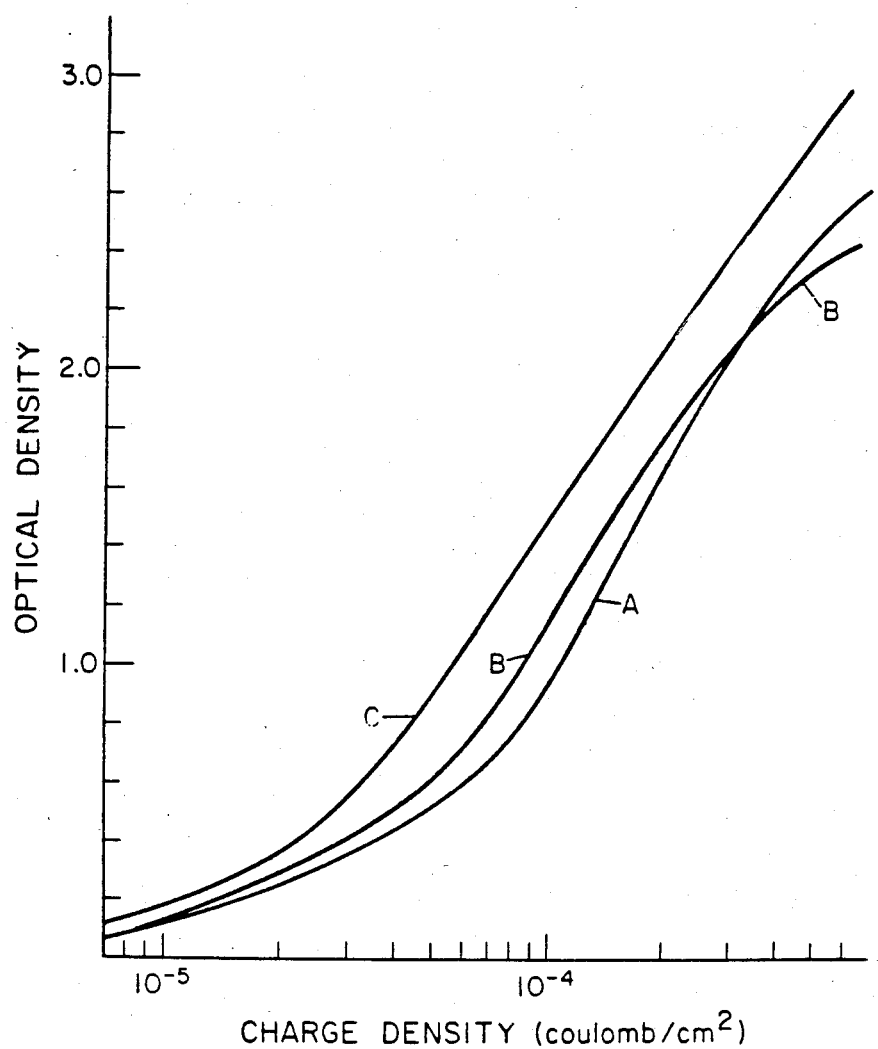
FIG. 5 graphically reports some of the general characteristic curves of E-beam darkening at 436 nm.

FIG. 5 illustrates some of the general characteristic curves of the E-beam exposure-induced absorption at 436 nm, displayed by the ion exchanged products of the present invention after being darkened by 35 kv E-beams. Curves A and C of FIG. 5 represent the characteristic curves of the examplary glass compositions 37 and 46 respectively, of Table I above, which have been ion exchanged at 320° C. for 30 minutes in an aqueous solution consisting of 200 g $AgNO_3$+36.7 cc of 16N $HNO_3$+55.6 g $Cu(NO_3)_2$+200 g $LiNO_3$+2.2 g silica gel/liter of the aqueous solution. Curve B of FIG. 5 represents the characteristic curve of the examplary glass composition 37 of Table I above, which has been immersed in an aqueous solution composed of 200 g $AgNO_3$+70 cc of 16N $HNO_3$+55.6 g $Cu(NO_3)_2$+200 g $LiNO_3$+2.2 g silica gel/liter of the aqueous solution for 30 minutes at 320° C.

Figure 6:
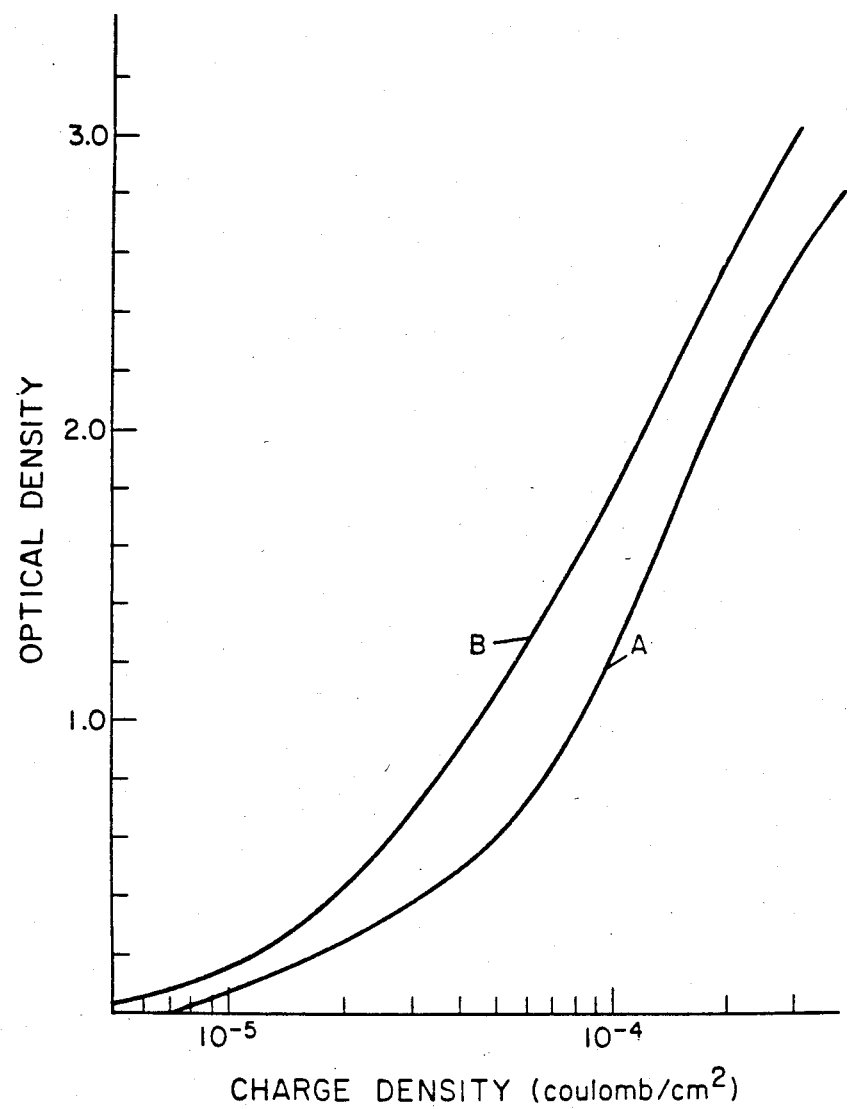
FIG. 6 graphically represents some of the general characteristic curves of E-beam darkening at 546 nm.

FIG. 6 illustrates some of the general characteristic curves of the E-beam exposure-induced absorption at 546 nm, displayed by the ion exchanged products of the present invention after being darkened by 35 kv electrons. Curves A and B of FIG. 6 represent the characteristic curves of the exemplary glass compositions 37 and 46 respectively, of Table I above, which have been ion exchanged at 320° C. for 30 minutes in an aqueous solution consisting of 200 g $AgNO_3$+36.7 cc of 16N $HNO_3$+55.6 g $Cu(NO_3)_2$+200 g $LiNO_3$+2.2 g silica gel/liter of the aqueous solution.

Figure 7:
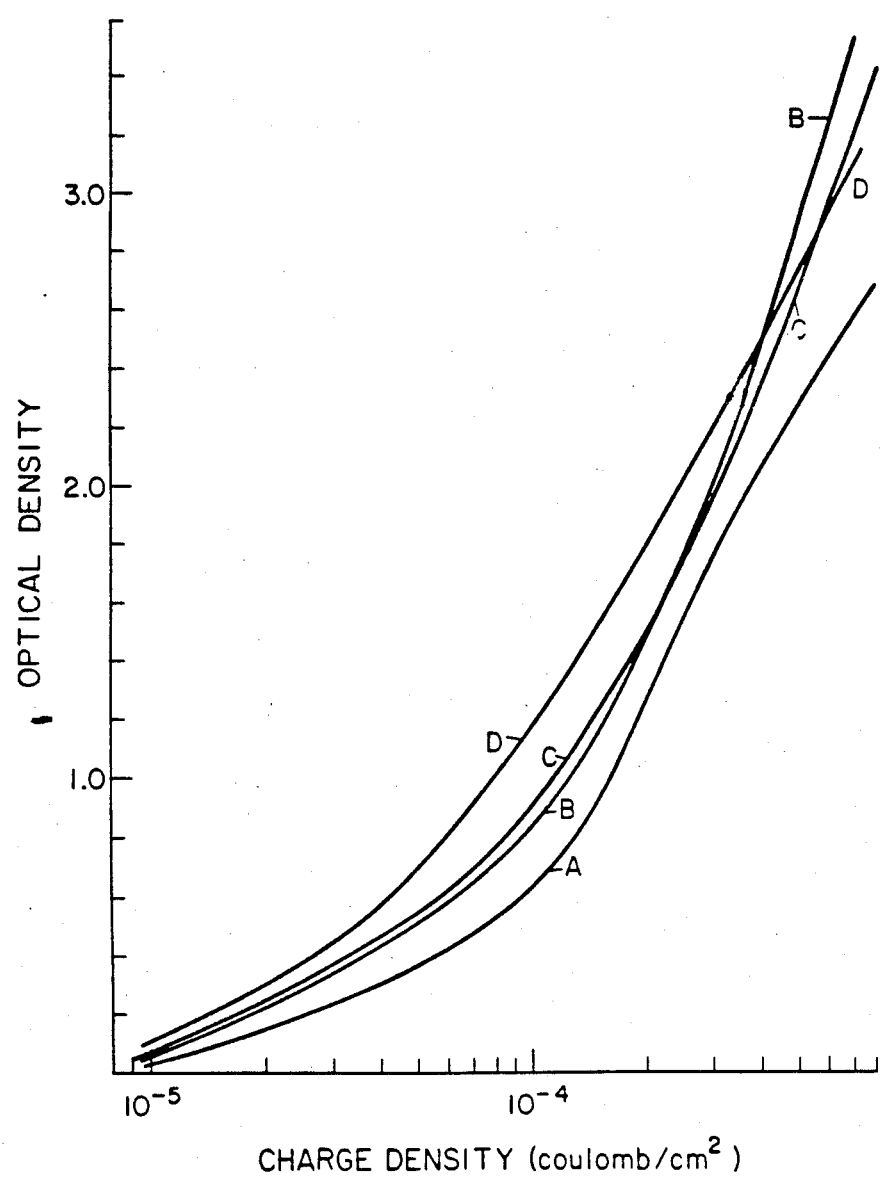
FIG. 7 graphically depicts some of the general characteristic curves of E-beam darkening at 632 nm.

FIG. 7 depicts some of the general characteristic curves of the E-beam exposure-induced absorption at 632 nm displayed by the ion exchanged products of the present invention after being darkened by 35 kv electrons. Curves A, B, and C of FIG. 7 represent the characteristic curves of the exemplary glass composition 6, 2, and 5, respectively, of Table I above, which have been ion exchanged at 310° C. for 40 minutes in an aqueous solution composed of 40 g $AgNO_3$+200 g $LiNO_3$+4.4 g $Cu_2O$+40.9 g $Cu(NO_3)_2$+8.9 cc of 16N $HNO_3$+1.1 g silica gel/liter of the aqueous solution. Curve D of FIG. 7 represents the characteristic curve of the exemplary glass composition 3 of Table I above which has been immersed in an aqueous solution consisting of 20 g $AgNO_3$+200 g $LiNO_3$+4.4 g $Cu_2O$+40.9 g $Cu(NO_3)_2$+7.55 cc of 16N $HNO_3$+1.1 g silica gel/liter of the aqueous solution for 60 minutes at 310° C.

Figure 8:
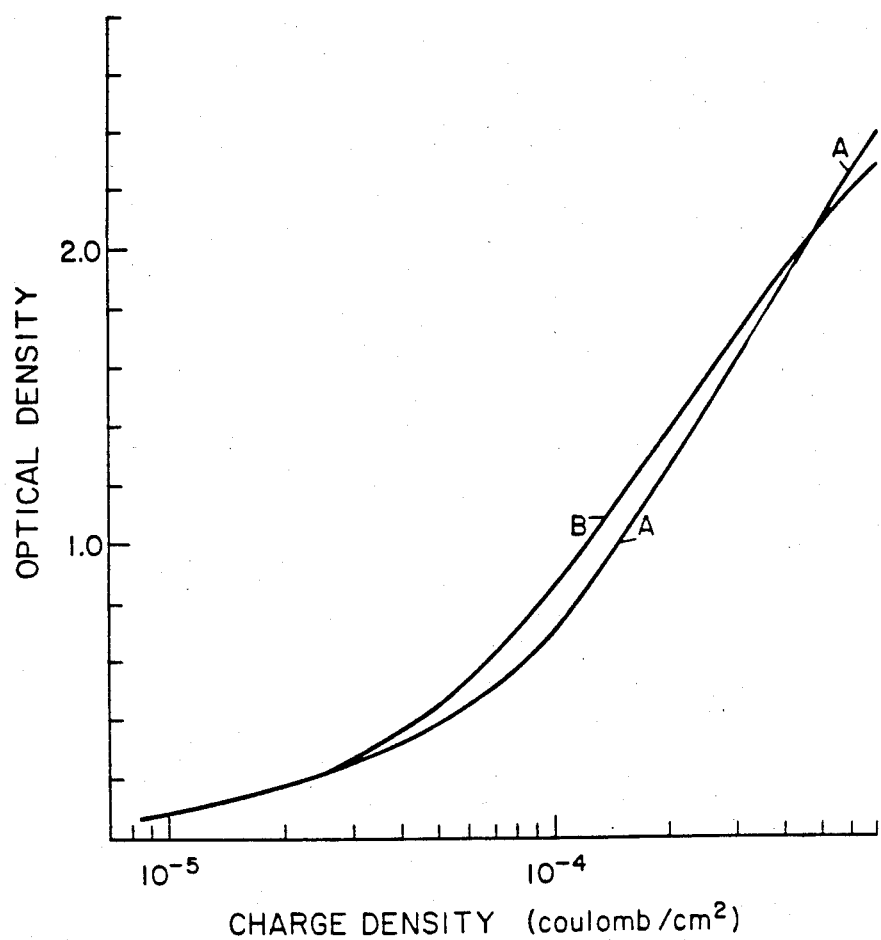
FIG. 8 graphically describes some of the general characteristic curves of E-beam darkening at 750 nm.

FIG. 8 sets forth some of the general characteristic curves of the E-beam exposure-induced absorption at 750 nm, displayed by the ion exchanged products of the present invention after being darkened by 35 kv electrons. Curve A of FIG. 8 represents the characteristic curve of the exemplary glass composition 5 of Table I above which has been ion exchanged at 310° C. for 40 minutes in an aqueous solution consisting of 40 g $AgNO_3$+200 g $LiNO_3$+4.4 g $Cu_2O$+40.9 g $Cu(NO_3)_2$+8.9 cc of 16N $HNO_3$+1.1 g silica gel/liter of the aqueous solution. Curve B of FIG. 8 represents the characteristic curve of the exemplary glass composition 3 of Table I above, which has been immersed for 60 minutes at 310° C. in an aqueous solution containing 20 g $AgNO_3$+200 g $LiNO_3$+4.4 g $Cu_2O$+40.9 g $Cu(NO_3)_2$+7.55 cc of 16N $HNO_3$+1.1 g silica gel/liter of the aqueous solution.

Besides being highly sensitive to electron beams, the ion exchanged products of the present invention such as those recited in FIGS. 1 to 8 are in general colorless and totally transparent to radiation in the wavelength range from near-ultraviolet throughout visible to near-infrared, before exposure to high energy beams which includes electron beams, X-ray, various ion beams and molecular beams. Before, as well after being darkened by the high energy beams, e.g., electron beams, the ion exchanged products of the present invention are insensitive/inert to radiation, at any wavelength within the spectral range from near-ultraviolet throughout visible and longer wavelengths, whose intensities are at and/or below and/or above those commonly employed in photolithography and/or in optical retrieval applications. Moreover, the products of the present invention are stable indefinitely in all possible ambient thermal, optical and humidity conditions.

In the foregoing paragraphs, the method of making as well as some of the characteristic properties of the ion exchanged products of the present invention are recited. The necessary combinations and relationships as well as the interplay among the various components of the parent anhydrous glass composition, the ingredients of the aqueous ion exchange solution and the conditions of the ion exchange reactions can be further appreciated and understood from the discussions in the paragraphs below.

RS-SUPPRESSION AGENTS

It has been found that glass samples in the form of ground and polished glass plates in the glass composition fields of alkali metal silicates with or without halides in the batch of the glass melts are in general yellow colored spontaneously upon ion exchange reactions in an aqueous solution containing 20 g $AgNO_3$+2 cc or less of 16N $HNO_3$/liter of the aqueous solution with or without other ingredients such as $Cu_2O$, $Cu(NO_3)_2$, $LiNO_3$ and/or silica gel in the aqueous ion exchange solution, as long as the temperature of the ion exchange reaction is sufficiently high to cause a finite rate of the ion exchange reactions. The spontaneous yellow coloration of the ion exchanged glasses is intensified from a light yellow tint to a bright gold color to brown with an increasing PH value and/or an increasing concentration of $Ag^+$ ions of the aqueous ion exchange solution. The identical phenomenon of the spontaneous yellow coloration upon ion-exchanged reactions is observed, when glass samples within the glass composition fields of alkali metal silicates are ion exchanged in an aqueous solution containing 200 g $AgNO_3$+70 cc or less of 16N $HNO_3$/liter of the aqueous solution with or without other ingredients cited immediately above.

Figure 9:
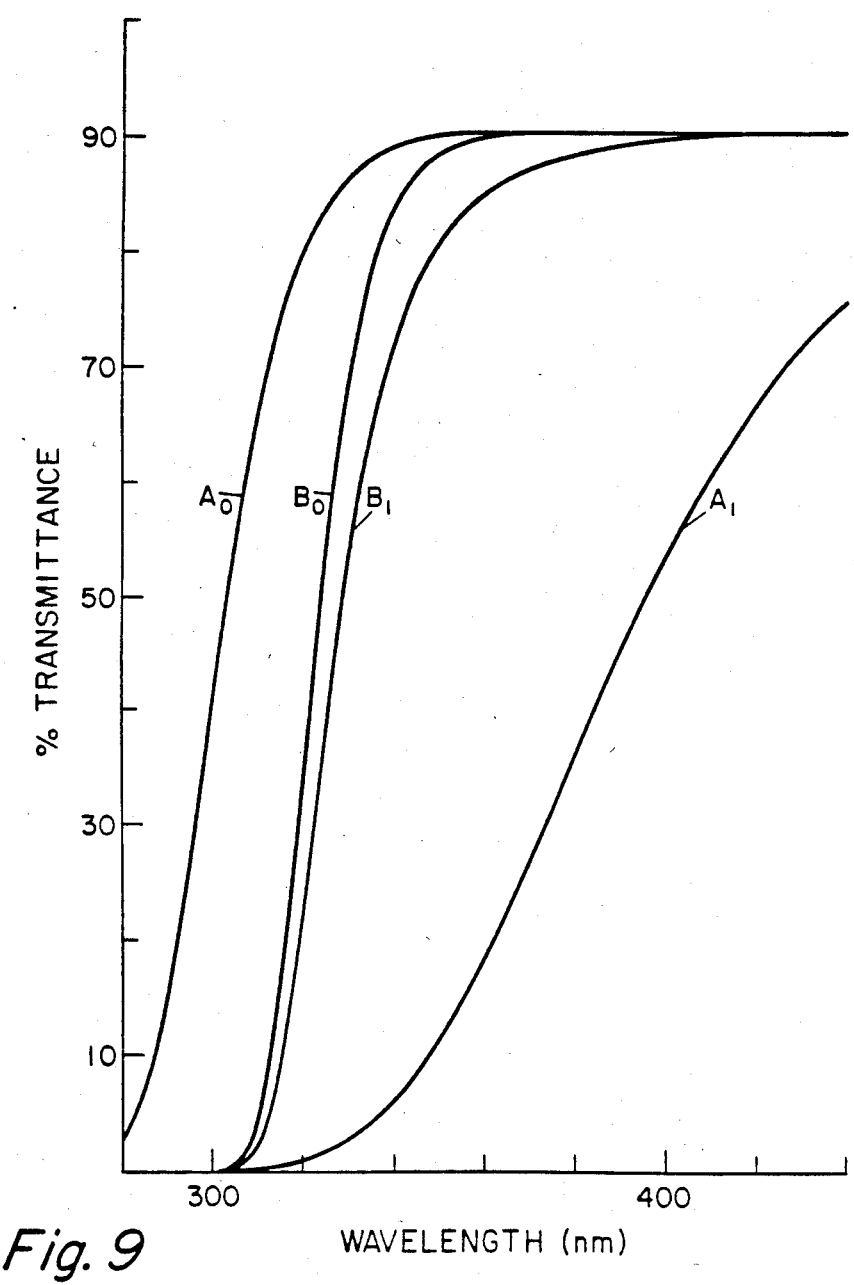
FIG. 9 graphically portrays the role of RS-suppression agents.

Representative transmission-spectra demonstrating the spontaneous yellow coloring phenomenon are set forth graphically by curves $A_0$ and $A_1$ of FIG. 9. Curve $A_0$ of FIG. 9 represents the visible spectrum exhibited by the parent anhydrous glass plate, 2 mm in thickness of the exemplary glass composition 25 of Table I above. Curve $A_1$ of FIG. 9 represents the visible spectrum displayed by the 2 mm glass plate of the exemplary glass composition 25 of Table I after being ion exchanged at 310° C. for 60 minutes in an aqueous solution consisting of 200 g $AgNO_3$+44.4 cc of 16N $HNO_3$+1.1 g silica gel/liter of the aqueous solution.

As is illustrated in FIG. 9 the absorption edge of the exemplary glass composition 25 of Table I above is red shifted from curve $A_0$ to curve $A_1$ upon said ion exchange reactions. To quantify the amount of spontaneous red shift upon ion exchange reactions, RS is herein defined as the difference of wavelengths in nm between the wavelength $\lambda_{IE}$ of the ion exchanged glass plate at 50% transmittance and the corresponding wavelength $\lambda_{AN}$ of the parent anhydrous glass plate at 50% transmittance. Namely, $$RS = \lambda_{IE} \text{(at 50\% T)} - \lambda_{AN} \text{(at 50\% T)}$$

The exemplary glass compositions 25 and 26 of Table I above which have been ion exchanged at 310° C. for 60 minutes in an aqueous solution consisting of 200 g $AgNO_3$+44.4 cc of 16N $HNO_3$+1.1 g silica gel/liter of the aqueous solution, exhibit RS values of 92 nm and 166 nm respectively.

A spontaneous yellow coloration occurs when the ion exchanged silver exists in a reduced state in glass e.g. in the form of silver metal particles which have an absorption band in the spectral range of near uv to blue light. The red shift of the asorption edge is a manifestation of the spontaneous reduction of ion exchanged $Ag^+$ ions into metallic silver. Consequently, the value of RS is a quantitative measure of the amount of silver, in an ion exchanged surface layer, which is reduced spontaneously upon being ion-exchanged into the glass. Therefore, the red shift of the absorption edge is not desirable in two respects; First, the transmittance of the ion exchanged glasses are lessened in the wavelength ranges of ultraviolet, blue light, and even longer wavelengths. Second, the concentration of $Ag^+$ ions which are reducible to silver metal particles and/or specks in glass by high energy beams is diminished. In other words, the available information bearing optical density in the ion exchanged products diminishes.

Although the addition of heavy metal ions and/or transition metal ions to the glass batch of alkali metal silicate glasses in general causes a red shift of the absorption edge of the resulting anhydrous glasses relative to the absorption edge of the heavy metal-free glasses, I have found that RS values are substantially reduced, when glass batches of parent anhydrous glass compositions include at least one oxide selected from the oxides of the transition metals which have less than half-filled atomic d-orbitals, i.e. one to four d-electrons in an atomic state.

Oxides of transition metals having one to four d-electrons in an atomic state include $Sc_2O_3$, $TiO_2$, $V_2O_5$, $Y_2O_3$, $Ta_2O_5$, $Nb_2O_5$, $La_2O_3$, $HfO_2$, $ZrO_2$, and $WO_3$. These oxides will be referred to herein as RS-suppression agents. The effectiveness of suppressing RS values differs a great deal among these oxides. The relative effectiveness among these oxides as a RS suppression agent depends to a large extent on the composition field of the base glass as well as on the ion-exchange-parameters, including concentrations and ingredients of the aqueous ion-exchange solution as well as temperature and duration of the ion exchange reactions.

Within the composition fields of alkali metal oxide-$ZnO$—$Al_2O_3$—$SiO_2$—$Cl$, particularly effective RS-suppression agents include $TiO_2$, $Ta_2O_5$ and $ZrO_2$; whereas $Y_2O_3$ and $Nb_2O_5$ have only marginal effects and are not effective RS-suppression agents, $V_2O_3$ does not function as an RS-suppression agent and is excluded from the list of RS suppression agents for this particular glass composition field.

Examples of diminishing RS values through the use of $TiO_2$, $Ta_2O_5$ and $ZrO_2$ are recorded in Tables IIA and IIB to illustrate the effects of RS suppression agents.

Table IIA recites the values of RS displayed by the exemplary glass compositions 25, 26, 6, 7, 8, 13, 15, 17, 18, 19, 20, 23, 24, and 27 of Table I above after being ion exchanged at 310° C. for 60 minutes in an aqueous solution consisting of 200 g $AgNO_3$+44.4 cc of 16N $HNO_3$+1.1 g silica gel/liter of the aqueous solution. Table IIB includes the values of RS of the exemplary glass compositions 1, 2, 3, 4, 5, 6, 9, 10, 11, 12, 13, 14, 16, 21, and 22 of Table I above which have been ion exchanged at 310° C. for 20 minutes in an aqueous solution consisting of 200 g $AgNO_3$+60 cc of 16N $HNO_3$+1.1 g silica gel/liter of the aqueous solution.

It has been determined that the RS values can be substantially diminished within the alkali metal silicate base glass compositions containing at least one of the RS suppression agents.

A glass plate, 2 mm in thickness of the exemplary glass composition 15 of Table 1 above which is composed of 4.2% $Li_2O$, 6.6% $Na_2O$, 3.6% $K_2O$, 7.6% ZnO, 1.25% $Al_2O_3$, 1.5% $TiO_2$, 1.1% $Ta_2O_5$, 71% $SiO_2$ and 3.2% Cl exhibits a RS value of 4.5 nm (see Table IIA) after being ion exchanged at 310° C. for 60 minutes in an aqueous solution consisting of 200 g $AgNO_3$+44.4 cc of 16N $HNO_3$+1.1 g silica gel/liter of the aqueous solution. Curves $B_0$ and $B_1$ of FIG. 9 depict the transmittance curves of the glass plate of the exemplary glass composition 15 before and after being ion exchanged accordingly in said solution. The beneficial effect of the addition of the RS suppression agents (1.5% $TiO_2$ and 1.1% $Ta_2O_5$) to the glass batch of the exemplary glass composition 25 of Table I above, that is, the reduction of the value of RS from 92 nm to 4.5 nm is graphically displayed in FIG. 9, in which the red shift of curve $B_1$ from curve $B_0$ is compared with the red shift of curve $A_1$ from curve $A_0$. As is also illustrated in FIG. 9, the transmittance values of said ion exchanged glass plate of the exemplary glass composition 15 are 86.3%, 92% and 92% at the wavelengths of 365 nm, 405 nm and 436 nm respectively. In comparison, the transmittance values of

TABLE IIA

| Glass No. | 25 | 26 | 6 | 7 | 8 | 13 | 15 | 17 | 18 | 19 | 20 | 23 | 24 | 27 |
|---|---|---|---|---|---|---|---|---|---|---|---|---|---|---|
| RS Value in nm | 92 | 166 | 8 | 3 | 2 | 10 | 4.5 | 11 | 4.5 | 8.8 | 9.8 | 2.8 | 8.5 | 52 |

TABLE IIB

| Glass No. | 1 | 2 | 3 | 4 | 5 | 6 | 9 | 10 | 11 | 12 | 13 | 14 | 16 | 21 | 22 |
|---|---|---|---|---|---|---|---|---|---|---|---|---|---|---|---|
| RS Value in nm | 16 | 6.5 | 3 | 14.5 | 7 | 3 | 9 | 7.5 | 2.25 | 9.5 | 8 | 7 | 12 | 4 | 4 |

For example, the values of RS of the exemplary glass compositions 25, 6, 7, and 8 of Table I above decreases from 92 nm to 8 nm to 3 nm and to 2 nm (see Table IIA), as the concentration of $TiO_2$ on the mole % basis in the glass melt increases from 0% to 4.4% to 5.9% and to 7.4%. The exemplary glass compositions 1, 21, 9, 10, and 11 are identical in the proportions of the batch components $Na_2O$ $K_2O$, ZnO, $Al_2O_3$, $SiO_2$ and Cl and contain 1.5% $TiO_2$ on the mole percent basis; their values of RS decrease further from 16 nm (the RS value of the exemplary composition 1, see Table IIB) to 4 nm due to the addition of a second RS-suppression agent, 1% $ZrO_2$, and decrease further from 16 nm to 9 nm to 7.5 nm and to 2.25 nm (see Table IIB) due to the addition of a second RS suppression agent, 0.27%, 0.54%, and 0.80% of $Ta_2O_5$ respectively in the glass batch. The exemplary glass compositions 4, 22, 12, 13, and 14 are identical in the proportions of the batch components $Li_2O$, $Na_2O$, $K_2O$, ZnO, $Al_2O_3$, $SiO_2$, and Cl and contain 1.5% $TiO_2$ on the mole percent basis; their values of RS decrease further from 14.5 nm to 4 nm (see Table IIB) due to the addition of a second RS-suppression agent, 1% $ZrO_2$, and decrease further from 14.5 nm (the RS value of the exemplary composition 4, see Table IIB) to 9.5 nm to 8 nm and to 7 nm due to the addition of a second RS-suppression agent, 0.27%, 0.54% and 0.81% of $Ta_2O_5$ respectively in the glass batch.

The significance of $TiO_2$, $Ta_2O_5$ and $ZrO_2$ in the glass melts in playing the role of RS-suppression agents to diminish the red shift of the absorption edge upon ion exchange reactions can be further appreciated from the discussion of the paragraphs immediately below.

the glass plate of the exemplary glass composition 25 of Table I above which has been identically ion exchanged are 24%, 58% and 74% at the wavelengths of 365 nm, 405 nm and 436 nm respectively.

Table III records the transmittance values at 365 nm displayed by the exemplary glass compositions 1, 2, 3, 9, 11, 21, 4, 5, 6, 12, 14, and 22 of Table I above after being ion exchanged at 305° C. for 60 minutes in an aqueous solution consisting of 200 g $AgNO_3$+70 cc of 16N $HNO_3$+25 g $Cu(NO_3)_2$+1.1 g silica gel/liter of the aqueous solution. Table III also recites for comparison the transmittance values at 365 nm exhibited by the exemplary glass compositions 25, and 26, which contain none of the RS-suppressing agents, after being ion exchanged at 310° C. for 60 minutes in an aqueous solution consisting of 200 g $AgNO_3$+44.4 cc of 16N $HNO_3$+1.1 g silica gel/liter of the aqueous solution.

The exemplary glass compositions 26, 1, 2, 3, 21, 9 and 11 are alkali metal silicate glasses in the sub-field of glass composition $Na_2O$—$K_2O$—ZnO—$Al_2O_3$—$SiO_2$—Cl containing in addition at least one of the three RS-suppressing agents-$TiO_2$, $Ta_2O_5$ and $ZrO_2$, with the exception of the exemplary glass composition 26 which contains none of the three RS suppressing agents; the transmittance values (see Table III) of the ion exchanged glasses at 365 nm are improved from 0% to 77.5%, to 83.3% and to 82.2% due to the addition of 1.5%, 3% and 4.4% on the mole percent oxide basis of $TiO_2$ respectively in the glass melts. The transmittance values of the ion exchanged glasses at 365 nm are further improved from 77.5% (the transmittance value of the exemplary glass composition 1) to 85.5% due to the addition of a second RS-suppression agent, 1 mole %

$ZrO_2$, and further increase from 77.5% to 81.7% and to 85.3% due to the addition of a second RS-suppression agent, 0.27 mole % and 0.8 mole % $TaO_5$ respectively.

TABLE III

| Glass No. | 1 | 2 | 3 | 9 | 11 | 21 | 4 | 5 | 6 | 12 | 14 | 22 | 25 | 26 |
|---|---|---|---|---|---|---|---|---|---|---|---|---|---|---|
| % T at 365 nm | 77.5 | 83.3 | 82.2 | 81.7 | 85.3 | 85.5 | 80.0 | 85.0 | 84.4 | 83.5 | 88.0 | 88.0 | 24 | 0 |

The corresponding effects of $TiO_2$, $Ta_2O_5$ and $ZrO_2$ on the transmittance values of $Li_2O$—$Na_2O$—$K_2O$—$ZnO$—$Al_2O_3$—$TiO_2$—$Ta_2O_5$—$ZrO_2$—$SiO_2$—$Cl$ glasses are illustrated in Table III as well, by the exemplary glass compositions 25, 4, 5, 6, 22, 12, and 14 of Table I above. The transmittance values of these $Li_2O$-containing glasses are in general higher than those of the corresponding $Na_2O$—$K_2O$—$ZnO$—$Al_2O_3$—$TiO_2$—$Ta_2O_5$—$ZrO_2$—$SiO_2$—$Cl$ glasses.

With the exception of the exemplary glass compositions 25, 26, and 27 which contain none of the three more effective RS-suppressing agents $TiO_2$, $Ta_2O_5$ and $ZrO$, the transmittance values of all the ion-exchanged glasses included in Tables IIA, IIB and III are greater than 90% at wavelengths longer than about 400 nm.

PHOTOSENSITIVITY-INHIBITORS

Since the insensitivity and/or inertness of the products of the present invention to radiations in the wavelength ranges from ultraviolet throughout visible light and longer wavelengths are of paramount importance to their usefulness as phototools and/or as optically retrievable permanent recording media, it is the intention of the present invention to produce E-beam sensitive $Ag^+$ ion-containing and/or AgCl-containing and/or $Ag_2O$-containing microphases, within the ion exchanged surface layer, which are inert and/or insensitive to radiation in the wavelength ranges from ultraviolet throughout visible and longer wavelengths. This objective is made possible through the present finding that the inclusion of one or more oxides of transition metals having one to four d-electrons in their atomic state, to the glass batches of parent anhydrous glass compositions not only suppresses the spontaneous reduction of ion-exchanged $Ag^+$ ions in glass, but also eliminates the photosensitivity of the ion exchanged surface glass layer and at the same time substantially increases its sensitivity to electron beams.

Oxides of transition metals having one to four d-electrons in an atomic state include $Sc_2O_3$, $TiO_2$, $V_2O_5$, $Y_2O_3$, $ZrO_2$, $Nb_2O_5$, $La_2O_3$, $HfO_2$, $Ta_2O_5$, and $WO_3$. These oxides will also be referred to herein as photosensitivity-inhibitors. The effectiveness of inhibiting photosensitivity differs a great deal among these oxides. The relative effectiveness among these oxides as photosensitivity-inhibitors depends to a large extent on the composition field of the base glass as well as on the ion exchange parameters including concentrations and ingredients of the aqueous ion exchange solution as well as temperature and duration of the ion exchange reactions.

Within the composition field of alkali metal oxides-$ZnO$—$Al_2O_3$—$SiO_2$—$Cl$, more effective photosensitivity-inhibitors include $TiO_2$, $Nb_2O_5$ and $Y_2O_3$.

Although both the RS-suppression-agents and the photosensitivity-inhibitors are oxides of transition metals having one to four d-electrons, a particular oxide which functions as a RS-suppression-agent in a given glass composition may or may not function as a photosensitivity-inhibitor in the same glass composition. For example, within the glass composition fields of alkali metal oxide-$ZnO$—$Al_2O_3$—$SiO_2$—$Cl$, $TiO_2$ is an effective photosensitivity inhibitor as well as an effective RS-suppression-agent, whereas $Nb_2O_5$ and $Y_2O_3$ are effective photosensitivity inhibitors, but are not effective in suppressing RS values. On the other hand, $Ta_2O_5$ and $ZrO_2$ are effective RS-suppression agents, but are not so effective in inhibiting photosensitivity.

The utility of $TiO_2$, $Nb_2O_5$, $Y_2O_3$ and $Ta_2O_5$ as photosensitivity-inhibitors in a variety of combinations of the ion exchange-parameters and actinic radiations is set forth in the paragraphs immediately below.

Figure 10:
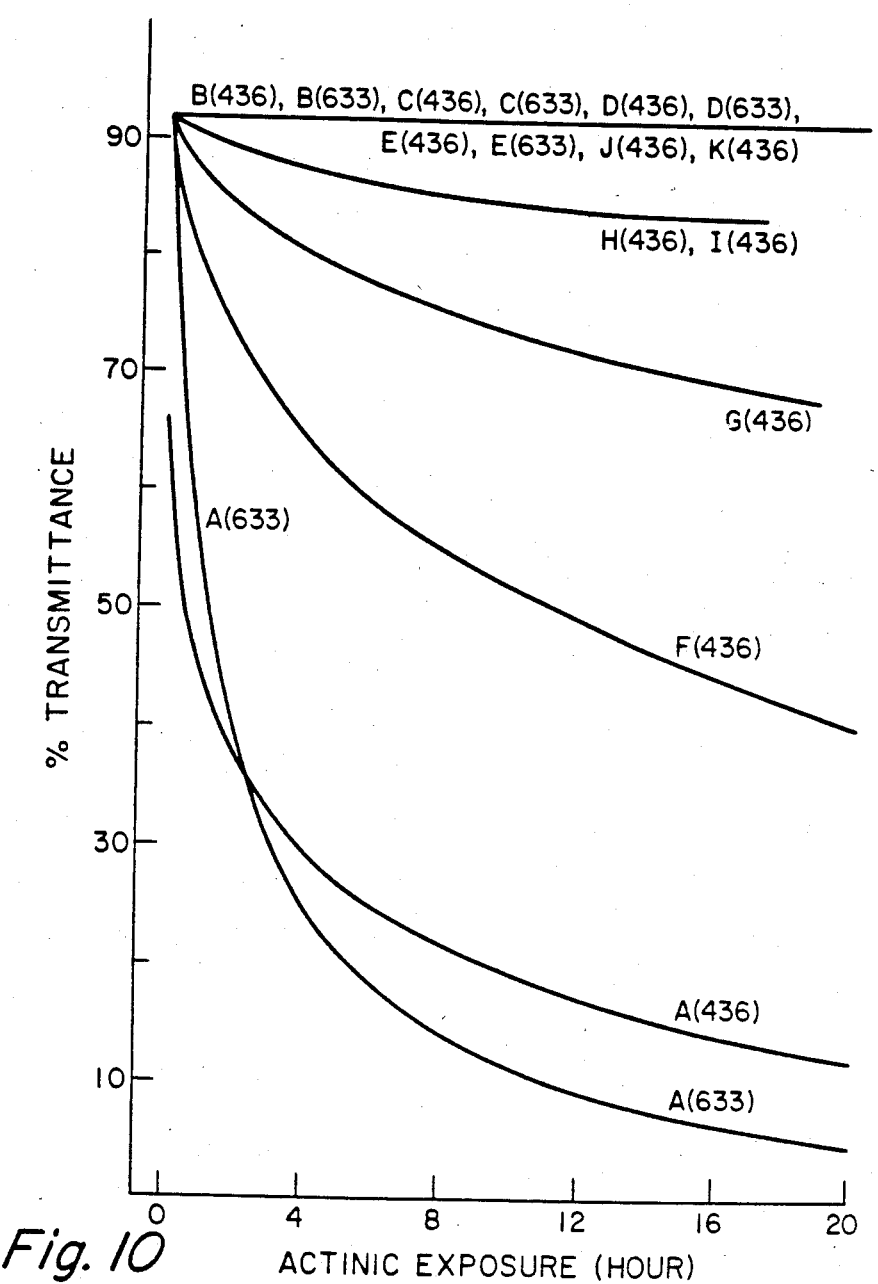
FIG. 10 graphically portrays the role of photosensitivity inhibitors.

FIG. 10 illustrates the role of $TiO_2$, $Ta_2O_5$, $Y_2O_3$ and $Nb_2O_5$ as photosensitivity-inhibitors. Curves A, B, C, D and E of FIG. 10 set forth the transmittance values at two wavelengths 436 nm and 633 nm as a function of the duration of exposure to actinic radiation at 436 nm on the exemplary glass compositions 26, 4, 5, 6, and 3 respectively, of Table I above, which have been immersed for 40 minutes at 310° C. in an aqueous solution consisting of 40 g $AgNO_3$+200 g $LiNO_3$+4.4 g $Cu_2O$+40.9 g $Cu(NO_3)_2$+8.9 cc of 16N $HNO_3$+1.1 g silica gel/liter of the aqueous solution.

Each of the samples was placed for 20 hours near the focus of a convergent beam which was obtained from the output of a 100 watt mercury arc, using a condensing lens assembly and a 436 nm band pass interference filter. The intensity of the exposure beam at 436 nm was 150 milliwatts/cm² on the glass sample. The transmittance of the glass samples was probed at the wavelength of the exposure beam and at 633 nm. The probing wavelengths are labeled in the parenthesis in FIG. 10.

Whereas the examplary glass composition 26 which does not contain any photosensitivity-inhibitor darkens to transmittance values of 12% at 436 nm and 4.5% at 633 nm, the exemplary glass compositions 4, 5, 6 and 3 having a concentration of $TiO_2$ equal to or greater than 1.5% are not darkened by the actinic radiation at 436 nm. Namely the photosensitivity of said ion exchanged surface layers is totally inhibited through the addition of at least about 1.5% $TiO_2$ on the mole percent oxide basis.

In good agreement with the foregoing discussions, $TiO_2$ also functions as a RS-suppression-agent; whereas the initial transmittance of the ion exchanged glass plate of the exemplary glass composition 26 is 66% at 436 nm, the transmittance of the ion exchanged glass plates of the exemplary compositions 4, 5, 6, and 3 are about 92%±1% at 436 nm.

Curves F, G, H, I, J, and K of FIG. 10 set forth the transmittance values as a function of the duration of exposure to the actinic radiation at 436 nm on the exemplary glass compositions 1, 4, 47, 48, 12, and 5 respectively of Table I above which have been ion exchanged at 310° C. for 60 minutes in an aqueous solution consisting of 20 g $AgNO_3$+200 g $LiNO_3$+4.4 g $Cu_2O$+40.9 g $Cu(NO_3)_2$+7.55 cc of 16N $HNO_3$+1.1 g silica gel/liter of the aqueous solution. Although the ion exchanged glass plates of the exemplary glass composition 12 (containing 1.5% $TiO_2$ and 0.27% $Ta_2O_5$) and the exemplary glass composition 5 (containing 3.0% $TiO_2$) are insensitive to actinic radiation at 436 nm, those of the exemplary glass compositions 1 and 4 (each containing 1.5% $TiO_2$ in the base glass composition), the exemplary glass composition 47 (containing 1.5% $Y_2O_3$) and the exemplary glass composition 48 (containing 1.3% $Nb_2O_5$) show residual photosensitivity. The relative effectiveness of $TiO_2$, $Ta_2O_5$, $Y_2O_3$ and $Nb_2O_5$ functioning as photosensitivity-inhibitors are displayed by the darkening rate curves F, G, H, I, J and K of FIG. 10.

The effectiveness of a photosensitivity inhibitor depends strongly on the concentrations of the various ingredients of the ion-exchange solution. This is evident in FIG. 10 and is particularly apparent in comparing the darkening rate curves B and G of FIG. 10.

The effectiveness of a photosensitivity-inhibitor also depends on the base anhydrous glass composition, as is apparent in comparing the darkening rate curve F (of the exemplary glass composition 1) and the rate curve G (exemplary glass composition 4) of FIG. 10.

Further tests of the ion-exchanged products of the present invention on the insensitivity/inertness to actinic radiation are done with exposures to white light and to radiation from a mercury arc at 405 nm and 365 nm. The results of such tests are recited on glass plates 2 mm in thickness of the exemplary glass composition 6, 5 and 4 of Table I above which have been ion-exchanged at 310° C. for 40 minutes in an aqueous solution composed of 40 g $AgNO_3$+200 g $LiNO_3$+4.4 g $Cu_2O$+40.9 g $Cu(NO_3)_2$+8.9 cc of 16N $HNO_3$+1.1 g silica gel/liter of the aqueous solution. Said ion-exchanged glass plate of the exemplary glass composition 6 was exposed to actinic radiation at 405 nm for a duration of 64 hours at an intensity level of 80 milliwatt/$cm^2$, the transmittance at the monitoring (probed at the exposure wavelength) wavelength of 405 nm remained constant throughout the entire exposure duration. Said ion exchanged glass plate remains colorless and totally transparent, i.e. transmittance values of about 91.5%±1% throughout the spectral ranges of visible and near infrared, after being irradiated to an energy density of $1.85 \times 10^4$ joule/$cm^2$ at 405 nm. The same ion-exchanged glass plate of the exemplary glass composition 6 was exposed in addition to actinic radiation at 365 nm for a duration of 64 hours at an intensity level of 56 mw/$cm^2$, the glass plate remained colorless and showed no change in transmittance at all wavelengths throughout near-uv, visible and near-infrared spectral ranges.

Said ion-exchanged glass plate of the exemplary glass composition 5 was exposed to white light composed of radiation having continuous wavelengths of longer than 400 nm for a duration of 10 days at an intensity level of 1.2 watt/$cm^2$; the glass plate remained colorless and displayed before and after the exposure identical transmittance values at all wavelengths throughout the near-ultraviolet, visible and near-infrared spectral ranges.

The ion-exchanged products of the present invention are insensitive and/or inert to radiation of shorter wavelengths as the concentration of photosensitivity-inhibitors in the base anhydrous glass increases. Said ion-exchanged glass plates of the exemplary glass composition 6 are insensitive and/or inert to actinic radiation having wavelengths of about 365 nm and longer wavelengths. The glass plates of the exemplary glass composition 5 having been identically ion-exchanged are insensitive and/or inert to actinic radiation of wavelengths about 400 nm and longer. The glass plates of the exemplary glass composition 4 having been also identically ion exchanged are insensitive and/or inert to actinic radiation of wavelengths about 436 nm and longer.

It has been determined that the E-beam darkened image within the ion exchanged products of the present invention exhibits excellent stability under various test exposures to high intensities and/or high dosages of actinic radiation from near-ultraviolet to near-infrared. The results of some of the test exposures are recited below on the glass plates 2 mm in thickness of the exemplary glass compositions 6 and 5 which have been ion exchanged at 310° C. for 40 minutes in an aqueous solution consisting of 40 g $AgNO_3$+200 g $LiNO_3$+4.4 g $Cu_2O$+40.9 g $Cu(NO_3)_2$+8.9 cc of 16N $HNO_3$+1.1 g silica gel/liter of the aqueous solution, and have subsequently been darkened by exposures to electron beams.

Said ion-exchanged glass plate of the exemplary glass composition 6 was darkened by an E-beam to an optical density of 1.97 at 436 nm (the corresponding absorption spectrum is closely represented by curve C of FIG. 3). The E-beam darkened area was then exposed to the actinic radiation at 436 nm for a duration of 22 hours at an intensity level of 171 m watt/$cm^2$; the color of the E-beam exposed area remained substantially unchanged and the optical density at 436 nm remained constant at 1.97.

The same ion-exchanged glass plate of the exemplary glass composition 6 was darkened by an E-beam on a second area to an optical density of 1.63 at 600 nm. The E-beam darkened area was exposed to a broad band red light for a duration of 38 hours at an intensity level of 161 m watt/$cm^2$; the optical density and the color of the exposed area remained firmly unchanged.

Said ion-exchanged glass plate of the exemplary glass composition 5 was darkened by an E-beam to an optical density of 1.86 at 796 nm (the corresponding adsorption spectra is closely represented by curve D of FIG. 3). The E-beam darkened area was exposed for a duration of 7 days to a broad band of near infrared radiation at about 796 nm having an intensity of 53.4 m watt/$cm^2$; the optical density and the color of the irradiated area remained firmly unchanged. The same E-beam darkened area was subsequently exposed to white light for 7 days at an intensity level of 1.0 watt/$cm^2$; the optical density still remained substantially unchanged throughout the entire spectral range.

BASE GLASS COMPOSITION FIELDS

The products of the present invention are high energy beam sensitive glass articles exhibiting insensitivity and/or inertness to actinic radiations, consisting of a body portion and an integral ion-exchanged surface layer. The integral ion-exchanged surface layer exhibits coloring and/or darkening effects upon exposure to high energy beams. Colored images delineated and/or replicated by the high energy beam within said integral surface layer are also insensitive and/or inert to actinic radiation. The body portion retains the parent anhydrous glass composition of the integral surface layer.

The parent anhydrous glass compositions suitable for the products of the present invention are in the general composition field of alkali metal silicate glasses consisting of at least one alkali metal oxide selected from the group of $Li_2O$, $Na_2O$, $K_2O$, $Cs_2O$ and $Rb_2O$, at least one of the photosensitivity-inhibitors and/or the RS-suppression agents, and at least one glass network former. The glass melts are preferably saturated or super saturated with chlorides.

Durable glasses which are not dissolved and/or etched in the acidic aqueous solution at the temperatures of ion-exchange reactions, are essential in maintaining the optical quality surface and the surface figure of the glass articles being autoclaved in the aqueous ion-exchange solution. It has been found that the transition metal oxides which are included in the glass melts of the present products to inhibit photosensitivity and/or to suppress RS values, greatly improve the acid durability of the alkali metal silicate base glass and effectively prevent the dissolution and etching of the hydrated glass network in the aqueous ion exchange solution at elevated temperatures. It has also been found that further improvements in acid-durability and/or further strengthening of the hydrated glass network to prevent even the slightest etching by the aqueous ion exchange solution are attainable by the addition in the glass batch of one or more oxides selected from ZnO, CaO, PbO, SrO, MgO, and $Al_2O_3$. Thus the inclusion in glass batches of at least one oxide selected from ZnO, PbO, MgO, CaO, SrO, and $Al_2O_3$ are most desirable for the products of the present invention and these oxides are referred to herein as acid-durability-and-glass-network-strengtheners.

Although $SiO_2$ is in general the choice of the glass network former of the anhydrous base glass of the present invention, other glass network formers such as $B_2O_3$ and $P_2O_5$ can be advantageously employed. $ZrO_2$ is found to substantially improve the acid durability of $B_2O_3$ and/or $P_2O_5$ containing glasses.

The preferred parent anhydrous glass compositions for the products of the present invention consist essentially on the mole percent oxide basis of 3 to 25% total of $Li_2O+Na_2O+K_2O+Cs_2O+Rb_2O$, up to 6% Cl, 0.5–35% total concentration of photosensitivity-inhibitors and RS-suppression agents, up to 35% total concentration of acid-durability-and-glass-network-strengtheners, up to 4% F, up to 2% Br, up to 2% I, up to 25% $P_2O_5$, up to 25% $B_2O_3$, and 20–93% $SiO_2$, the sum of those components constituting at least 75% of the total composition. Other constituents can be included to modify the chemical and physical properties such as hardness and thermal expansion coefficients, etc. of the anhydrous base glass and/or the integral ion-exchanged surface layer, and to assist in melting and forming characteristics of the parent anhydrous glass. As illustrative of such, BaO can be included in amounts up to about 20%. Cerium can be included up to 0.1% by weight when it is necessary to increase the uv and/or X-ray absorption of the glass article.

The most preferred anhydrous base glass compositions for the products of the present invention consist essentially on the mole percent oxide basis of 5 to 25% total of $Li_2O+Na_2O+K_2O+Cs_2O+Rb_2O$, up to 6% Cl, 0.5–35% total concentration of photosensitivity-inhibitors and RS-suppression-agents, up to 20% ZnO, up to 20% MgO, up to 15% $Al_2O_3$, up to 20% PbO, up to 20% CaO, 2–35% total of $MgO+ZnO+Al_2O_3+PbO+CaO$, up to 4% F, up to 2% Br, up to 2% I and 50–89% $SiO_2$.

Besides enhancing the sensitivity to electron beam, chloride is in general a necessary component of the parent anhydrous glass in obtaining most of the E-beam induced coloration other than yellow.

In the absence of any other precipitated phases e.g. AgCl, the reduced silver in the form of metallic silver particles is manifested in the silicate glasses as an absorption band centered at 390 nm to 460 nm. The E-beam exposure-induced yellow colorations in the ion exchanged product of the present invention were obtained with and without chloride in the glass melts.

The ion exchanged glasses not containing chlorides do not have photo-sensitivity, even in the absence of any photosensitivity-inhibitor in the glass melts. However, the RS values of chloride-free glasses are in general much larger than those of the identical compositions having chlorides added in the glass melts, and thus the RS-suppression agents are in a greater demand for the chloride-free glasses.

The inclusion of at least one RS-suppression agent in the parent anhydrous glass is deemed necessary for the chloride-free glasses. On the other hand, the inclusion of at least one photosensitivity-inhibitor in the parent anhydrous glass is deemed necessary for the chloride-containing glasses.

It is desirable to include at least two oxides selected from the group of $Li_2O$, $Na_2O$ and $K_2O$. The inclusion of $Li_2O$ as one of the alkali metal oxides is further favored for the following reasons. When part of the contents of $Na_2O$ and/or $K_2O$ in a $Na_2O-K_2O-TiO_2-ZnO-Al_2O_3-SiO_2-Cl$ glass is replaced on an equal mole percent basis by $Li_2O$, the advantageous effects may include the following:

a. lower expansion coefficient of the anhydrous base glass;

b. hydration of the surface glass layer to a lower water content;

c. a lower rate of thickness penetration of the ion exchange reactions in an aqueous solution;

d. a lower expansion coefficient of the ion exchanged surface layer;

e. a more durable ion exchanged surface layer; wherein the advantageous effects c, d and e are at least partly the consequence of effect b. When the alkali metal oxides are batched in optimized proportions, further advantageous effects include:

(1) a more complete exchange of alkali metal ions in the surface glass layer by $Ag^+$ ions from the aqueous ion exchange solution;

(2) closely matched thermal expansion coefficients between the body portion and the ion exchanged surface layer.

THICKNESS AND PROPERTIES OF THE IMAGE-BEARING SURFACE LAYER

One of the advantages of the present products which are deemed particularly suitable for use as permanent mass storage media and/or as phototools is based on the fact that the permanently darkened image upon exposure to high energy beam is within the ion exchanged surface layer which is part of the monolithic parent anhydrous glass body. In other words, the information bearing surface-layer is in (not coated on) the glass substrate. At least equally significant is the fact that any desirable thickness of the ion-exchanged surface layer ranging from a small fraction e.g. about one micrometer, to the total thickness of the parent anhydrous glass body may be produced precisely.

The depth of the E-beam darkened image does not exceed the penetration depth of the fast electrons. Bethe ranges which are conventionally defined as the path lengths through which the energy of electrons reduces to zero are about 1.2, 3.7, 5.2, 8.7, and 12.8 micrometers for electrons with accelerating potentials of 10 kv, 20 kv, 25 kv, 35 kv and 45 kv respectively. On the other hand, the penetration depths of ion beams and far-uv are in general less than one micrometer.

It is desirable for some applications that the thickness of the information bearing layer is limited by the depth of penetration of high energy beams and not by the thickness of the ion-exchanged surface layer. On the other hand, for various reasons such as improved line definition, better edge acuity and minimum linewidth delineated by a focused electron beam, it is desirable in many applications that the thickness of the silver (and copper) ion exchanged surface layer is less than the Bethe range and/or is only a small fraction of the Bethe ranges.

The thickness of the E-beam sensitive layer of the present products is equal to that of silver (and copper) ion exchanged surface layer which is in turn equal to or less than the depth of hydration. The depth of hydration is herein defined as the penetration depth of ion exchange reactions, since ion-exchange reactions includes the exchange of $Ag^+$ ions for alkali metal ions in glass as well as hydration and/or an exchange of $H^+$ and/or $H_3O^+$ ions for alkali metal ions in glass. The E-beam darkened image is confined within a thickness which is less than or equal to the penetration depth of the ion-exchange reactions.

Since the hydration front is clearly observable under a microscope in a cross-section which is perpendicular to the glass surface contacted the aqueous ion-exchange solution, the thickness of the hydrated layer was measured from photomicrographs of thin cross-sections.

The penetration depth of hydration/ion exchange reactions has been measured for a number of samples which were ion-exchanged for various durations from 0.5 hours up to 16 hours. It is determined that the penetration depth of hydration/ion-exchange reactions is proportional to the square root of the duration of the ion exchange reactions, and consequently, an accurate value of the thickness of the hydrated layer corresponding to an ion-exchange duration of 0.5 hour or less may be verified and/or calculated from the thickness values of samples which have been ion-exchanged for longer durations.

The measured values of the thickness of the hydrated layers are 1.7, 3.8 and 7.3 micrometers in the glass plates of the exemplary glass compositions 6, 3 and 4 respectively of Table I above which have been immersed for 30 minutes at 300° C. in an aqueous solution consisting of 200 g $AgNO_3$+70 cc of 16N $HNO_3$+1.1 g silica gel/liter of the aqueous solution.

It has been determined that the rate of thickness-penetration of ion exchange reactions is strongly dependent on the parent anhydrous glass compositions. In general, the rate of penetration of ion exchange reactions/hydration reduces substantially via either one or more of the following compositional alterations:

(1) lowering the total concentration of alkali metal ions;

(2) replacing the larger alkali metal ions by the smaller ones; particularly effective is the replacement of sodium and/or potassium ions by lithium ions. An example of such an effect is illustrated by the measured thickness values cited above. Namely, the thickness values reduce from 3.8 micrometer to 1.7 micrometer in going from the parent anhydrous glass of the exemplary composition 3 to the exemplary composition 6. (The concentrations of alkali metal ions in the exemplary glass composition 3 are on the mole percent oxide basis 10.5% $Na_2O$ and 3.3% $K_2O$, whereas the exemplary glass composition 6 contains 3.9% $Li_2O$, 6.2% $Na_2O$ and 3.3% $K_2O$).

(3) An increase in concentrations and/or addition of one or more oxides selected from ZnO, $TiO_2$, PbO, $Al_2O_3$ and $ZrO_2$ in the batch of the glass melts.

(4) replacing on the mole percent oxide basis a portion of silica by one or more of the oxides selected from $TiO_2$, ZnO, $Al_2O_3$, PbO and $ZrO_2$. An example of the effect of replacing silica by titanium oxide is illustrated by the measured thickness values cited above. Namely, the rates of penetration of the ion-exchange reactions reduce from 7.3 micrometer per 0.5 hour to 1.7 micrometer per 0.5 hour in going from the parent anhydrous glass of the exemplary composition 4 to the exemplary composition 6 (the exemplary glass compositions 4 and 6 of Table I contain 1.5 mole % and 4.4 mole % $TiO_2$ respectively).

As can be expected, the rate of penetration of ion ion exchange reactions increases with increasing temperature of the ion-exchange reactions. The thickness values of the hydrated layers are 3.4 and 4.4 micrometer in the glass plates of the exemplary glass composition 37 which have been immersed for 0.5 hour in an aqueous solution composed of 200 g $AgNO_3$+70 cc of 16N $HNO_3$+55.6 g $Cu(NO_3)_2$+200 g $LiNO_3$+2.2 g silica gel/liter of the aqueous solution at 310° and 320° C. respectively.

It has also been determined that the rate of penetration of ion-exchange reactions is strongly dependent on the ingredients of the ion-exchange solution. In particular, the rate of penetration decreases rapidly with an increasing PH value of the aqueous ion-exchange solution.

Through the choice of base glass composition, ingredients and acidity of the aqueous ion-exchange solution and reaction temperature and duration, there is no difficulty in reproducing precisely the thickness of ion-exchanged surface layer of about 2 micrometer and/or less. It is thus desirable to explore the theoretical as well as the practical limits on the minimum thickness of the silver (and copper) ion-exchanged surface layer which may render a net optical density (i.e. information carrying optical density) of 2 or more.

It is known that the covering power of silver grains in chemically developed photographic silver halide emulsions increases with decreasing grain size down to sizes of less than 0.04 micrometer and that the specific gravity of the chemically developed silver grains is about 2.5 g/cm$^3$ which is much less than that of the compact silver metals. If the above mentioned knowledge (which is pertinent to photographic silver halide emulsions) is applicable to the ion exchanged products of the present invention, the saturation optical density within an ion-exchanged surface layer can be estimated from the improved Nutting expression which relates the saturation optical density in a photographic deposit to the size and number of silver grains. The improved Nutting expression employed is an empirical equation which has been described by W. Romer, et. al. in the *Journal of Photographic Science* Vol. 11, page 132–135 (1963).

It has been determined that the concentration of silver ions in an ion-exchanged surface layer readily exceeds 10 mole % $Ag_2O$, i.e., about 30% $Ag_2O$ by weight, provided that the parent anhydrous glass contains more than 10 mole % total alkali metal oxides, and that proper combinations of the base glass compositions, the ingredients of the ion exchange solution and the conditions of the ion-exchange reactions exist. It has also been determined that the sizes of the AgCl-containing and/or $Ag_2O$-containing and/or $Ag^+$ ion-containing microcrystals and/or microphases within the ion exchanged surface layer is in general less than about 0.02 micrometer.

Based on the facts stated immediately above, it has been estimated using the improved Nutting expression that a saturation optical density of 3 or more can in principle be obtained within a surface layer of 0.1 micrometer, provided that all the silver ions in the ion-exchanged surface layer can be reduced through a prolonged exposure to high energy beams. With a finite E-beam exposure dosage, e.g. $5 \times 10^{-5}$ coulomb/cm$^2$, only a fraction of the reducible silver ions in the inventive product is transformed into silver specks of molecular dimension and/or minute silver metal particles. Therefore, an ion-exchanged surface layer of thickness more than 0.1 micrometer will in general be necessary to secure an optical density of 3 in a direct E-beam writing mode. A direct E-beam writing mode is defined herein as a mode of recording wherein an image with a high/good contrast is produced by exposure to an electron beam without any requirement for a subsequent development and/or image enhancement step.

It is most desirable to increase the fraction of silver ions which are reduced to silver metal specks and/or particles by a finite exposure-dosage of electron beams. Two approaches are realized and are elaborated in the paragraphs immediately below.

In the first approach, E-beam sensitivity of the ion-exchanged surface layer is increased in a direct writing mode through proper combinations of the various constituents of glass compositions, the ingredients of the ion exchange solution and the condition, i.e. temperature and duration of the ion-exchange reactions. Since it is the combination of all the variables cited immediately above in the proper relationships to produce the inventive products having good sensitivity to electron beams and exhibiting insensitivity and/or inertness to actinic radiation, it is in general difficult to interpret the effects of any single variable. Nevertheless, notable improvements in the E-beam sensitivity are readily observed resulting from the addition and/or inclusion of $TiO_2$ and/or chloride in the glass batches of the parent anhydrous glasses.

Besides acting as a RS-suppressing agent and as a photosensitivity-inhibitor, the inclusion of $TiO_2$ in the otherwise $TiO_2$-free glasses may increase the E-beam sensitivity of the resulting ion exchanged products up to more than 1000 folds, provided proper combinations of other variables are achieved. The increase in the E-beam sensitivity with an increasing concentration of $TiO_2$ usually level off quickly beyond a certain concentration of $TiO_2$ in the glass melt. For example, the relative E-beam sensitivities of the inventive products whose photosensitivity curves have been depicted by curves A, B, C and D of FIG. 10 are approximately about 1:100:100:100, where the corresponding parent anhydrous glass compositions contain 0, 1.5, 3.0 and 4.4% $TiO_2$ respectively. In this particular case, an increase of about two order of magnitudes in the E-beam sensitivity results from the initial addition of 1.5 mole % $TiO_2$, and a further increase in the concentration of $TiO_2$ in the glass melts does not have a strong effect on the E-beam sensitivity.

It has been found that there exists an apparent increase in the E-beam sensitivity due to the addition of $TiO_2$ in the parent anhydrous glass melts of the inventive products. As has been discussed above, the addition of ZnO, $TiO_2$, PbO, $ZrO_2$ and/or $Al_2O_3$ in the glass batches of the inventive products can be advantageously employed to increase the chemical durability and slow down the rates of the ion exchange reactions and thus render a better control in reproducing a thin ion-exchanged surface layer, e.g. of 1 micrometer in thickness. It has been further determined that the addition and/or the increase in the concentrations of these oxides, $TiO_2$ in particular, not only slow down the rates of the ion-exchange reactions, but also prevent the formation of a leached surface layer which may otherwise be present on top of the silver (and copper) ion exchanged surface layer. The leached surface layer, wherein most of the alkali metal ions are leached out instead of being exchanged by $Ag^+$ ions, has a composition approaching that of a fused silica, and thus has little or no sensitivity to electron beams. In the worst case, the leached surface layer may have a thickness comparable with or even exceeding the Bethe ranges of high voltage electron beams. Nevertheless, through proper combinations of the parent anhydrous glass compositions, the ingredients of the ion exchange solution and the conditions, i.e. the temperature and duration of the ion exchange reactions, the thickness of the leached surface layer can be reduced to zero. Since the presence of a leached surface layer prevents the ion-exchanged surface layer from seeing the full E-beam exposure-dosage, an apparent increase in E-beam sensitivity results from the diminution of the thickness of the leached layer on top of the ion-exchanged surface layer.

The E-beam sensitivity of the ion-exchanged surface layer increases with increasing chloride concentrations up to the maximum chloride concentration that can be retained in a glass melt. Therefore, it is desirable that the melting of the glass batches of the present invention is done in a chlorine or chlorine-containing atmosphere. Although one or more other halides may be advantageously included in the glass melts, fluoride, bromide and iodide are in general not so effective as chloride in promoting the E-beam sensitivity. As has been discussed above, the inclusion of at least one photosensitivity inhibitor is deemed necessary in the chloride containing glasses.

The amount of silver ions which are directly associated with chlorides, e.g. in the form of AgCl may represent about 10% of the total silver ions in the ion-exchanged surface layer. Nevertheless, the E-beam sensitivity of the inventive product is in general increased by a factor of more than two, due to the addition of chloride in the batch of the glass melt.

There may exist at least two mechanisms of enhancing the E-beam sensitivity due to the presence of chloride in the glass melts. First, silver ions in the AgCl-containing microphases and/or microcrystals are more susceptible to reduction by electron beams. Second, the E-beam exposed AgCl-containing microphases and/or microcrystals act as a catalyst during E-beam exposure on the silver ions which are not directly associated with the chloride in glass, much like the heat development phenomenon described immediately below.

In the second approach to increase the fraction of silver ions which is reduced to metallic silver with a finite exposure dosage of electron beams, the optical density in the E-beam exposed areas of the inventive products is increased via a post heat treatment process. Whereas the heat development step is found to increase the optical density of the E-beam exposed area, the areas not exposed to an electron beam show no change in transmittance and are totally unaffected by the post heat treatment. It is believed that heat causes the E-beam exposed AgCl in the AgCl-containing microphases and/or microcrystals to act as a catalyst on the silver ions dissolved in glass and on the other ionic silver-compound-containing phases/crystals, i.e. $Ag_2O$-containing and/or $Ag^+$ ion-containing microphases/microcrystals, as well as on silver ions not directly associated with $Cl^-$ in the AgCl-containing microphases/microcrystals to form metallic silver specks and/or particles.

The heat development step typically consists of heating at least the surface glass layer of the E-beam exposed glass articles of the inventive products to a temperature of about 100° C. for a few seconds, up to several hours. The heat development temperature is in general well below the annealing point of the ion-exchanged surface layer and also below the strain point of the parent anhydrous glass.

The post heat treatment to enhance the contrast of E-beam recorded image is not a necessary step for the products of the present invention, as far as to obtain values of optical density in excess of 2 within an ion-exchanged surface layer of thickness down to about and/or below 2 micrometer. However, the post heat treatment may be helpful in approaching the limiting thickness of 0.1 micrometer and/or in reducing the required E-beam dosage.

Although the heat development step is a useful image contrast enhancement process, optical densities in excess of 3 are readily obtained without the heat development step. Therefore, the absorption spectra of FIGS. 1 and 3, and the characteristic curves of FIGS. 4 to 8, as well as the E-beam sensitivity plot of FIG. 2 discussed previously represent those of the direct E-beam writing mode, wherein the image is produced instantaneously upon exposure to electron beams without the post heat treatment.

The heat development step will in general represent an improvement in E-beam sensitivity of less than one order of magnitude over the E-beam sensitivity in the direct writing mode. Nevertheless, a chemical development process to develop surface relief images which is discussed immediately below, has been found to increase the E-beam sensitivity of the products of the present invention up to and beyond two orders of magnitude over the sensitivities of the colored image formation in the direct E-beam writing mode.

It has been found that latent images and/or latent patterns delineated by electron beams, having little or no detectable optical density, can be developed into surface relief images and/or relief patterns of very high quality, through a brief immersion of the ion-exchanged glass article bearing the latent image/pattern in an aqueous solution containing HF. Apparently, the rate of dissolution and/or etching of the ion exchanged surface of the present products, by a HF containing solution, is substantially different between the E-beam exposed areas and the unexposed areas.

The latent images and/or latent patterns which are suitable for the chemical development into relief patterns/images are delineated by electron beams with exposure dosages which are sufficient to produce an optical density of more than about 0.01. The extent of thickness modulation, i.e. the aspect ratio in the relief pattern, is a function of the etching time and the concentration of HF in the chemical developer. In general, a longer etching time is necessary, when a lower concentration of HF solution is employed. The upper limit on the extent of thickness-modulation in the relief pattern is apparently related to the smaller of the two, either the Bethe-range of the electron beam or the thickness of the ion-exchanged surface layer. Since the minimum optical density in the E-beam generated image to render the latent images and/or latent patterns developable to relief images/patterns is very minimal, e.g. about 0.01, the accelerating voltage of the electron beams which are employed to delineate the latent images/patterns may be any value ranging from less than 5 kv to more than 50 kv.

Since the surface relief is permanent and durable, the potential applications of the products of the present invention includes phase gratings, surface relief holograms, and integrated optics.

Mass information may also be recorded in the products of the present invention in the form of surface relief, through an exposure to electron-image and a subsequent chemical development. A reflective coating deposited thereafter on the relief surface renders the recorded information retrievable optically in a reflection mode. Thus digital video discs, digital audio discs and the like can be produced utilizing the ion exchanged glass discs of the present invention via the following three process steps: first, the digital information is recorded with an electron-beam pattern generator, or is replicated using parallel exposure systems such as the 1:1 photocathode electron-image projection system or the demagnified electron-image projection system; second, the latent image generated from the exposure to electron beams is developed into a surface relief through a selective etching means; third, a reflective coating, e.g. thermally evaporated Al or Cr, is vacuum deposited on the relief surface.

The E-beam darkened/colored image within the ion-exchanged surface layer is due to the absorption of visible light by the silver specks therein of molecular dimensions and/or silver metal particles of less than a few hundred angstroms. The silver particles/specks in an oxidizing silicate glass matrix can often be redissolved at temperatures above about the annealing point of the glass matrix, i.e. of the ion-exchanged surface layer. The dissolution process may be explained as reoxidation of the silver particles/specks to ionic states at elevated temperatures by the oxide-glass constituents. The temperature at which redissolution takes place can be substantially lowered via either one or both of the following compositional modifications of the inventive products. First, when the ion-exchanged products of the present invention are prepared from more oxidized glass melts, the minimum temperature at which redissolution of silver particles/specks takes place is lowered. Consequently, whenever the erasure of the E-beam darkened image by heat is desirable, the glass batch of the parent glass melts shall contain oxidizing agents such as nitrates, e.g. at least part of the alkali metal oxide is added as alkali metal nitrate in the glass batches. Second, as the water content and/or the concentration of the silanol groups in the ion-exchanged surface layer increases, the annealing point of the ion exchanged surface layer decreases, and thus the minimum temperature at which redissolution of silver particles takes place is lowered. In general, the redissolution-temperature of silver particles in the glass matrix containing little or no water (e.g. silanol groups) is about 600° C., whereas, the redissolution-temperature of silver particles in a hydrated surface glass layer of the present products can be as low as or even below 250° C.

The high energy beam sensitive surface layer contains in general a large concentration of water/silanol groups, e.g. up to more than 6% by weight of $H_2O$. Consequently, the strain point, annealing point, and softening point of the ion-exchanged surface layer is sufficiently lower, e.g. up to and/or more than 300° C. lower than the corresponding temperatures of the parent anhydrous glass. The re-dissolution of silver particles can in general be carried out at temperatures where the parent anhydrous glass body is totally rigid. Therefore, no distortion of the surface figures of the glass articles may occur during the heat-erasure treatment, particularly in cases where the ion-exchanged surface layer is limited to less than a few micrometers. The strain point, annealing point and softening point of glasses are conventionally defined as the temperatures at which the viscosities of the glasses are $4 \times 10^4$ poises, $2.5 \times 10^{13}$ poises and $4 \times 10^7$ poises respectively.

Flood erasure, i.e. erasure of all the recorded bits within a macroscopic area or within an entire disk, can be achieved readily by contacting at least the surface portion of the recorded disk with a heat source. On the other hand, bits-by-bits erasure as well as flood erasure can be done with light beams having wavelengths longer than 2.7 micrometer in the infrared.

Among the most prominant absorption bands in the infrared spectra of the inventive products are those due to vibrational motions of $SiO_4$ tetrahedron, water and/or silanol groups, alkali metal ions and silver ions. The stretching vibrations of SiO bonds have large transition dipole moments and give rise to a broad absorption band (not totally resolved bands) in the region of 8–11.5 micrometer. The transition dipole moments which give rise to this absorption band/bands include those of the $v_3$ mode of $SiO_4$ tetrahedron and non-bridging oxygen-Si stretching mode. The broadness of the absorption band/bands is due to a statistical distribution of structural parameters such as bond lengths and bond angles. This very intense absorption band/bands coincides with the wavelength of $CO_2$ lasers. Therefore, a $CO_2$ laser may be employed to erase the E-beam recorded image and/or data within the ion exchanged surface layer of the present invention. The fundamental and the combination modes of water and/or silanol groups give rise to absorption in the wavelength ranges of 2.7–3.6 $\mu$m and 1.8–2.6 $\mu$m respectively.

MECHANISM OF DARKENING BY HIGH ENERGY BEAMS

The E-beam sensitive surface layer of the products of the present invention contains a high concentration of $Ag^+$ ions and/or a large number density of AgCl-containing and/or $Ag_2O$-containing and/or $Ag^+$ ion-containing microcrystals and/or microphases exhibiting insensitivity and/or inertness to actinic radiation. The composition and/or microstructure of the AgCl-containing microcrystals and/or microphases of the present products are undoubtedly different from those of the various photosensitive AgCl crystals which are present in the conventional photographic emulsions, in the photochromic glasses of U.S. Pat. Nos. 3,208,860 and 4,102,693, and in the photosensitive colored glasses exhibiting alterable photo-anisotropic effects of U.S. Pat. Nos. 4,191,547 and 4,297,417.

The mechanism of E-beam darkening as well as the compositional and/or structural origin within the microcrystals and/or microphases of the present products in eliminating the photosensitivity have not been totally understood.

Nevertheless, it is believed, based upon the evidence observed to date, that the energy band gap between the valence band and the conduction band of the AgCl-containing microcrystals and/or microphases within the ion exchanged surface layer of the present products increases due to the addition of the photosensitivity-inhibitors, e.g. $TiO_2$ in the glass melts of the parent anhydrous glasses. As long as the energy band gap is sufficiently large, e.g. sufficiently larger than the quanta of impinging radiation, the photosensitivity is eliminated.

It is also believed that the energy W which is the work necessary to remove an electron from a contacting silver metal particle/speck into a conduction level of a AgCl-containing microcrystal or microphase of the inventive products increases, as said band gap increases. in other words, the conduction energy levels of the AgCl-containing microcrystals and/or microphrases of the inventive products are raised relative to the valence band of the microcrystals and/or microphases, and are also raised relative to the filled conduction levels of the contacting metallic silver particles and/or specks, via the addition of photosensitivity-inhibitors in the glass melts.

The energy W is the minimum quanta of energy that are required to bleach/dissolve silver atoms or specks of silver metal which are in contact with the AgCl-containing microcrystals and/or the microphases. For example, the latent image of a AgCl-photographic emulsion having a W value of 1.3 ev can be bleached by red light. Therefore, when the value of W of E-beam exposed, silver specks-containing, microphases and/or microcrystals is greater than all the quanta of radiations including visible light and ultraviolet, the E-beam darkened image within the ion exchanged products of the present invention is inert to actinic radiation, and can not be bleached by red light nor other actinic radiations including uv and longer wavelengths.

The conduction energy levels of the AgCl-containing microcrystals and/or the microphases are raised to increasing extents through the addition of increasing amounts of photosensitivity-inhibitors in the glass melts. As a result, the conduction energy levels of the AgCl-containing microcrystals and/or microphases overlap increasingly with the conduction levels of the silicate glass network. As a consequence of the overlapping conduction band, AgCl-containing microcrystals and/or microphases become very effective traps for the transient free electrons that are generated by the E-beam in the silicate glass network, and thus a very efficient mechanism of reduction of silver ions by E-beam exists.

The transient electrons in the conduction band of the glass network are the secondary and/or the third electrons which exist immediately after the bombardment of the silicate glasses by high voltage electron beams, i.e. the primary electrons. The velocity distribution of the transient electrons are not in thermal equilibrium, and the transient density of the filled states in conduction levels of the glass network has maxima at the energy values corresponding to those of the secondary electrons and third electrons, etc.

The E-beam sensitivity of the inventive product in a direct writing mode remains high, as long as the lower levels of the conduction band of the AgCl-containing microcrystals and/or microphases are not raised too high to surpass the transiently filled conduction levels of the glass network.

The reduction of silver ions by the secondary and/or third electrons which are generated in the glass network, is accompanied by an electrolytic conductivity, i.e. the diffusion of silver ions toward initial silver specks. The diffusion of silver ions is most likely not limited to the silver ions that are directly associated with the $Cl^-$ ions. Namely, the silver ions within the microcrystals and/or microphases as well as the silver ions in the surrounding silicate glass network may diffuse toward the initial silver specks and/or or the initial AgCl lattice which is negatively charged due to the depletion of silver ions. It is believed that the diffusion of silver ions takes place within the inventive products in the direct E-beam writing mode at room temperature.

The direct E-beam writing mode is the manifestation of a print-out effect of the ion exchanged surface layer. The reduction of silver ions in the ion exchanged surface layer by a high voltage electron beam may have a quantum efficiency of up to or even in excess of 1000 due to the large number of secondary and third electrons. Apparently each primary electron causes the reduction of up to or more than one thousand silver ions within the ion exchanged surface layer of the present invention, provided that the accelerating potential of the electron beam is in excess of about 10 kv. A print-out effect is herein defined as the direct reduction, of silver ions by high energy beams to silver metal particles and/or specks, which results in an image of high/good contrast without any requirement for a subsequent development and/or image enhancement step.

The print-out effect is expected to take place, whenever the ion exchanged surface-layer of the present invention is bombarded with a high energy beam which generates scattered electrons within the surface layer. Besides the high voltage electron beams, high energy beams operable for the products of the present invention include ion beams (e.g. $H^+$, $H_2^+$, $Li^+$, $He^+$, $Ar^+$, $F^-$, and $Cl^-$ ions), atomic beams (e.g. spattered and/or thermally evaporated aluminum), molecular beams and x-ray. Therefore, the write beam suitable for the inventive products is deemed to include any of the high energy beams stated immediately above.

The print-out effect of the ion-exchanged surface layer upon exposure to actinic radiation such as depicted by curves A, F and G of FIG. 10 is not desirable, and the absence of such photosensitivity is one of the primary characteristics of the products of the present invention. Nevertheless, it is possible to adjust the value of energy W which is defined in the preceding paragraphs above to a proper value that the image within the ion-exchanged products is permanent under prolonged exposure to intense visible light and near-uv, yet, the print-out effect of the ion-exchanged surface layer is effective using the radiation having wavelengths of less than about 300 nm as a write beam. A suitable recording light beam is far-uv light in the wavelength range of 180 nm to 200 nm. The advantages of employing the far-ultraviolet radiation in the wavelength range of 180 nm to 200 nm are as follows: (1) the intense absorption of the radiation by the inventive products effectively limits the far-uv darkened image within a thickness of less than one micrometer; (2) either an excimer laser at 193 nm or the low-pressure mercury line at 185 nm can be employed as the write beam; (3) the optics can be fabricated from high-purity quartz.

ION-EXCHANGE-REACTIONS

The exact chemical reactions during the ion exchange process depend on the specific glass composition, the ingredients of the ion exchange solution as well as the temperature and duration of the ion exchange reactions. Although the exact chemical reactions are not known with complete certainty, following equations describe those reactions, at elevated temperatures, which appear most reasonable and common to all alkali metal silicate glasses immersed in aqueous ion-exchange solutions of the present invention.

$$H^+_{solu} + SiO^- M^+_{GL} \rightarrow SiOH + M^+_{solu} \qquad (1)$$

$$Ag^+_{solu} + SiO^- M^+_{GL} \rightarrow SiO^- Ag^+_{GL} + M^+_{solu} \qquad (2)$$

At least a portion of the alkali metal ions $M^+_{GL}$ in the glass network of surface layers are replaced by silver ions $Ag^+_{solu}$ and hydrogen ions $H^+_{solu}$ of the aqueous ion exchange solution. According to the Law of Mass Action $$\frac{[SiOH][M^+_{solu}]}{[H^+_{solu}][M^+_{GL}]} = K_1 \qquad (1a)$$

and $$\frac{[Ag^+_{GL}][M^+_{solu}]}{[Ag^+_{solu}][M^+_{GL}]} = K_2 \qquad (2a)$$

Where $K_1$ and $K_2$ are the equilibrium constants of reactions 1 and 2 respectively. Combining equations 1a and 2a, the concentration of silver ions in the ion exchanged surface layer is obtained. Namely, $$[Ag^+_{GL}] = \frac{K_2}{K_1}[SiOH]\frac{[Ag^+_{solu}]}{[H^+_{solu}]} \qquad (3)$$

$K_1$ is a function of the differences between the chemical potentials of hydrogen ions in glass and those of the various species of alkali metal ions in the glass matrix. $K_2$ relates to the chemical potentials of silver ions in glass relative to those of the various species of alkali metal ions in the matrix of the glass network.

For at least some of the alkali metal-titanium-zinc-alumino-silicate glasses, it has been determined that the smaller alkali metal cations in the glass network favors a greater extent of ion exchange by silver ions and hydrogen ions. Thus for example, a larger fraction of $Na^+$ ions in glass is exchanged by $Ag^+$ ions and $H^+$ ions than the fraction of $K^+$ ions being exchanged. It has been further determined that the relative amounts of silver ions and hydrogen ions being exchanged into the glass network is strongly dependent upon the acidity of the ion-exchange solution, and that the total amount (on the mole percent oxide basis) of alkali metal ions diffused out of the glass network of a given glass composition is relatively insensitive to the acidity of the aqueous ion exchange solution.

From equation 3, it is seen that the concentration of silver ions in the ion-exchanged surface layer is proportional to the concentration-ratio $[Ag^+_{solu}]:[H^+_{solu}]$ of silver ion to hydrogen ion in the aqueous ion exchange solution, and relates to the relative chemical potential of silver ions and hydrogen ions in glass, and is proportional to the concentration of silanol groups in glass.

The concentration of silanol groups, as is indicated in equation 3, is proportional to the concentration ratio $[H^+_{solu}]:[Ag^+_{solu}]$ of hydrogen ions to silver ions in the aqueous ion-exchange solution. However, the concentrations of silanol groups are not determined solely by the ion exchange reaction, since the silanol groups are also the reaction products of the glass hydration which occurs concomitantly with and/or precedes the ion exchange reactions of equations 1 and 2. The hydration reaction can be represented by equation 4.

$$SiOSi + H_2O \rightleftharpoons 2\ SiOH \qquad (4)$$

In the ion exchanged surface layer, some of the silanol groups may recombine while cooling in the autoclave to room temperature (as represented by the shorter arrow of equation 4, pointing left). It is conceivable that the forms of molecular water which are present in steam hydrated glasses (i.e. alkali metal silicate glasses having been hydrated in the gas phases), and were described by the present author in *Journal of Non-Crystalline Solids* 41 (1980) 381–398, may exist in the ion-exchanged surface layer at room temperature. Namely, molecular water may exist in resonance forms in equilibrium with hydrogen bonded silanol groups and hydroxyl groups.

The amount of total water in the integral ion-exchanged surface layer is readily measurable experimentally and is a function of the glass composition, the ingredients of the aqueous ion-exchange solution and the temperature of the ion-exchange reactions. The total water content in ion-exchanged glasses was determined experimentally from the weight loss on ignition at temperatures exceeding 800° C. The concentrations of various species of water including free silanol groups, hydrogen bonded silanol groups and molecular water in the ion-exchanged surface layer can be determined from near infrared spectra. However, the total water content as well as the concentrations of the various species of water at elevated temperatures during the ion-exchange reactions are in general not known precisely, since the ion-exchange reactions are not frozen instaneously from the elevated temperature. It is conceivable that the concentrations of the silanol groups at the reaction temperature increase with an increasing temperature of ion exchange reactions in an aqueous solution. Namely, the extent of forward reaction (toward right) in equation 4 increases at a higher reaction temperature. Due to the added concentration of silanol groups from hydration, the forward reaction of equation 1, i.e., the exchange of hydrogen ions for alkali metal ions in glass is suppressed. Consequently, more alkali metal ions in the glass network are available for exchanging with silver ions of the contacting aqueous solution. As a result, the concentration of silver ions in the ion-exchanged surface layer increases with the temperature of the ion exchange reactions.

Other operational parameters which have been employed to alter (or increase) the concentration of silver ions in the ion-exchanged surface layer are the concentrations of silver ions and hydrogen ions/hydronium ions in the aqueous ion exchange solution. (Even when the hydrogen ion, i.e., proton is the diffusion species, the hydronium ion is the predominant form of the proton in aqueous solutions, however, for the convenience of the presentation, hydronium ion and hydrogen ion is used herein interchangeably.) As is expected from equation 3, the concentration of silver ions in the ion-exchanged surface layer increases as the concentration of hydrogen ions in the aqueous ion exchange solution decreases, when the concentration of silver ions in the aqueous solution is kept constant. On the other hand, when the acidity of the aqueous solution is kept constant, the concentration of silver ions in the ion-exchanged surface layer increases with an increasing concentration of silver ions in the aqueous solution.

It has been determined that as the acidity of the aqueous ion-exchange solution is increased, the water content of the ion-exchanged surface layer increases. All the diffusion species in glass e.g. alkali metal ions, $H^+$ (and/or $H_3O^+$) and $Ag^+$ have larger values of diffusion coefficients in a more highly hydrated glass layer, and diffuse across the ion exchanged surface layer more quickly. Consequently, the rate of penetration of silver ions into the glass article in the thickness dimension increases with an increasing acidity of the aqueous ion-exchange solution.

As is apparent from the foregoing discussion, the important effects of the concentration of hydrogen ions in the aqueous ion exchange solution on the products of the present invention are at least twofold. Namely, as the acidity of the aqueous solution decreases, the penetration rate of the ion-exchange reactions decreases, and the concentration of silver ions in the ion-exchanged surface layer increases.

It is to be observed that there exists a lower limit on the concentration of hydrogen ions in the aqueous ion exchange solution. This is because the etching and/or dissolution of silicate glass network by the aqueous ion exchange solution become significant when the pH values of the aqueous solution exceeds about 3 to 7 depending on the glass composition. It is thus desirable to employ a buffered solution when the pH value of the aqueous solution employed is in excess of unity. A buffered solution is particularly desirable when the PH value of the aqueous ion exchange solution is in excess of 2. The etching and/or dissolution of the glass article can be further retarded through the inclusion in the aqueous ion exchange solutions of cations, $SiO_2$ in particular, of the glass constituents.

The temperature of the ion-exchange reactions is another important parameter in producing the products of the present invention. The concentration of silver ions in the ion-exchanged surface layer as well as the penetration rate of the ion-exchange reactions increase with an increasing temperature of the ion-exchange reactions.

The applicable range of the temperature of the ion-exchange reactions is closely related to the parent anhydrous glass compositions. The lower limit of the reaction temperature is observed at about 250° C. to 400° C. below the strain point of the parent anhydrous glass and the upper limit is at about the annealing point of the parent anhydrous glass.

The invention may be further understood by reference to the following illustrative examples.

EXAMPLE 1

Ground and polished glass plates of the examplary glass compositions 3, 6, 10, 13, 14, and 21 of Table I above were ion exchanged at 310° C. for 0.5 hour in an aqueous solution consisting of 20 g $AgNO_3$ + 200 g $LiNO_3$ + 4.4 g $Cu_2O$ + 40.9 g $Cu(NO_3)_2$ + 7.55 cc of 16 N $HNO_3$ + 1.1 g silica gel/liter of the aqueous solution.

The cuprous oxide reacted in the aqueous solution with the nitric acid therein. As results of the presence of $Cu_2O$, $CU(NO_3)_2$ and $HNO_3$, the aqueous solution buffered at a pH value of about 2.75 and, the effective molar ratio $[Ag^+]:[H^+]$ of silver ions to hydronium ions was about 65 in the aqueous solution. The very large value of the molar ratio insures a very high concentration of $Ag^+$ ions within the ion-exchanged surface layer.

The presence of more than about 1.5 mole % $TiO_2$ in the anhydrous base glasses as RS-suppression agents effectively suppressed the spontaneous yellow or brown coloration which may otherwise be present in the ion-exchanged surface layer due to the very high concentration of silver therein. Namely, the RS-suppression agents prevent spontaneous reduction of $Ag^+$ ions in glass upon ion-exchange reactions, to silver atoms and/or silver specks of molecular dimension and/or silver metal particles. $TiO_2$ also acted as a photosensitivity-inhibitor in said solution ion-exchanged glasses and at the same time, greatly improved the intrinsic and apparent sensitivity of the ion-exchanged surface layer to electron beams. As a result, said solution ion-exchanged glasses are colorless and transparent, and are highly sensitive to electron beams. Moreover, said solution ion-exchanged glasses are insensitive/inert to the radiation in the spectral ranges of ultraviolet throughout visible and longer wavelengths.

The combination of a high PH value in the aqueous ion-exchange solution and the presence of $TiO_2$ in the parent anhydrous glasses additively slows down the penetration rate of the ion-exchange reactions, and confines the thickness of the ion-exchanged surface layer to less than a couple of micrometers for an ion-exchange duration of 0.5 hour.

Said ion-exchanged glass plates were exposed to focused electron beams having an accelerating voltage of 20 kv. Isolated lines as well as square patches were recorded in the direct writing mode. To prevent static charges built up on the glass surface during E-beam exposures, a thin conducting film of gold of about 100 Å in thickness was coated prior to the E-beam exposure onto the ion-exchanged glass samples in a JEOL JEE4C thermal evaporator. The conductive coating was removed after the E-beam exposure.

The measured line width is 0.8 micrometer within all the samples of said solution ion-exchanged glasses of the exemplary glass compositions 3, 6, 10, 13, 14, and 21. Since the linewidths were measured with an optical microscope and the measured line widths of 0.8 micrometer is most likely the diffraction limited dimension, the true line widths in the glass samples are equal to or less than 0.8 micrometer.

Optical densities in excess of 2.5 at the absorption peak were obtained in the direct writing mode using 20 kv electron beams. The color of the darkened square areas in said ion-exchanged surface layer, observed under intense white light illumination in an optical microscope, is blue gray in the glass plates of the exemplary glass compositions 6 and 3, and is magenta in the glass plates of the exemplary glass compositions 10, 13, and 14, and is red in the exemplary glass composition 21.

Example 1 demonstrates that various colors of E-beam darkened images can be obtained through the variation of the parent anhydrous glass composition alone (it is of course necessary to maintain suitable combinations of the glass compositions, ingredients of the ion-exchange solution and the condition, i.e. temperature and duration of the ion-exchange reactions). Example 1 also demonstrates that the minimum geometries, e.g., line width, that can be delineated in the products of the present invention is less than 1 micrometer and most likely less than 0.8 micrometer.

EXAMPLE 2

Several sets of parallel lines of about 0.8 micrometer line width were recorded with a variety of E-beam exposure dosages using the direct writing mode within an ion-exchanged glass plate, from Example 1, of the exemplary glass composition 6. The line patterns were then contact printed onto photoresist coated silicon wafers using mercury lines at 436 nm and 405 nm for the contact exposures of the photoresist. Visually (observed under a microscope) perfect line patterns were replicated in the developed photoresist, from the various masking patterns (i.e., sets of parallel lines whose optical density varied from one set to another) delineated with various E-beam dosages down to $3 \times 10^{-5}$ coulomb/cm$^2$.

Example 2 demonstrates that the ion-exchange glass plates of the present invention can be employed to make photomasks which are suitable for photo-fabrication of microelectronic circuits or the like, and that the minimum E-beam dosage which is necessary to delineate the masking patterns within the ion-exchanged products of the present invention in the direct writing mode is equal to or less than about $3 \times 10^{-5}$ coulomb/cm$^2$.

EXAMPLE 3

Ground and polished glass plates of the exemplary glass compositions 13, and 14 of Table I were ion-exchanged at 340° C. for 5 minutes in an aqueous solution composed of 40 g $AgNO_3$+200 g $LiNO_3$+4.4 g $Cu_2O$+40.9 g $(Cu(NO_3)_2$+8.9 cc of 16N $HNO_3$+1.1 g silica gel/liter of the aqueous solution.

The aqueous solution buffered at a PH value of about 2.5 and the effective molar ratio $[Ag^+]:[H^+]$ of silver ions to hydronium ions was about 75 in the aqueous solution. $TiO_2$ and $Ta_2O_5$ which were included in the glass batches of the parent anhydrous glasses acted as RS-suppression agents. The presence of $TiO_2$ inhibits photosensitivity of the ion-exchanged glasses, and at the same time greatly improves the intrinsic as well as the apparent sensitivity of the ion-exchanged glasses to electron beams.

Said ion-exchanged glasses are colorless and transparent, and are highly sensitive to electron beams, and further more are insensitive/inert to the radiation in the spectral ranges of visible and longer wavelengths.

Said ion-exchanged glass plates were darkened in the direct writing mode by focused electron beams having an accelerating voltage of 20 kv. The measured line widths of the E-beam darkened lines were 0.8 micrometer. The color of the darkened square areas observed under an optical microscope with intense white light illumination is blue gray in said ion-exchanged glass plates of the exemplary glass composition 13 and is gray in said ion-exchanged glass plates of the exemplary glass composition 14.

Example 3 together with Example 1 serves to demonstrate the effect of the concentrations of the ingredients of the aqueous ion-exchange solution and/or the conditions of the ion-exchange reactions, in altering the E-beam induced coloration.

EXAMPLE 4

Ground and polished glass plates of the exemplary glass composition 6 of Table 1 were ion exchanged at 310° C. for 1 hour in an aqueous solution consisting of 200 g $AgNO_3$+70 cc of 16N $HNO_3$+1.1 g silica gel/liter of the aqueous solution.

The very high concentration of silver ions in the aqueous solution ensures a very high concentration of silver within the ion-exchanged surface layer. Said ion-exchanged glasses are colorless and transparent, and are highly sensitive to electron beams. Furthermore, said ion-exchanged glass plates are insensitive/inert to the radiation in the wavelength ranges of ultraviolet throughout visible and longer wavelengths.

The measured line widths of the E-beam darkened lines delineated with a focused electron beam operated at 20 kv in the direct writing mode are again 0.8 micrometer within the ion-exchanged surface layer. The color of the E-beam exposed areas observed under a microscope with intense white light illumination is reddish orange.

EXAMPLE 5

A set of six gratings consisting of three latent gratings and three absorption-gratings were delineated by focused electron-beams within an ion-exchanged glass plate, from Example 4, of the exemplary glass composition 6. The net optical density of the grating-rulings were varied from about 0.01 to 2 among the various gratings delineated by the focused electron beams. The net optical density is less than about 0.05 in the latent gratings and is more than 0.5 in the absorption gratings. The variation in the net optical density of the gratings was obtained via the variation in the exposure dosage (i.e., the charge density) and the accelerating voltages of the electron beams. The accelerating voltages of the electron beams employed are 10 kv and 20 kv.

Said ion-exchanged glass plate bearing the absorption gratings and the latent gratings therein was etched in an aqueous solution containing 2.5% by weight of HF at room temperature for 3 minutes. After being removed from the aqueous HF solution, the glass sample was rinsed with distilled water.

All of the six gratings delineated by the electron beams, within the ion-exchanged glass plate, were transformed into surface relief gratings through selective etching in the HF solution. High quality relief gratings having a spatial frequency of 600 line-pairs per millimeter were obtained. Pure phase-gratings which are colorless in the grating-rulings were obtained from the latent gratings. Absorption-phase gratings were made from the absorption gratings, namely, a thickness modulation due to surface relief is superimposed on the absorption gratings.

EXAMPLE 6

Ground and polished glass plates of the exemplary glass composition 6 of Table 1 were ion exchanged at 300° C. for 1 hour in an aqueous solution composed of 200 g $AgNO_3$+76.6 cc of 16N $HNO_3$+55.5 g $Cu(NO_3)_2$+200 g $LiNO_3$+1.1 g silica gel/liter of the aqueous solution.

Said ion-exchanged glass plates are colorless and transparent, and are highly sensitive to electron beams. Moreover, these ion-exchanged glasses are insensitive/inert to radiation in the spectral ranges of ultraviolet throughout visible and longer wavelengths. The measured line widths of the E-beam darkened lines delineated with a focused electron beam operated at 20 kv in a direct writing mode are 0.8 micrometer within said ion-exchanged glass plates. The color of the E-beam exposed area observed under a microscope with intense white light illumination is magenta.

Example 6 together with Examples 4 and 1 serve to demonstrate that various E-beam induced colorations can be obtained within a variety of ion-exchanged glasses which are prepared from a single parent anhydrous glass composition.

EXAMPLE 7

An ion-exchanged glass plate from Example 6 bearing E-beam darkened areas was immersed into a preheated oil bath at 100°° C. for 2 hours. The optical density of the E-beam darkened square patches was increased from 1.86 to 2.20 at the wavelength of the absorption peak due to the low temperature heat treatment. The areas unexposed to E-beam remained colorless and have a transmittance value of 91.5% throughout the visible spectral range, before and after the low temperature heat treatment. Example 7 demonstrates the possibility of utilizing a low temperature heat treatment to enhance the contrast of images delineated with electron beams.

EXAMPLE 8

Ground and polished glass plates of the exemplary glass compositions 41, 42 and 43 of Table 1 were ion exchanged at 310° C. for 0.5 hour in an aqueous solution consisting of 100 g $AgNO_3$+30 cc of 16N $HNO_3$+1.1 g silica gel+55.6 g $Cu(NO_3)_2$+ ®g $LiNO_3$/liter of the aqueous solution. The ion-exchanged glasses are colorless and transparent, and are highly sensitive to electron beams, moreover, are insensitive/inert to radiation in the wavelength ranges of ultraviolet throughout visible and longer wavelengths. The colorations of the areas exposed to electron beam at 25 kv are reddish brown, gold yellow and brown in said ion-exchanged glass plates of the exemplary glass compositions 41, 42, and 43 respectively.

EXAMPLE 9

Ground and polished glass plates of the exemplary glass compositions 41, 42, 43, 44, and 45 of Table I were ion exchanged at 310° C. for 0.5 hour in an aqueous solution consisting of 20 g $AgNO_3$+200 g $LiNO_3$+5.7 g $Cu_2O$+41 g $Cu(NO_3)_2$+10.8 cc of 16N $HNO_3$+1.1 g $SiO_2$/liter of the aqueous solution. Said ion-exchanged glass plates are colorless and transparent, and are highly sensitive to electron beams, moreover, are insensitive/inert to the radiation in the spectral ranges of near-uv throughout visible and longer wavelengths. The colorations of the areas exposed to electron beam at 25 kv are bluish magenta, magenta, magenta, bluish magenta and red in said ion-exchanged glass plates of the exemplary glass compositions 41, 42, 43, 44 and 45 respectively.

EXAMPLE 10

Seven square areas, 1.2 mm×1.2 mm each, were uniformly darkened within an ion-exchanged glass plate of the exemplary glass composition 41, from Example 9, in a direct writing mode to optical densities of 2.40, 2.10, 1.55, 0.97, 0.52, 0.37 and 0.24 at the wavelength of the absorption peak. The corresponding optical densities at 436 nm were 1.93, 1.64, 1.25, 0.81, 0.47, 0.36 and 0.24. The glass plate bearing the seven E-beam darkened areas was then immersed into a pre-heated oil bath at 100° C. for a total of six hours. At every two hour intervals, the sample was taken out of the oil bath to examine under a microscope, paying particular attention to any change in the color of the E-beam darkened square patches and the surface quality of the glass sample. The optical densities of the square patches were measured at 436 nm at the 2 hour intervals.

No change in the optical densities and color/hue of the E-beam darkened square patches were detected throughout the stability test at 100° C. The transmittance of the areas unexposed to E-beam remained constant at 92% throughout the visible spectral range, and the surface quality of the ion-exchanged glass plate remained unchanged throughout the stability test at 100° C.

In a separate experiment thereafter, the surface of the glass plate bearing the seven E-beam darkened areas was brought into contact with a hot plate at 350° C. for a very brief period of less than about a couple of seconds. The contact is thought to be just sufficient to heat the ion-exchanged surface layer to about 350° C. It was found that all seven E-beam darkened patches disappeared without leaving any trace of being previously darkened. Namely, the E-beam darkened color images were thermally erased to a colorless state which is totally transparent in the visible spectral range. In fact, the transmittance of the erased areas as well as the areas not exposed previously to electron beams have identical transmittance throughout the entire spectral range. Apparently, the color centers, i.e., the silver metal particles and/or specs of molecular dimensions are re-dissolved, within the ion-exchanged surface layer, instantaneously at the hot plate temperature of about 350° C.

EXAMPLE 11

Ground and polished glass plates of the exemplary glass composition 46 of Table I were ion exchanged at 320° C. for 0.5 hours in an aqueous solution composed of 200 g $AgNO_3$+36.7 cc of 16N $HNO_3$+55.6 g $Cu(NO_3)_2$+200 g $LiNO_3$+2.2 g silica gel/liter of the aqueous solution. The ion-exchanged glasses are colorless and transparent, and are highly sensitive to electron beams. Moreover, said ion-exchanged glasses are insensitive/inert to the radiation in the spectral ranges of near-uv throughout visible and longer wavelengths.

Two square areas within the ion-exchanged surface layer were darkened in a direct E-beam writing mode to an optical density of 3.30 (the absorption spectra is represented by curve 4 of FIG. 1) at the wavelength of the absorption peak. The corresponding optical density at 436 nm was 2.48. The glass plate bearing the E-beam darkened areas was immersed into a pre-heated oil bath at 100° C. for a total of 6 hours. At every 2 hour interval, the sample was taken out of the oil bath to examine under microscope paying particular attention to any change in the color of the E-beam darkened square patches and the surface quality of the glass sample. The optical density of the square patches was measured at 436 nm at the two hour intervals. No change in the optical density and color/hue of the colored square patches were detected throughout the stability test at 100° C. The transmittance of the areas unexposed to E-beam remained constant at 90.6% throughout the visible spectral range, and the surface quality of the ion-exchanged glass plate remained unchanged throughout the stability test at 100° C.

In a separate experiment thereafter, the glass plate bearing the two E-beam darkened square patches was immersed into a preheated oil bath at 232.2° C. (450° F.). The optical density at 436 nm was reduced from 2.48 to 0.16 in 10 minutes and was further reduced to 0.04 after 1 hour immersion in oil at 232.2° C.

EXAMPLE 12

Ground and polished glass plates of the exemplary glass compositions 37, 38, and 39 of Table I were ion-exchanged at 320° C. for 0.5 hour in an aqueous solution consisting of 200 g $AgNO_3$+70 cc of 16N $HNO_3$+55.6 g $Cu(NO_3)_2$+200 g $LiNO_3$+2.2 g silica gel/liter of the aqueous solution. The ion-exchanged glasses are colorless and transparent, and are highly sensitive to electron beams, moreover, are insensitive/inert to the radiation in the spectral ranges of ultraviolet throughout visible and longer wavelengths.

The E-beam induced colorations within said ion-exchanged glass plates exposed to electron beams at 25 kv are more or less identical for the three compositions. For all these ion-exchanged glasses, the E-beam induced coloration invariably changes with an increasing E-beam exposure dosage from very light gray to light bluish magenta, to magenta and to a deep colored red.

EXAMPLE 13

Six square areas, 1.2 mm×1.2 mm each, were uniformly darkened within an ion-exchanged glass plate, from Example 12, of the exemplary glass composition 37 in a direct writing mode with 35 kv electron beams to optical densities of 0.42, 0.64, 1.33, 1.94, 2.53 and 2.76 at the wavelength of the absorption peak. The charge densities employed to darken these square patches are $(1.92\pm0.25)\times10^{-5}$, $(3.2\pm0.25)\times10^{-5}$, $(8\pm0.25)\times10^{-5}$, $(16\pm0.25)\times10^{-5}$, $(32\pm0.25)\times10^{-5}$, $(64\pm0.25)\times10^{-5}$ coulomb/$cm^2$, respectively. The corresponding optical densities were 0.35, 0.525, 1.05, 1.52, 2.01 and 2.23, respectively, at 436 nm, and were 0.39, 0.63, 1.27, 1.73, 2.10 and 2.21, respectively, at 546 nm.

The E-beam darkened square images were totally erased by immersing said ion-exchanged glass plate bearing the color patches into a preheated oil bath at 232.2° C. (450° F.) for two hours.

Said ion-exchanged glass plate after being darkened and erased was again exposed to the electron-beam at 35 kv. Six square areas, 1.2 mm×1.2 mm each, were again darkened in the direct writing mode, using the same charge densities at the six dosage levels previously employed. The optical densities of the square patches at the wavelength of the absorption peak are 0.33, 0.54, 1.23, 2.01, 2.67 and 2.98. The corresponding optical densities are 0.30, 0.46, 0.97, 1.60, 2.16 and 2.43, respectively, at 436 nm, and are 0.32, 0.53, 1.16, 1.75, 2.10 and 2.30 at 546 nm, respectively.

The optical densities as well as the absorption band shapes, peak wavelengths, and the absorption band widths are identical within experimental precision, before and after the erasure. Namely, the sensitivity to E-beam in a direct writing mode and the E-beam induced coloration are unchanged by the heat-erasure treatment.

EXAMPLE 14

Images delineated with high voltage electron beams within the following ion-exchanged glasses are yellow in color which is the manifestation of an E-beam induced absorption band centered in the blue to near-ultraviolet spectral ranges:

(a) Ground and polished glass plates of the exemplary glass composition 40, of Table I above, which have been ion-exchanged at 310° C. for 0.5 hour in an aqueous solution consisting of 200 g $AgNO_3$+70 cc $HNO_3$+111 g $Cu(NO_3)_2$+400 g $LiNO_3$+1.33 g silica gel/liter of the aqueous solution.

(b) Ground and polished glass plates of exemplary glass composition 49, of Table I above, which have been ion exchanged at 300° C. for 30 minutes in an aqueous solution consisting of 20 g $AgNO_3$+200 g $LiNO_3$+41 g $Cu(NO_3)_2$+26.4 cc of 16N $HNO_3$+13.2 g $Cu_2O$+1.1 g silica gel/liter of the aqueous solution.

(c) Ground and polished glass plates of exemplary composition 8 of Table I, which have been ion exchanged at 320° C. for 0.5 hour in an aqueous solution consisting of 200 g $AgNO_3$+33.3 cc of 16N $HNO_3$+55.6 g $Cu(NO_3)_2$+200 g $LiNO_3$+1.67 g silica gel/liter of the aqueous solution.

I claim:

1. A glass article comprising a body portion and an integral ion-exchanged surface layer (IIES layer), said glass article exhibiting the following properties:
   (a) sensitivity to high energy beams; and
   (b) insensitivity to at least a spectral portion of actinic radiation, and being insensitive to radiation of shorter wavelengths as concentration of $TiO_2$ in chloride containing glass composition of the glass article increases;
said body portion composed of a glass composition consisting essentially of, in mole percent on the oxide basis,
   5-25% of one or more alkali metal oxides,
   at least 1.5% $TiO_2$, but not exceeding 35% $TiO_2$, the composition containing at least an effective amount of $TiO_2$ to render the IIES layer insensitive to at least a spectral portion of actinic radiation,
   up to 20% MgO,
   up to 20% CaO,
   up to 20% ZnO,
   up to 15% $Al_2O_3$,
   up to 20% PbO,
   up to 20% BaO,
   up to 25% $B_2O_3$,
   up to 25% $P_2O_5$,
   2-35% of at least one acid-durability-and-glass-network-strengthener (ADAGNS) selected from the group consisting of MgO, ZnO, $Al_2O_3$, PbO, and CaO,
   up to 4% F,
   up to 2% Br,
   up to 2% I,
   up to 6% Cl, and
   50-89% $SiO_2$,
said IIES layer composed of a surface layer of said glass composition that has been ion exchanged with an acidic aqueous solution containing soluble ionic silver to diffuse silver ions into said IIES layer to render said IIES layer sensitive to high energy beams, said IIES layer comprising,
   silver ions, and
   water in a concentration greater than about 0.01% by weight $H_2O$.

2. The glass article of claim 1 wherein at least a portion of the silver ions in the IIES layer are in microcrystals in halides and/or halide containing microphases in said IIES layer.

3. The glass article according to claim 2 wherein the average grain size of the microcrystals and microphases in the IIES layer are less than 0.1 micrometer.

4. The glass article according to claim 3 wherein the average grain size of the microcrystals and microphases in the IIES layer are less than 0.03 micrometer in diameter.

5. The glass article according to claim 4 wherein at least a portion of said microcrystals and microphases in the IIES layer have grain size of less than 80 angstroms.

6. The glass article of claim 2 wherein said microcrystals and/or microphases also containing at least trace amounts of at least one of the following: alkali metal ions, PI agents, RSS agents, and other ingredients contained in said IIES layer.

7. The glass article of claim 1 wherein the silver ion concentration in the IIES layer is between about 0.1% and 25% $Ag_2O$ on the mole percent anhydrous glass basis.

8. The glass article of claim 1 wherein the glass composition contains in mole percent,
   2-20% ZnO,
   0.5-5% $Al_2O_3$ and
   1.5-25% $TiO_2$.

9. The glass article of claim 1 wherein said ADAGNS are selected from the group consisting of ZnO, $Al_2O_3$ and mixtures thereof.

10. The glass article of claim 9 wherein the glass composition contains in mole percent,
    2-20% ZnO,
    0-10% $Al_2O_3$ and
    1.5-25% $TiO_2$.

11. The glass article of claim 10 wherein the alkali metal oxides are selected from the group consisting of $Li_2O$, $Na_2O$, $K_2O$ and mixtures thereof.

12. The glass article of claim 11 wherein the glass composition contains, in mole percent,
    10-20% alkali metal oxide, and
    0.8-6% Cl.

13. The glass article of claim 12 wherein the glass composition contains, in mole percent,
    3-10% $TiO_2$, and
    60-82% $SiO_2$.

14. The glass article of claim 12 wherein the concentration of the water in said IIES layer is between about 0.1% and 12% by weight $H_2O$.

15. The glass article of claim 12 wherein the portion of silver ions directly associated with chloride in the IIEs layer are present in amounts up to 3% $Ag_2O$ on the mole percent anhydrous glass basis, the portion of silver ions present as dissolved ions in the IIES layer are present in amounts up to 20% $Ag_2O$ on the mole percent anhydrous glass basis, and the concentration of alkali metal ions in the IIES layer decreases as the concentration of the dissolved silver ions increases.

16. The glass article of claim 11 wherein the glass composition contains at least two of the alkali metal oxides selected from the group consisting of $Li_2O$, $Na_2O$ and $K_2O$.

17. The glass article to claim 11 wherein the glass composition contains $Li_2O$, $Na_2O$ and $K_2O$ and the molar concentration ratio of $Li_2O$ and $Na_2O$ to $K_2O$ is more than 0.6.

18. The glass article of claim 1 wherein said IIES layer also comprises at least a trace amount of copper ions, that are diffused into said IIES layer during the ion exchange with the acidic aqueous solution wherein said solution also contains soluble ionic copper.

19. The glass article of claim 1 wherein the thickness of said IIES layer is more than about 0.1 micrometers.

20. The glass article of claim 1 wherein the thickness of said IIES layer is less than about 10 micrometer.

21. The glass article of claim 1 wherein the thickness of said IIES layer is less than about 3 micrometers.

22. The glass article according to claim 1 wherein the glass composition contains at least sufficient amounts of PI agents, RSS agents and ADAGNS selected from the group consisting of ZnO, $Al_2O_3$, MgO, CaO and PbO to prevent even the slightest etching of the surface of the IIES layer by the aqueous ion exchange solution during ion exchange.

23. The glass article according to claim 1 wherein said spectral portion of the actinic radiation has wavelengths longer than 300 nm.

24. The glass article according to claim 1 wherein said spectral portion of the actinic radiation has wavelengths longer than 400 nm.

25. The glass article according to claim 1 wherein the glass composition contains a saturated concentration of Cl at its glass melting temperature provided the concentration of Cl does not exceed 6%.

26. The glass article according to claim 1 wherein the glass article is transparent and colorless.

27. A glass article comprising a body portion and an integral ion-exchanged surface layer (IIES layer), said glass article exhibiting the following properties:
   (a) sensitivity to high energy beams; and
   (b) insensitivity to at least a spectral portion of actinic radiation, and being insensitive to radiation of shorter wavelengths as concentration of $TiO_2$ in chloride-containing glass composition of the glass article increases;
said body portion composed of a glass composition consisting essentially, in mole percent on the oxide basis, of,
   12–16% $Li_2O$, $Na_2O$, $K_2O$ and combinations thereof,
   3% to 10% $TiO_2$, the glass composition containing a sufficient amount of $TiO_2$ to render the IIES layer insensitive to at least a spectral portion of the actinic radiation,
   4–10% ZnO,
   0.5–5% $Al_2O_3$,
   0.8–6% Cl, and
   68–75% $SiO_2$,
said IIES layer composed of a surface layer of said glass composition that has been ion-exchanged with an acidic aqueous solution containing soluble ionic silver to diffuse silver ions into said IIES layer to render said IIES layer sensitive to high energy beams, said IIES layer containing,
   silver ions, and
   water in an amount of between about 0.01% and 12% by weight $H_2O$.

28. The glass article of claim 27 wherein at least a portion of the silver ions in the IIES layer are in microcrystals of halides and/or halide containing microphases in said IIES layer.

29. The glass article of claim 28 wherein said microcrystals and/or microphases also contain at least trace amounts of at least one of the following: alakli metal ions, $TiO_2$, and ZnO, $Al_2O_3$ and other ingredients contained in said IIES layer.

30. The glass article of claim 27 wherein a first portion of the silver ions in the IIES layer is dissolved in the IIES layer and a second portion is associated with halides.

31. The glass article of claim 30 wherein the first portion of the silver ions is present in amounts up to 16% $Ag_2O$ on the mole percent anhydrous glass basis, and the concentration of alkali metal ions in the IIES layer decreases as the concentration of the first portion of the silver ions increases.

32. The glass article of claim 27 wherein the glass composition contains at least two of the alkali metal oxides of $Li_2O$, $Na_2O$ and $K_2O$.

33. The glass article of claim 27 wherein the glass composition contains $Li_2O$, $Na_2O$ and $K_2O$ and the molar concentration ratio of $Li_2O$ and $Na_2O$ to $K_2O$ is more than 0.6.

34. The glass article of claim 27 wherein the glass composition comprises at least 1 mole percent $Li_2O$.

35. The glass article of claim 27 wherein the amount of said water in said IIES layer is between about 0.1–6% by weight $H_2O$.

36. The glass article according to claim 27 wherein the glass composition contains at least sufficient amounts of $TiO_2$, ZnO and $Al_2O_3$ to prevent even the slightest etching by the aqueous ion exchange solution during ion exchange.

37. The glass article according to claim 27 wherein said spectral portion of the actinic radiation has wavelengths longer than 300 nm.

38. The glass article according to claim 27 wherein said spectral portion of the actinic radiation has wavelengths longer than 400 nm.

39. The glass article according to claim 27 wherein the glass composition contains a saturated concentration of Cl at its glass melting temperature provided the concentration of Cl does not exceed 3%.

40. The glass article according to claim 27 wherein the glass article is transparent and colorless.

41. The glass article of claim 27 wherein said IIES layer also comprises at least a trace amount of copper ions that are diffused into said IIES layer during the ion exchange with the acidic aqueous solution wherein said solution contains soluble ionic copper.

42. A glass article comprising a body portion and an integral ion-exchanged surface layer (IIES layer), said glass article exhibiting the following properties:
   (a) sensitivity to high energy beams; and
   (b) insensitivity to at least a spectral portion of actinic radiation, and being insensitive to radiation of shorter wavelengths as concentration of photosensitivity inhibitors in chloride containing glass composition of the glass article increases;
said body portion composed of a glass composition consisting essentially, in mole percent on the oxide basis, of
   13.4–20.9% $Li_2O$, $Na_2O$, $K_2O$, $Rb_2O$, $Cs_2O$ and combinations thereof,
   0.5–8.4% total of photosensitivity inhibitors (PI agents) and RS-suppression agents (RSS agents), the composition containing at least an effective amount of PI agents to render said IIES layer insensitive to at least a spectral portion of the actinic radiation, including 0.5 to 7.4% $TiO_2$,
   3.6–7.6% ZnO,
   0.6–2.4% $Al_2O_3$,
   up to 10.8% MgO,
   up to 4% CaO,
   up to 4% BaO,
   up to 3.5% PbO,
   up to 4% SrO,
   up to 7.2% $B_2O_3$, up to 7.2% $P_2O_5$
up to 1.5% halide selected from the group consisting of F, Br, I and combinations thereof,
0–3.8% Cl, and
58.5–73.2% $SiO_2$,
said IIES layer composed of a surface layer of said glass composition that has been ion-exchanged with an acidic aqueous solution containing soluble ionic silver to diffuse silver ions into said IIES layer to render said IIES layer sensitive to high energy beams, said IIES layer containing,
   silver ions, and
   water in an amount of between about 0.01% and 12% by weight $H_2O$.

43. The glass article of claim 42 wherein at least a portion of the silver ions in the IIES layer are in microcrystals of halides and/or halide containing microphases in said IIES layer.

44. The glass article according to claim 43 wherein said microcrystals and/or microphases also contain at least trace amounts of at least one of the following: alkali metal ions, PI agents, RSS agents, and other ingredients contained in said IIES layer.

45. The glass article of claim 42 wherein the PI agents and the RSS agents are selected from the group consisting of $TiO_2$, $Ta_2O_5$, $ZrO_2$, $Nb_2O_5$, $La_2O_3$, $Y_2O_3$, $WO_3$ and mixtures thereof.

46. The glass article according to claim 45 wherein a first portion of the silver ions in the IIES layer is dissolved in the IIES layer and a second portion is associated with halides.

47. The glass article of claim 46 wherein the first portion of the silver ions is present in amounts up to 20.9% $Ag_2O$ on the mole percent anhydrous glass basis, and the concentration of alkali metal ions in the IIES layer decreases as the concentration of the first portion of the silver ions increases.

48. The glass article of claim 45 wherein in addition to ZnO and $Al_2O_3$ the glass composition includes at least one additional acid-durability-and-glass network strengthener selected from the group consisting of MgO, CaO, SrO and PbO.

49. The glass article according to claim 42 wherein the glass composition contains at least two of the alkali metal oxides of $Li_2O$, $Na_2O$ and $K_2O$.

50. The glass article according to claim 42 wherein the glass composition contains $Li_2O$, $Na_2O$ and $K_2O$ and the molar concentration ratio of $Li_2O$ and $Na_2O$ to $K_2O$ is more than 0.6.

51. The glass article according to claim 42 wherein the glass composition contains at least 1 mole percent $Li_2O$.

52. The glass article according to claim 42 wherein said amount of the water in said IIES layer is between about 0.1–6% by weight $H_2O$.

53. The glass article according to claim 42 wherein the glass composition contains at least sufficient amounts of PI agents, RSS agents and ADAGNS to prevent even the slightest etching by the aqueous ion exchange solution during ion exchange.

54. The glass article of claim 42 wherein the glass composition contains 13.4% to 15.3% $Li_2O$, $Na_2O$, $K_2O$ and mixtures thereof.

55. The glass article of claim 54 wherein the glass composition contains 1.5% to 5.9% $TiO_2$.

56. The glass article of claim 55 wherein the glass composition contains 3% to 4.5% $TiO_2$.

57. The glass article of claim 42 wherein the glass composition contains a saturated concentration of Cl at its glass melting temperature provided the concentration of Cl does not exceed 3.8%.

58. The glass article according to claim 42 wherein the glass article is transparent and colorless.

59. The glass article of claim 42 wherein said IIES layer also comprises at least a trace amount of copper ions that are diffused into said IIES layer during the ion exchange with the acidic aqueous solution wherein said solution contains soluble ionic copper.

60. A glass article comprising a body portion and an integral ion-exchanged surface layer (IIES layer), said glass article exhibiting the following properties:
   (a) sensitivity to high energy beams; and
   (b) insensitivity to at least a spectral portion of actinic radiation, and being insensitive to radiation of shorter wavelengths as concentration of photosensitivity inhibitors in chloride containing glass composition of the glass article increases;
said body portion composed of a glass composition consisting essentially of, in mole percent on the oxide basis,
3–25% of one or more alkali metal oxides,
at least 1.5%, but not more than 35%, of photosensitivity inhibitors (PI agents) selected from the group consisting of $TiO_2$, $Nb_2O_5$, $Y_2O_3$, $Ta_2O_5$ and combinations thereof, the composition containing at least an effective amount of the PI agents to render the IIES layer insensitive to at least a spectral portion of actinic radiation,
up to 35% of acid-durability-and-glass-network strengtheners (ADAGNS),
up to 25% $P_2O_5$,
up to 25% $B_2O_3$,
up to 4% F,
up to 6% Cl,
up to 2% Br,
up to 2% I, and
20–93% $SiO_2$,
the sum amount of the above components constituting at least 75 mole percent of the glass composition, said IIES layer composed of a surface layer of said glass composition that has been ion exchanged with an acidic aqueous solution containing soluble ionic silver to diffuse silver ions into said IIES layer to render the IIES layer sensitive to high energy beams, said IIES layer comprising,
   silver ions, and
   water in a concentration greater than about 0.01% by weight $H_2O$.

61. The glass article of claim 60 wherein the glass composition includes at least one acid-durability-and-glass-network strengthener (ADAGNS) selected from the group consisting of MgO, ZnO, CaO, PbO, SrO and $Al_2O_3$.

62. The glass article of claim 61 wherein the total mole percent of the ZnO, $Al_2O_3$, CaO, MgO, SrO and PbO in the glass composition is from 2% to 35%.

63. The glass article of claim 61 wherein said ADAGNS are selected from the group consisting of ZnO, $Al_2O_3$ and mixtures thereof.

64. A glass article comprising a body portion and an integral ion-exchanged surfacer layer (IIES layer), said glass article exhibiting the following properties:
   (a) sensitivity to high energy beams; and
   (b) insensitivity to at least a spectral portion of actinic radiation, and being insensitive to radiation of shorter wavelengths as concentration of photosensitivity inhibitors in chloride containing glass compositions of the glass article increases, said body portion composed of a glass composition consisting essentially of, in mole percent on the oxide basis, 5-25% total of $Li_2O$, $Na_2O$ and $K_2O$, 1.2-35% total of photosensitivity inhibitors (PI agents) and RS-suppression agents selected from the group consisting of $TiO_2$, $Ta_2O_5$, $ZrO_2$, $Nb_2O_5$, $La_2O_3$, $Y_2O_3$ and $WO_3$, provided an effective amount of PI agents is included to render the IIES layer insensitive to at least a spectral portion of actinic radiation, including 1.2% to 25% $TiO_2$, 2-20% ZnO, up to 10% $Al_2O_3$, up to 20% MgO, up to 20CaO, up to 20% PbO, provided that the amount of acid-durability-and-glass-network strengtheners (ADAGNS) selected from the group consisting of MgO, ZnO, $Al_2O_3$, PbO and CaO, is from 2 to 35%, up to 20% BaO, up to 25% $B_2O_3$, up to 25% $P_2O_5$, up to 3% total of F, Br, and I, up to 6% Cl, and 50-89% $SiO_2$ said IIES layer composed of a surface layer of said glass composition that has been ion exchanged with an acidic aqueous solution containing soluble ionic silver to diffuse silver ions into said IIES layer to render said IIES layer sensitive to high energy beams, said IIES layer comprising, silver ions, and water in a concentration greater than about 0.01% by weight $H_2O$.

65. The glass article of claim 64 wherein at least a portion of the silver ions in the IIES layer are in microcrystals of halides and/or halide containing microphases in said IIES layer, and the average grain size of the microcrystals and microphases in the IIES layer is less than 0.1 micrometer.

66. The glass article according to claim 65 wherein the average grain size of the microcrystals and microphases in the IIES layer is less than 0.03 micrometer in diameter.

67. The glass article according to claim 66 wherein at least a portion of said microcrystals and microphases in the IIES layer has grain size of less than 80 angstroms.

68. The glass article of claim 65 wherein the silver ion concentration in the IIES layer is between about 0.1% and 25% $Ag_2O$ on the mole percent anhydrous glass basis.

69. The glass article of claim 65 wherein the glass composition contains in mole percent, 0.5-5% $Al_2O_3$.

70. The glass article of claim 69 wherein the alkali metal oxides are selected from the group consisting of $Li_2O$, $Na_2O$, $K_2O$ and mixtures thereof.

71. The glass article of claim 70 wherein the glass composition contains in mole percent, 10-20% alkali metal oxide, and 0.8-6% Cl.

72. The glass article of claim 71 wherein the glass composition contains in mole percent, 3-10% $TiO_2$, and 60-82% $SiO_2$.

73. The glass article of claim 71 wherein the concentration of the water in said IIES layer is between about 0.1% and 12% by weight $H_2O$.

74. The glass article of claim 71 wherein the portion of silver ions directly associated with chloride in the IIES layer are present in amounts up to 3% $Ag_2O$ on the mole percent anhydrous glass basis, the portion of silver ions present as dissolved ions in the IIES layer are present in amounts up to 20% $Ag_2O$ on the mole percent anhydrous glass basis, and the concentration of alkali metal ions in the IIES layer decreases as the concentration of the dissolved silver ions increases.

75. The glass article of claim 70 wherein the glass composition contains at least two of the alkali metal oxides selected from the group consisting of $Li_2O$, $Na_2O$ and $K_2O$.

76. The glass article of claim 70 wherein the glass composition contains $Li_2O$, $Na_2O$ and $K_2O$ and the molar concentration ratio of $Li_2O$ and $Na_2O$ to $K_2O$ is more than 0.6.

77. The glass article of claim 65 wherein said IIES layer also comprises at least a trace amount of copper ions that are diffused into said IIES layer during the ion exchange with the acidic aqueous solution wherein said solution contains soluble ionic copper.

78. The glass article of claim 65 wherein the thickness of said IIES layer is more than about 0.1 micrometers.

79. The glass article of claim 65 wherein the thickness of said IIES layer is less than about 10 micrometer.

80. The glass article of claim 65 wherein the thickness of said IIES layer is less than about 3 micrometers.

81. The glass article according to claim 65 wherein the glass composition contains at least sufficient amounts of PI agents, RSS agents and ADAGNS to prevent even the slightest etching by the aqueous ion exchange solution during ion exchange.

82. The glass article according to claim 65 wherein the spectral portion of the actinic radiation has wavelengths longer than 300 nm.

83. The glass article according to claim 65 wherein said spectral portion of the actinic radiation has wavelengths longer than 400 nm.

84. The glass article of claim 65 wherein the glass composition contains a saturated concentration of Cl at its glass melting temperature provided the concentration of Cl does not exceed 6%.

85. The glass article according to claim 62 wherein the glass article is transparent and colorless.

86. A glass article comprising a body portion and an integral ion-exchanged surface layer (IIES layer), said glass article exhibiting the following properties:

(a) sensitivity to high energy beams; and (b) insensitivity to at least a spectral portion of actinic radiation, and being insensitive to radiation of shorter wavelengths as concentration of $TiO_2$ in chloride containing glass composition of the glass article increases;

said body portion composed of a glass composition consisting essentially of, in mole percent on the oxide basis, 3-25% of one or more alkali metal oxides, at least 1.5% $TiO_2$, but not exceeding 25% $TiO_2$, the composition containing at least an effective amount of $TiO_2$ to render the IIES layer insensitive to at least a spectral portion of actinic radiation, up to 35% of acid-durability-and-glass-network strengtheners (ADAGNS), up to 25% $P_2O_5$, up to 25% $B_2O_3$,
up to 4% F,
up to 6% Cl,
up to 2% Br,
up to 2% I, and
20–93% $SiO_2$,
the sum amount of the above components constituting at least 75 mole percent of the glass composition, said IIES layer composed of a surface layer of said glass composition that has been ion exchanged with an acidic aqueous solution containing soluble ionic silver to diffuse silver ions into said IIES layer to render the IIES layer sensitive to high energy beams, said IIES layer comprising,
   silver ions, and
   water in a concentration greater than about 0.01% by weight $H_2O$.

87. The glass article according to claim 86 wherein the additional ADAGNS is ZnO.

88. The glass article according to claim 86 wherein the glass article is transparent and colorless.

89. The glass article of claim 86 wherein said IIES layer also comprises at least a trace amount of copper ions that are diffused into said IIES layer during the ion exchange with the acidic aqueous solution wherein said solution contains soluble ionic copper.

90. The glass article of claim 86 wherein the thickness of said IIES layer is less than about 10 micrometer.

91. A glass article comprising a body portion and an integral ion-exchanged surface layer (IIES layer), said glass article exhibiting the following properties:
   (a) sensitivity to high energy beams; and
   (b) insensitivity to at least a spectral portion of actinic radiation, and being insensitive to radiation of shorter wavelengths as concentration of $TiO_2$ in the glass article increases;
said body portion composed of an alkali metal silicate glass composition consisting essentially, in mole percent on the oxide basis, of,
   12–16% $Li_2O$, $Na_2O$, $K_2O$ and combinations thereof,
   3–10% $TiO_2$, the composition containing at least an effective amount of $TiO_2$ to render the IIES layer insensitive to at least a spectral portion of the actinic radiation,
   4.5–35% total concentration of acid-durability-and-glass-network-strengtheners, provided the amount of ZnO is 4–10% and the amount of $Al_2O_3$ is 0.5–5%,
   up to 20% BaO,
   up to 25% $B_2O_3$,
   up to 25% $P_2O_5$,
   up to 3% halide selected from the group consisting of F, Br, I and combinations thereof,
   0.8–6% Cl, and
   the balance $SiO_2$,
said IIES layer composed of a surface layer of said glass composition that has been ion-exchanged with an acidic aqueous solution containing soluble ionic silver to diffuse silver ions into said IIES layer to render said IIES layer sensitive to high energy beams, said IIES layer containing,
   silver ions, and
   water in an amount of between about 0.01% and 12% by weight $H_2O$.

92. The glass article according to claim 91 wherein the glass composition contains at least sufficient amounts of $TiO_2$, ZnO and $Al_2O_3$ to prevent even the slightest etching by the aqueous ion exchange solution during ion exchange.

93. The glass article of claim 91 wherein in addition to ZnO and $Al_2O_3$ the glass composition includes at least one additional acid-durability-and-glass-network strengthener selected from the group consisting of MgO, CaO, SrO and PbO.

94. The glass article according to claim 91 wherein the glass article is transparent and colorless.

95. The glass article of claim 91 wherein said IIES layer also comprises at least a trace amount of copper ions that are diffused into said IIES layer during the ion exchange with the acidic aqueous solution wherein said solution contains soluble ionic copper.

96. A glass article comprising a body portion and an integral ion-exchanged surface layer (IIES layer), said glass article exhibiting the following properties:
   (a) sensitivity to high energy beams; and
   (b) insensitivity to at least a spectral portion of actinic radiation, and being insensitive to radiation of shorter wavelengths as concentration of photosensitivity inhibitors in chloride containing glass composition of the glass article increases;
said body portion composed of a glass composition consisting essentially, in mole percent on the oxide basis, of
   10–20% $Li_2O$, $Na_2O$, $K_2O$, $Rb_2O$, $Cs_2O$ and combinations thereof,
   0.5–8.4% total of photosensitivity inhibitors (PI agents and RS-suppression agents (RSS agents), the composition containing at least an effective amount of PI agents to render said IIES layer insensitive to at least a spectral portion of the actinic radiation, including 0.5 to 7.4% $TiO_2$,
   3.6–7.6% ZnO,
   0.6–2.4% $Al_2O_3$,
   up to 10.8% MgO,
   up to 4% CaO,
   up to 4% BaO,
   up to 3.5% PbO,
   up to 4% SrO,
   up to 7.2% $B_2O_3$,
   up to 7.2% $P_2O_5$,
   up to 1.5% halide selected from the group consisting of F, Br, I and combinations thereof,
   0.8–6% Cl, and
   58.5–73.2% $SiO_2$,
said IIES layer composed of a surface layer of said glass composition that has been ion-exchanged with an acidic aqueous solution containing soluble ionic silver to diffuse silver ions into said IIES layer to render said IIES layer sensitive to high energy beams, said IIES layer containing,
   silver ions, and
   water in an amount of between about 0.01% and 12% by weight $H_2O$.

97. A glass article comprising a body portion and an integral ion-exchanged surface layer (IIES layer), said glass article exhibiting the following properties:
   (a) sensitivity to high energy beams; and
   (b) insensitivity to at least a spectral portion of actinic radiation; and
   (c) rigid at room temperature and free of thermoplasticity;
said body portion composed of a glass composition consisting essentially of, in mole percent on the oxide basis,
   5–25% of one or more alkali metal oxides, at least 1.5% $TiO_2$, but not exceeding 25% $TiO_2$, the composition containing at least an effective amount of $TiO_2$ to render the IIES layer insensitive to at least a spectral portion of actinic radiation, up to 20% MgO,
up to 20% CaO,
up to 20% ZnO,
up to 15% $Al_2O_3$,
up to 20% PbO,
up to 20% BaO,
up to 25% $B_2O_3$,
up to 25% $P_2O_5$,
2–35% of at least one acid-durability-and-glass-network-strenghtener (ADAGNS) selected from the group consisting of MgO, ZnO, $Al_2O_3$, PbO and CaO,
up to 4% F,
up to 2% Br,
up to 2% I,
up to 6% Cl, and
50–89% $SiO_2$, said IIES layer composed of a surface layer of said glass composition that has been ion exchanged with an acidic aqueous solution containing soluble ionic silver to diffuse silver ions into said IIES layer to render said IIES layer sensitive to high energy beams, said IIES layer comprising, silver ions, and water in a concentration greater than about 0.01% by weight $H_2O$.

98. The glass article of claim 97 wherein the thickness of said IIES layer is less than about 10 micrometer.

99. A glass article comprising a body portion and an integral ion-exchanged surface layer (IIES layer), said glass article exhibiting the following properties:
 (a) sensitivity to high energy beams; and
 (b) insensitivity to at least a spectral portion of actinic radiation, and being insensitive to radiation of shorter wavelengths as concentration of photosensitivity inhibitors in chloride containing glass composition of the glass article increases;

said body portion composed of a glass composition consisting essentially of, in mole percent on the oxide basis, 5–25% of one or more alkali metal oxides,
at least 1.5%, but less than 35%, of photosensitivity inhibitors (PI agents) selected from the group consisting of $TiO_2$, $Nb_2O_5$, $Y_2O_3$, $Ta_2O_5$, and combinations thereof, the composition containing at least an effective amount of the photosensitivity inhibitors to render the IIES layer insensitive to at least a spectral portion of the actinic radiation, up to 20% MgO,
up to 20% CaO,
up to 20% ZnO,
up to 15% $Al_2O_3$,
up to 20% PbO,
up to 20% BaO,
up to 25% $B_2O_3$,
up to 25% $P_2O_5$,
2–35% of at least one acid-durability-and-glass-network-strenghtener (ADAGNS) selected from the group consisting of MgO, ZnO, $Al_2O_3$, PbO and CaO,
up to 4% F,
up to 2% Br,
up to 2% I,
up to 6% Cl, and
50–89% $SiO_2$, said IIES layer composed of a surface layer of said glass composition that has been ion exchanged with an acidic aqueous solution containing soluble ionic silver to diffuse silver ions into said IIES layer to render said IIES layer sensitive to high energy beams, said IIES layer comprising, silver ions, and water in a concentration greater than about 0.01% by weight $H_2O$.

100. The glass article of claim 99 wherein the thickness of said IIEES layer is less than about 10 micrometer.

101. A glass article comprising a body portion and an integral ion-exchanged surface layer (IIES layer), said glass article exhibiting the following properties:
 (a) sensitivity to high energy beams; and
 (b) insensitivity to at least a spectral portion of actinic radiation; and
 (c) rigid at room temperature and free of thermoplasticity;

said body portion composed of a glass composition consisting essentially of, in mole percent on the oxide basis, 5–25% of one or more alkali metal oxides,
at least 1.5%, but less than 35%, of photosensitivity inhibitors (PI agents) selected from the group consisting of $TiO_2$, $Nb_2O_5$, $Y_2O_3$, $Ta_2O_5$, and combinations thereof, the composition containing at least an effective amount of photosensitivity inhibitors to render the IIES layer insensitive to at least a spectral portion of the actinic radiation, up to 20% MgO,
up to 20% CaO,
up to 20% ZnO,
up to 15% $Al_2O_3$,
up to 20% PbO,
up to 20% BaO,
up to 25% $B_2O_3$,
up to 25% $P_2O_5$,
2–35% of at least one acid-durability-and-glass-network-strenghtener (ADAGNS) selected from the group consisting of MgO, ZnO, $Al_2O_3$, PbO and CaO,
up to 4% F,
up to 2% Br,
up to 2% I,
up to 6% Cl, and
50–89% $SiO_2$, said IIES layer composed of a surface layer of said glass composition that has been ion exchanged with an acidic aqueous solution containing soluble ionic silver to diffuse silver ions into said IIES layer to render said IIES layer sensitive to high energy beams, said IIES layer comprising, silver ions, and water in a concentration greater than about 0.01% by weight $H_2O$.

102. The glass article of claim 101 wherein the thickness of said IIES layer is less than about 10 micrometer.

103. A glass article comprising a body portion and an integral ion-exchanged surface layer (IIES layer), said glass article exhibiting the following properties:
 (a) sensitivity to high energy beams; and
 (b) insensitivity to at least a spectral portion of actinic radiation, and being insensitive to radiation of shorter wavelengths as concentration of photosensitivity inhibitors increases; and
 (c) rigid at room temperature and free of thermoplasticity;

said body portion composed of a glass composition consisting essentially of, in mole percent on the oxide basis, 5-25% of one or more alkali metal oxides,
 0.5-35% total of at least one photosensitivity inhibitor (PI agent) and RS-suppression agent (RSS agent), provided an effective amount of PI agent is included to render the IIES layer insensitive to at least a spectral portion of actinic radiation;
 up to 20% MgO,
 up to 20% CaO,
 2-20% ZnO,
 up to 15% $Al_2O_3$,
 up to 20% PbO, provided that the amount of acid-durability-and-glass-network-strengthener (ADAGNS) selected from the group consisting of MgO, ZnO, $Al_2O_3$, PbO and CaO is from 2% to 35%,
 up to 20% BaO,
 up to 25% $B_2O_3$,
 up to 25% $P_2O_5$,
 up to 4% F,
 up to 2% Br,
 up to 2% I,
 up to 6% Cl, and
 50-89% $SiO_2$, said IIES layer composed of a surface layer of said glass composition that has been ion exchanged with an acidic aqueous solution containing soluble ionic silver to diffuse silver ions into said IIES layer to render said IIES layer sensitive to high energy beams, said IIES layer comprising, silver ions, and water in a concentration greater than about 0.01% by weight $H_2O$.

104. The glass article of claim 103 wherein the thickness of said IIES layer is less than about 10 micrometer.

105. A glass article comprising a body portion and an integral ion-exchanged surface layer (IIES layer), said glass article exhibiting the following properties:
 (a) sensitivity to high energy beams; and
 (b) insensitivity to at least a spectral portion of actinic radiation; and
 (c) rigid at room temperature, and free of thermoplasticity;

said body portion composed of a glass composition consisting essentially of, in mole percent on the oxide basis, 3-25% of one or more alkali metal oxides, at least 1.5%, but less than 35%, of photosensitivity inhibitors (PI agents) selected from the group consisting of $TiO_2$, $Nb_2O_5$, $Y_2O_3$, $Ta_2O_5$ and combinations thereof, the composition containing at least an effective amount of photosensitivity inhibitors to render the IIES layer insensitive to at least a spectral portion of actinic radiation,
 up to 35% of acid-durability-and-glass-netwlrk-strengtheners (ADAGNS),
 up to 20% BaO,
 up to 25% $P_2O_5$,
 up to 25% $B_2O_3$,
 up to 4% F,
 up to 6% Cl,
 up to 2% Br,
 up to 2% I, and
 20-93% $SiO_2$, the sum amount of the above components constituting at least 75 mole percent of the glass composition, said IIES layer composed of a surface layer of said glass composition that has been ion exchanged with an acidic aqueous solution containing soluble ionic silver to diffuse silver ions into said IIES layer to render the IIES layer sensitive to high energy beams, said IIES layer comprising, silver ions, and
 water in a concentration greater than about 0.01% by weight $H_2O$.

106. The glass article of claim 105 wherein the thickness of said IIES layer is less than about 10 micrometer.

107. A glass article comprising a body portion and an integral ion-exchanged surface layer (IIES layer), said glass article exhibiting the following properties:
 (a) sensitivity to high energy beams; and
 (b) insensitivity to at least a spectral portion of actinic radiation; and
 (c) rigid at room temperature, and free of thermoplasticity;

said body portion composed of a glass composition consisting essentially of, in mole percent on the oxide basis, 3-25% of one or more alkali metal oxides,
 at least 1.5% $TiO_2$, but not exceeding 35% $TiO_2$, the composition containing at least an effective amount of $TiO_2$ to render the IIES layer insensitive to at least a spectral portion of actinic radiation, up to 35% of acid-durability-and-glass-network strengtheners (ADAGNS),
 up to 20% BaO,
 up to 25% $P_2O_5$,
 up to 25% $B_2O_3$,
 up to 4% F,
 up to 6% Cl,
 up to 2% Br,
 up to 2% I, and
 20-93% $SiO_2$, the sum amount of the above components constituting at least 75 mole percent of the glass composition, said IIES layer composed of a surface layer of said glass composition that has been ion exchanged with an acidic aqueous solution containing soluble ionic silver to diffuse silver ions into said IIES layer to render the IIES layer sensitive to high energy beams, said IIES layer comprising, silver ions, and
 water in a concentration greater than about 0.01% by weight $H_2O$.

108. The glass article of claim 107 wherein the thickness of said IIES layer is less than about 10 micrometer.

109. A glass article comprising a body portion and an integral ion-exchanged surface layer (IIES layer), said glass article exhibiting the following properties:
 (a) sensitivity to high energy beams; and
 (b) insensitivity to at least a spectral portion of actinic radiation, and being insensitive to radiation of shorter wavelengths as concentration of photosensitivity inhibitors in chloride-containing glass composition of the glass article increases;
 (c) rigid at room temperature, and free of thermoplasticity;

said body portion composed of a glass composition consisting essentially of, in mole percent on the oxide basis, 3-25% of one or more alkali metal oxides,
 0.5-35% total of photosensitivity inhibitors (PI agents) and RS-suppression agents, provided an effective amount of PI agents is included to render the IIES layer insensitive to at least a spectral portion of actinic radiation, including at least 0.5% $TiO_2$,
up to 35% of acid-durability-and-glass-network strengtheners (ADAGNS),
up to 20% BaO,
up to 25% $P_2O_5$,
up to 25% $B_2O_3$,
up to 4% F,
up to 6% Cl,
up to 2% Br,
up to 2% I, and
20-93% $SiO_2$, the sum amount of the above components constituting at least 75 mole percent of the glass composition, said IIES layer composed of a surface layer of said glass composition that has been ion exchanged with an acidic aqueous solution containing soluble ionic silver to diffuse silver ions into said IIES layer to render the IIES layer sensitive to high energy beams, said IIES layer comprising,
silver ions, and
water in a concentration greater than about 0.01% by weight $H_2O$.

110. The glass article of claim 109 wherein the thickness of said IIES layer is less than about 10 micrometer.

111. A glass article comprising a body portion and an integral ion-exchanged surface layer (IIES layer), said glass article exhibiting the following properties:
(a) sensitivity to high energy beams; and
(b) insensitivity to at least a spectral portion of actinic radiation; and
(c) rigid at room temperature and free of thermoplasticity;
said body portion composed of a glass composition consisting essentially of, in mole percent on the oxide basis,
5-25% total of $Li_2O$, $Na_2O$ and $K_2O$,
1.2-35% total of photosensitivity inhibitors (PI agents) and RS-suppression agents selected from the group consisting of $TiO_2$, $Ta_2O_5$, $ZrO_2$, $Nb_2O_5$, $La_2O_3$, $Y_2O_3$ and $WO_3$, provided an effective amount of PI agents is included to render the IIES layer insensitivity to at least a spectral portion of actinic radiation, including 1.2% to 25% $TiO_2$,
2-20% ZnO,
up to 10% $Al_2O_3$,
up to 20% MgO,
up to 20% CaO,
up to 20% PbO, provided that the amount of acid-durability-and-glass-network strengthener (ADAGNS) selected from the group consisting of MgO, ZnO, $Al_2O_3$, PbO and CaO is from 2% to 35%,
up to 20% BaO,
up to 25% $B_2O_3$,
up to 25% $P_2O_5$,
up to 3% total of F, Br, and I,
up to 6% Cl, and
50-89% $SiO_2$,
said IIES layer composed of a surface layer of said glass composition that has been ion exchanged with an acidic aqueous solution containing soluble ionic silver to diffuse silver ions into said IIES layer to render said IIES layer sensitive to high energy beams, said IIES layer comprising,
silver ions, and water in a concentration greater than about 0.01% by weight $H_2O$.

112. The glass article of claim 111 wherein the thickness of said IIES layer is less than about 10 micrometer.

113. A monolithic glass article comprising a body portion and an integral ion-exchanged surface layer (IIES layer), said glass article exhibiting the following properties:
(a) sensitivity to high energy beams; and
(b) insensitivity to at least a spectral portion of actinic radiation, and being insensitive to radiation of shorter wavelengths as concentration of $TiO_2$ in chloride containing glass composition of the glass article increases;
said body portion composed of a first glass composition consisting essentially of, in mole percent on the oxide basis,
5-25% of one or more alkali metal oxides,
at least 1.5% $TiO_2$, but not exceeding 25% $TiO_2$, the composition containing at least an effective amount of $TiO_2$ to render the IIES layer insensitive to actinic radiation,
up to 20% MgO,
up to 20% CaO,
up to 20% ZnO,
up to 15% $Al_2O_3$,
up to 20% PbO,
up to 20% BaO,
up to 25% $B_2O_3$,
up to 25% $P_2O_5$,
2-35% of at least one acid-durability-and-glass-network strengthener (ADAGNS) selected from the group consisting of MgO, ZnO, $Al_2O_3$, PbO and CaO,
up to 4% F,
up to 2% Br,
up to 2% I,
up to 6% Cl, and
50-89% $SiO_2$,
said IIES layer composed of a second glass composition comprising water in a concentration of between about 0.01 and 12 weight percent $H_2O$, one or more alkali metal oxides, at least 1.5% $TiO_2$, at least one acid-durabilityand-glass-network strengthener selected from the group consisting of MgO, CaO, ZnO, $Al_2O_3$, and PbO, at least one halide selected from the group consisting of F, Cl, Br and I, and $SiO_2$, and, in mole percent on the anhydrous glass basis,
0.1-25% $Ag_2O$, the concentration of the alkali metal oxides in the second glass composition being less than in the first glass composition.

114. An article comprising a high energy beam-sensitive glass, said article exhibiting the following properties:
(a) sensitivity to high energy beams; and
(b) insensitivity to at least a spectral portion of actinic radiation, and being insensitive to radiation of shorter wavelengths as concentration of $TiO_2$ in chloride containing glass composition of the glass article increases;
said glass composed of a glass composition consisting essentially of, in mole percent on the anhydrous glass basis,
3-25% of one or more alkali metal oxides,
at least 1.5% $TiO_2$, but not exceeding 35% $TiO_2$, the composition containing at least an effective amount of $TiO_2$ to render the glass insensitive to actinic radiation,
up to 20% MgO,
up to 20% CaO, up to 20% ZnO,
up to 15% Al$_2$O$_3$,
up to 20% PbO,
up to 20% BaO,
up to 25% B$_2$O$_3$,
up to 25% P$_2$O$_5$,
2–35% of at least one acid-durability-and-glass-network-strengthener (ADAGNS) selected from the group consisting of MgO, ZnO, Al$_2$O$_3$, PbO and CaO,
up to 4% F,
up to 2% Br,
up to 2% I,
up to 6% Cl,
0.1–25% Ag$_2$O,
50–89% SiO$_2$, and
water in a concentration of between about 0.01 and 12 weight percent H$_2$O.

* * * * *

UNITED STATES PATENT AND TRADEMARK OFFICE
CERTIFICATE OF CORRECTION

PATENT NO. : 4,567,104
DATED : January 28, 1986
INVENTOR(S) : CHE-KUANG WU

It is certified that error appears in the above-identified patent and that said Letters Patent is hereby corrected as shown below:

Col. 2, line 58, delete "direct-read-write" and insert therefor --direct-read-after-write--.
Col. 4, line 5, delete "about 10-100 kg" and insert therefor --about 10-100 kv--.
Col. 6, line 59, delete "inhibitors are" and insert therefor --inhibitors as--.
Col. 7, line 23, delete "consists generally" and insert therefor --consists essentially--.
Col. 8, line 58, delete "ion cntaining" and insert therefor --ion containing--.
Table 1, delete "$ZnO_2$" and insert therefor --ZnO--.
Col. 10, line 19, delete "and the valves" and insert therefor --and the values--.
Col. 17, line 29, delete "$Cu(NO_3)_3$+200 g Li-" and insert therefor --$Cu(NO_3)_2$+200 g Li- --.
Col. 35, line 19, delete "glasses are $4 \times 10^4$" and insert therefor --glasses are $4 \times 10^{14}$--.
Col. 39, line 14, delete "SiOSi+$H_2O \rightleftharpoons$ 2 SiOH" and insert therefor --SiOSi+$H_2O \rightleftharpoons$ 2 SiOH--.
Col. 42, line 37, delete "($Cu(NO_3)_2$+8.9 cc" and insert therefor --$Cu(NO_3)_2$+8.9 cc--.
Col. 44, line 16, delete "bath at 100°°C." and insert therefor --bath at 100°C.--.
Col. 44, line 33, delete "$Cu(NO_3)_2$ⓑ g" and insert therefor --$Cu(NO_3)_2$+200 g--.
Col. 54, line 47, delete "claim 62" and insert therefor --claim 64--.

UNITED STATES PATENT AND TRADEMARK OFFICE
CERTIFICATE OF CORRECTION

PATENT NO. : 4,567,104

DATED : January 28, 1986

INVENTOR(S) : CHE-KUANG WU

It is certified that error appears in the above-identified patent and that said Letters Patent is hereby corrected as shown below:

Col. 59, line 56, delete "acid-durability-and-glass-netwlrk" and insert therefor -- acid-durability-and-glass-network --.

Signed and Sealed this

Eleventh Day of November, 1986

Attest:

DONALD J. QUIGG

Attesting Officer     Commissioner of Patents and Trademarks